(12) United States Patent
Babej et al.

(10) Patent No.: US 8,371,785 B2
(45) Date of Patent: Feb. 12, 2013

(54) RIVET NUT AND RIVET BOLT AND COMBINATION OF A RIVET NUT OR A RIVET BOLT WITH A SHEET METAL PART

(75) Inventors: Jiri Babej, Lich (DE); Richard Humpert, Rosbach v.d.H (DE)

(73) Assignee: Profil Verbindungstechnik GmbH & Co., KG (DE)

( * ) Notice: Subject to any disclaimer, the term of this patent is extended or adjusted under 35 U.S.C. 154(b) by 274 days.

(21) Appl. No.: 12/303,001

(22) PCT Filed: Jun. 1, 2007

(86) PCT No.: PCT/EP2007/004882
§ 371 (c)(1),
(2), (4) Date: Jan. 6, 2009

(87) PCT Pub. No.: WO2007/137868
PCT Pub. Date: Dec. 6, 2007

(65) Prior Publication Data
US 2009/0196678 A1    Aug. 6, 2009

(30) Foreign Application Priority Data

Jun. 1, 2006   (DE) ..................... 20 2006 008 721 U
May 25, 2007   (WO) ................. PCT/EP2007/004699

(51) Int. Cl.
*F16B 37/04* (2006.01)
(52) U.S. Cl. ........................................ 411/180; 411/181
(58) Field of Classification Search .......... 411/179–181; 29/512, 798
See application file for complete search history.

(56) References Cited

U.S. PATENT DOCUMENTS 3,213,914 A * 10/1965 Baumle et al. ................ 411/179
3,253,631 A *  5/1966 Reusser ........................ 411/179

(Continued)

FOREIGN PATENT DOCUMENTS

EP    0 539 793    10/1992
EP    0 561 715    3/1993

(Continued)

OTHER PUBLICATIONS

German Search Report dated Apr. 3, 2007 relating to German Patent Application No. 20 2006 008 721.4.

(Continued)

*Primary Examiner* — Gary Estremsky
(74) *Attorney, Agent, or Firm* — Hershkovitz & Associates, LLC

(57) ABSTRACT

The invention relates to a rivet nut (10) with a base part (12) and a cylindrical rivet section (14), the base part having a central threaded cylinder (16), an annular contact surface (18) that is coaxial to the threaded cylinder in a plane (20) perpendicular to the longitudinal axis (22) of the threaded cylinder, and that has an axially aligned annular groove (24), said groove being arranged radially inside the annular contact surface and radially outside the cylindrical rivet section and said groove blending, on the radially inner side, into the outer surface of the cylindrical rivet section, and antirotation ribs (42) being provided in the area of the annular groove. The invention is characterized in that the annular groove, when seen in an axial cross-sectional plane, has a U-shaped cross-section with a radially outer lateral wall (30) which is relatively steep and which has, at the steepest point (33), an inclination to the center longitudinal axis of the rivet nut in the range of approximately 45° to approximately −20°, preferably of approximately 30° to approximately 0°. The volume of the annular groove is chosen in such a manner that across a range of sheet thicknesses adapted to the respective thread size there is room for the volume of the respective folded region of the rivet section inside the annular recess (80) that is formed by molding the sheet part (60) into the annular groove of the element and that it does not project beyond the side (82) of the molded sheet facing away from the annular contact surface.

4 Claims, 47 Drawing Sheets

U.S. PATENT DOCUMENTS

Figure 1A:
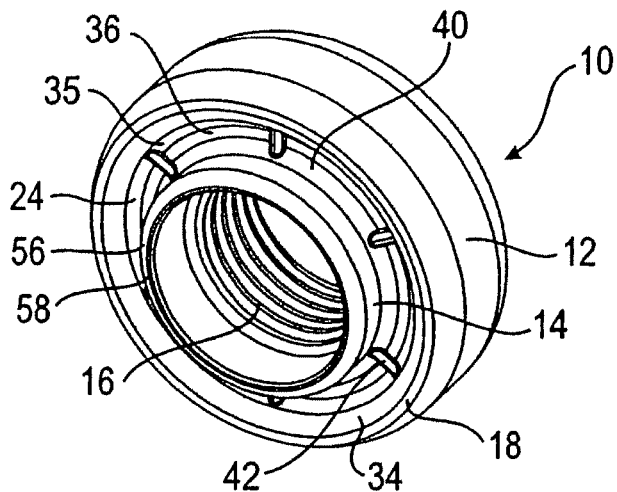

| | | | |
|---|---|---|---|
| 5,251,370 A * | 10/1993 | Muller et al. | 29/512 |
| 5,340,251 A * | 8/1994 | Takahashi et al. | 411/179 |
| 5,502,888 A | 4/1996 | Takahashi et al. | |
| 5,613,815 A * | 3/1997 | Muller | 411/181 |
| 5,673,472 A * | 10/1997 | Muller | 29/432.1 |
| 5,882,159 A * | 3/1999 | Muller | 411/179 |
| 6,081,994 A * | 7/2000 | Muller | 29/798 |
| 7,383,624 B2 * | 6/2008 | Wojciechowski et al. | 29/521 |
| 2004/0042872 A1 | 3/2004 | Ward et al. | |
| 2004/0202524 A1 * | 10/2004 | Ross et al. | 411/181 |

FOREIGN PATENT DOCUMENTS

| | | |
|---|---|---|
| EP | 0 678 679 | 3/1995 |
| EP | 1 116 891 | 7/2001 |
| EP | 1 500 461 | 1/2005 |
| EP | 1 674 741 | 8/2008 |
| FR | 2 624 568 | 12/1988 |
| FR | 2 792 270 | 10/2000 |
| WO | WO 02/077468 | 10/2002 |
| WO | WO 2004/034520 | 4/2004 |
| WO | WO 2005/099930 | 10/2005 |
| WO | WO 2006/125634 | 11/2006 |

OTHER PUBLICATIONS

English Language Translation of German Search Report dated Apr. 3, 2007 relating to German Patent Application No. 20 2006 008 721.4.

* cited by examiner

| Parameters | | Dependent values | |
|---|---|---|---|
| Ø Thread | $\varnothing_G$ | Thickness, rivet | $D_N$ |
| Ø Rivet, outer | $\varnothing_{Na}$ | Volume, rivet | $V_N$ |
| Ø Rivet, inner | $\varnothing_{Ni}$ | Support width, flange | $B_{Fl}$ |
| Ø Flange | $\varnothing_{Fl}$ | Surface surface, flange | $B_{Fl}$ |
| Length, rivet | $l_N$ | Max. Ø groove, outer | $\varnothing_{Nmax}$ |
| Radius, flange | $R_{FL}$ | Min. Ø groove, inner | $\varnothing_{Nmin}$ |
| Max. bolt force | $F_{Bmax}$ | Width, groove | $b_N$ |
| Max. surface pressure | $P_{max}$ | Depth, groove | $t_N$ |

Fig. 4B

Check for commercial thread sizes and sheet metal thicknesses

| Ø Thread | Ø Rivet, outer | Ø Rivet, inner | Thickness, rivet | Length, rivet | Volume, rivet | Ø Flange | Radius, flange | Support width, flange | Ø Groove max, outer | Bolt force max. | Surface pressure. | Width, groove | Depth, groove | Sheet metal thickn. | Volume, res. groove | Volume, res. rivet |
|---|---|---|---|---|---|---|---|---|---|---|---|---|---|---|---|---|
| 6 | 9.7 | 7.6 | 1.05 | 3.1 | 88 | 16 | 0.5 | 0.8 | 13.4 | 17200 | 482 | 1.85 | 1.4 | 0.5 | 74 | 74.2 |
|   |   |   |   |   |   |   |   |   |   |   |   |   |   | 1.0 | 60 | 59.9 |
|   |   |   |   |   |   |   |   |   |   |   |   |   |   | 1.5 | 47 | 45.7 |
|   |   |   |   |   |   |   |   |   |   |   |   |   |   | 2.0 | 34 | 31.4 |
|   |   |   |   |   |   |   |   |   |   |   |   |   |   | 2.5 | 21 | 17.1 |
| 8 | 12.8 | 9.6 | 1.60 | 3.6 | 203 | 21 | 0.8 | 1.1 | 17.2 | 31200 | 493 | 2.20 | 2.1 | 0.5 | 174 | 174.5 |
|   |   |   |   |   |   |   |   |   |   |   |   |   |   | 1.0 | 147 | 146.4 |
|   |   |   |   |   |   |   |   |   |   |   |   |   |   | 1.5 | 120 | 118.2 |
|   |   |   |   |   |   |   |   |   |   |   |   |   |   | 2.0 | 94 | 90.1 |
|   |   |   |   |   |   |   |   |   |   |   |   |   |   | 2.5 | 69 | 61.9 |
| 10 | 15.0 | 11.6 | 1.70 | 4.1 | 291 | 26 | 1.1 | 1.7 | 20.4 | 57800 | 490 | 2.70 | 2.1 | 1.0 | 226 | 220.2 |
|   |   |   |   |   |   |   |   |   |   |   |   |   |   | 1.5 | 194 | 184.7 |
|   |   |   |   |   |   |   |   |   |   |   |   |   |   | 2.0 | 163 | 149.2 |
|   |   |   |   |   |   |   |   |   |   |   |   |   |   | 2.5 | 133 | 113.7 |
|   |   |   |   |   |   |   |   |   |   |   |   |   |   | 3.5 | 76 | 42.6 |
| 12 | 16.1 | 13.6 | 1.25 | 4.1 | 239 | 28 | 1.4 | 2.1 | 21.0 | 74200 | 487 | 2.45 | 1.8 | 1.0 | 182 | 180.8 |
|   |   |   |   |   |   |   |   |   |   |   |   |   |   | 1.5 | 154 | 151.6 |
|   |   |   |   |   |   |   |   |   |   |   |   |   |   | 2.0 | 127 | 122.5 |
|   |   |   |   |   |   |   |   |   |   |   |   |   |   | 2.5 | 101 | 93.3 |
|   |   |   |   |   |   |   |   |   |   |   |   |   |   | 3.5 | 51 | 35.0 |

Fig. 4C

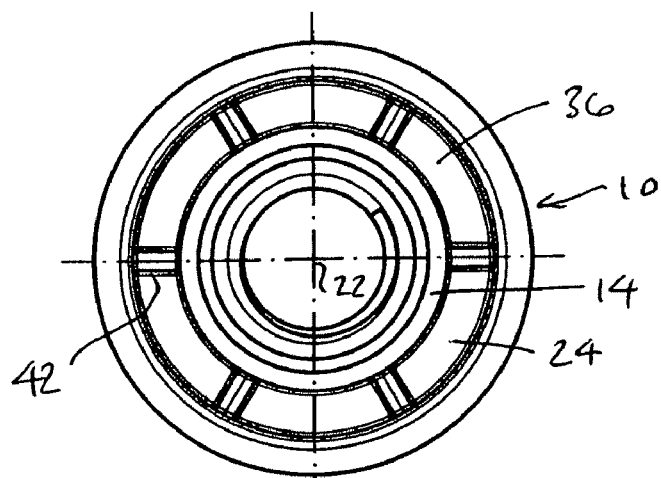
FIG. 17A
FIG. 17B
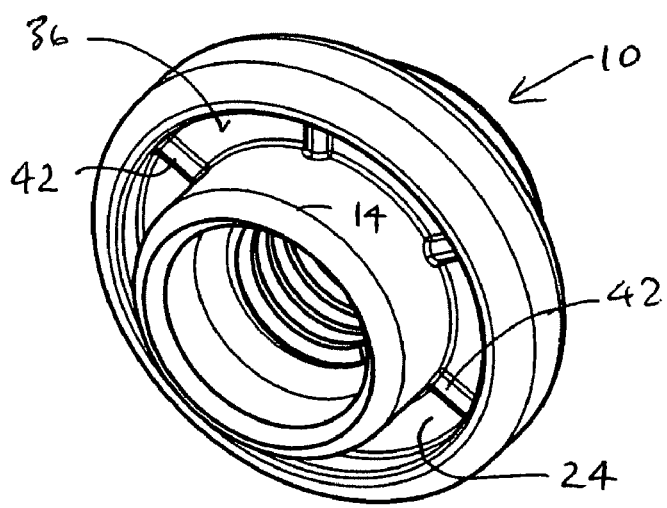
FIG. 17C
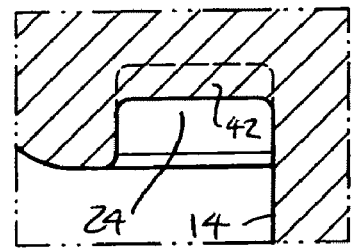
FIG. 17D

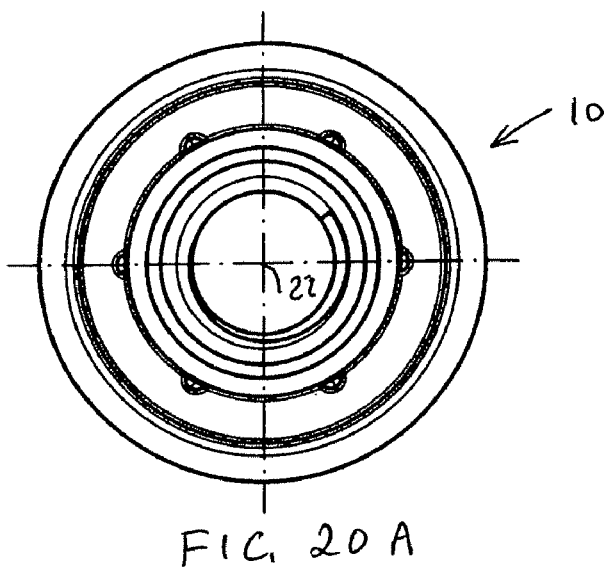
FIG. 20A
FIG. 20B
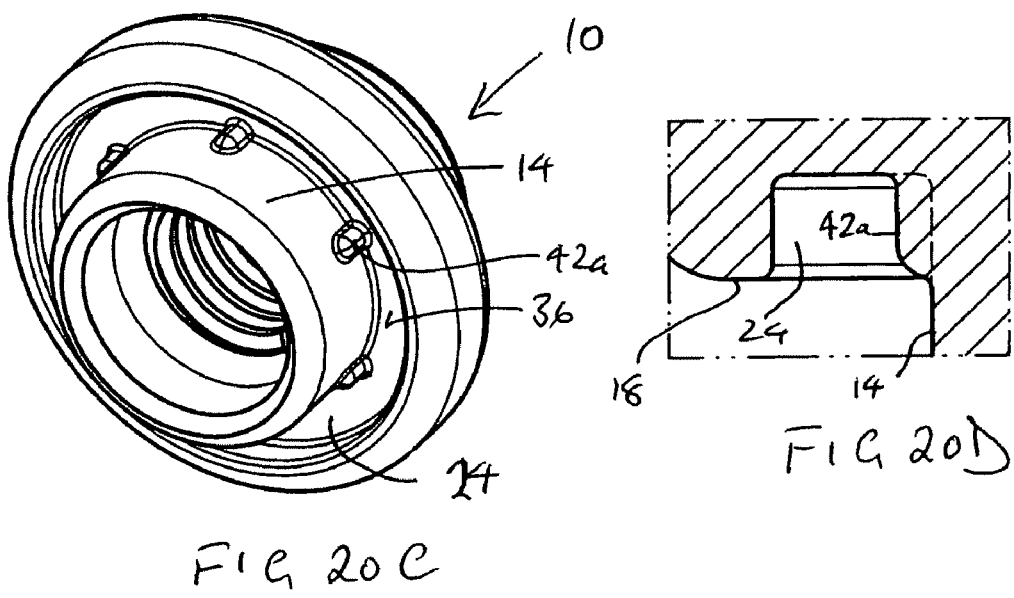
FIG. 20C
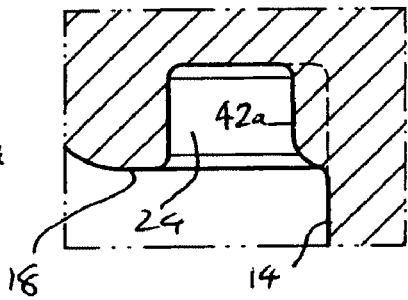
FIG. 20D

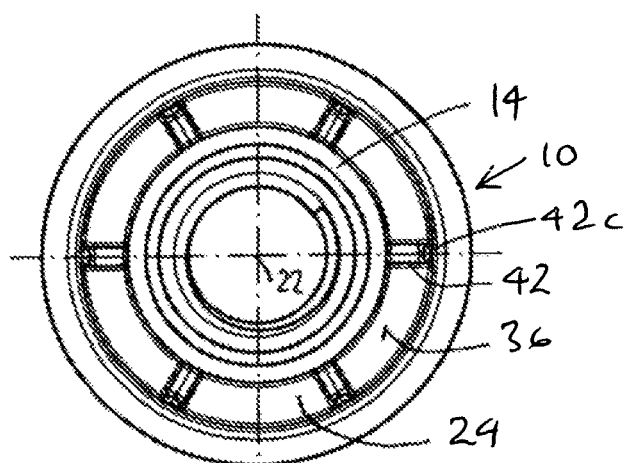
FIG 22A
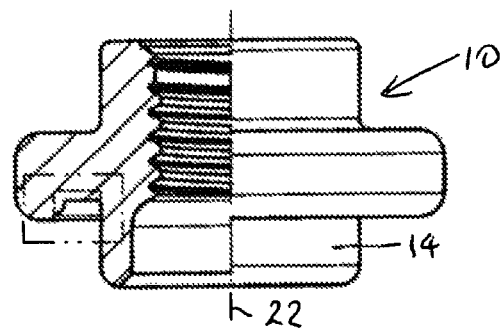
FIG 22B
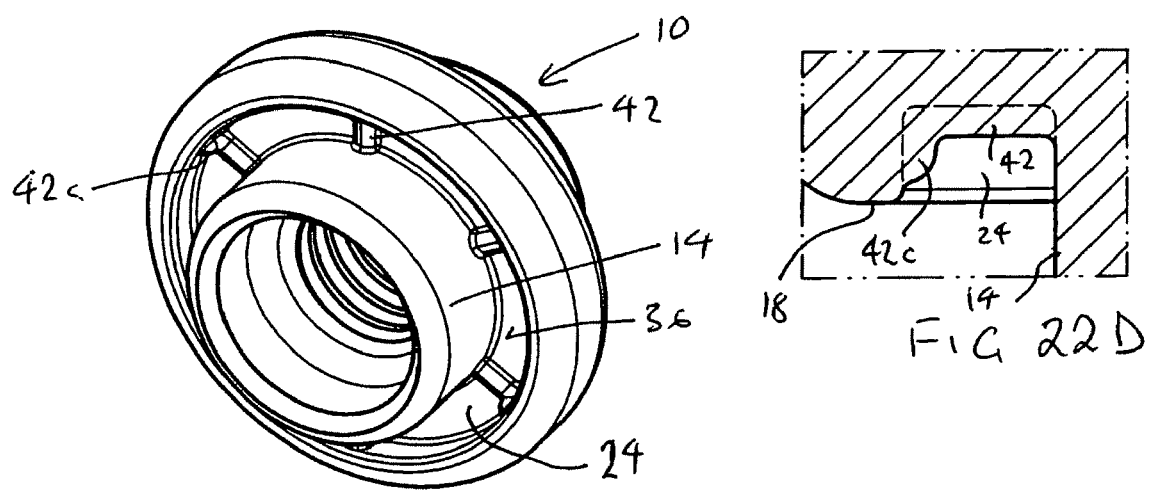
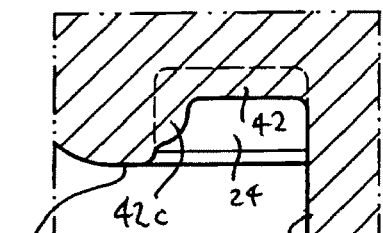
FIG 22D
FIG 22C

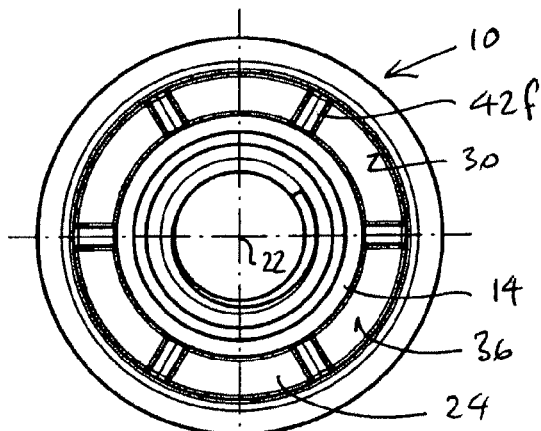
FIG. 27A
FIG. 27B
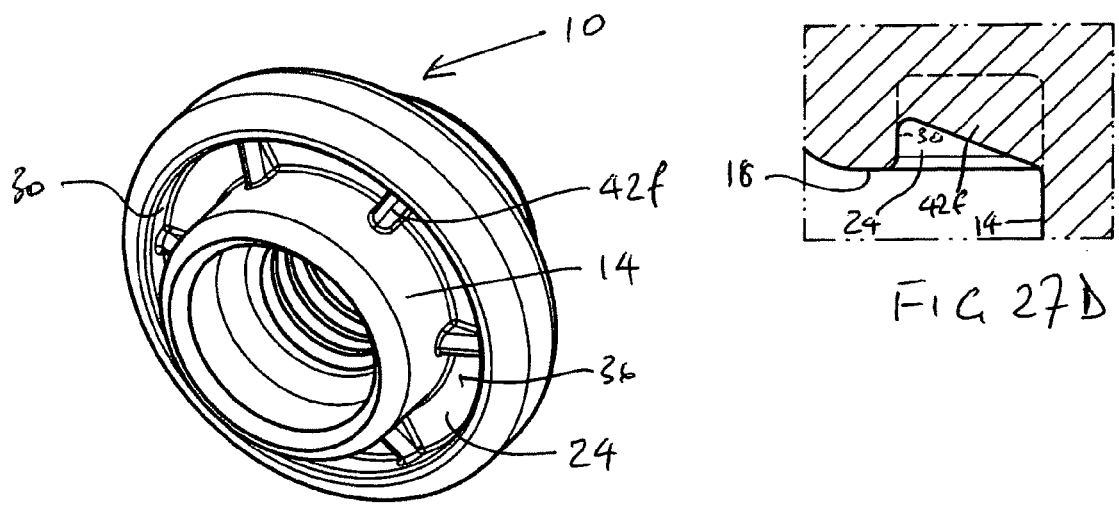
FIG. 27C
FIG. 27D

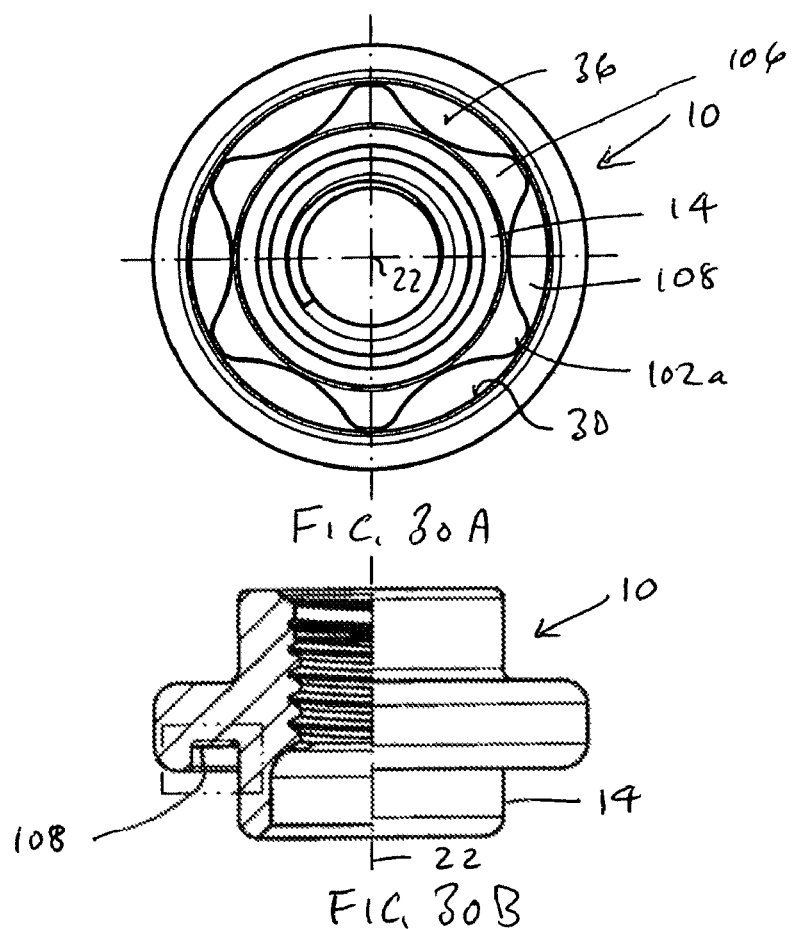
FIG. 30A
FIG. 30B
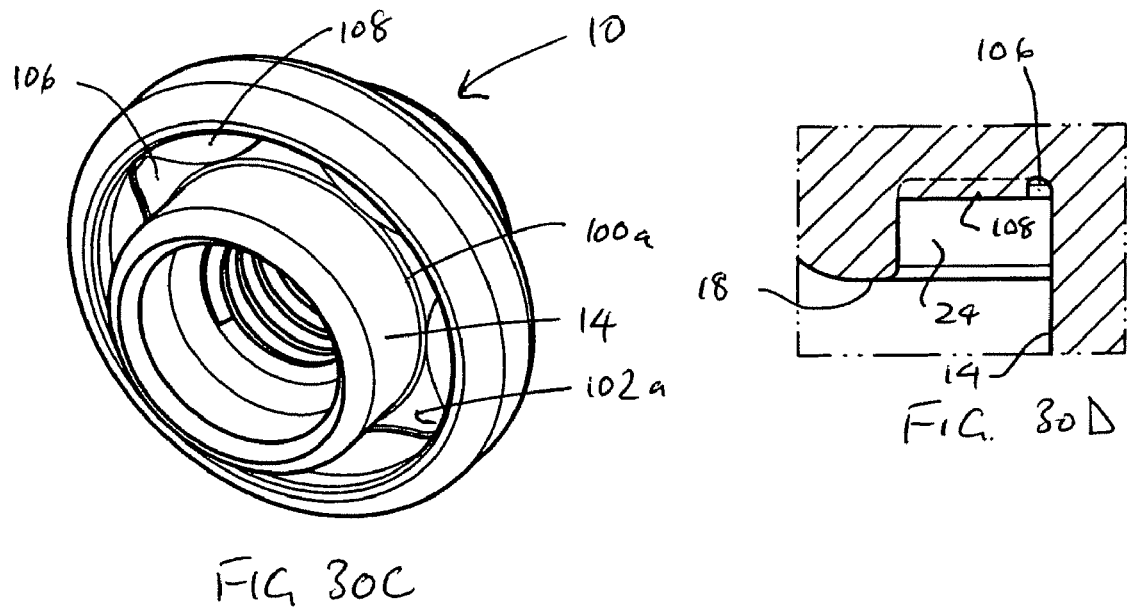
FIG. 30C
FIG. 30D

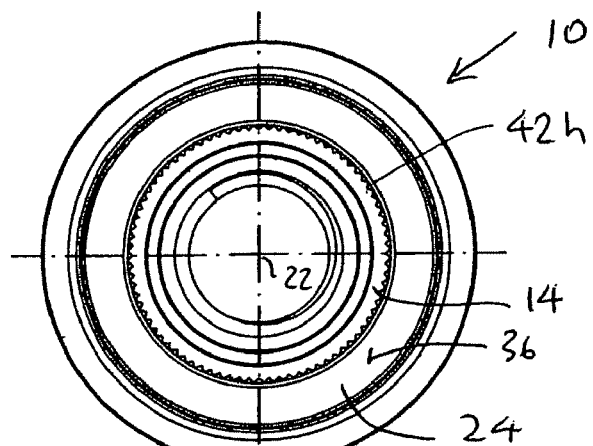
FIG. 31A
FIG. 31B
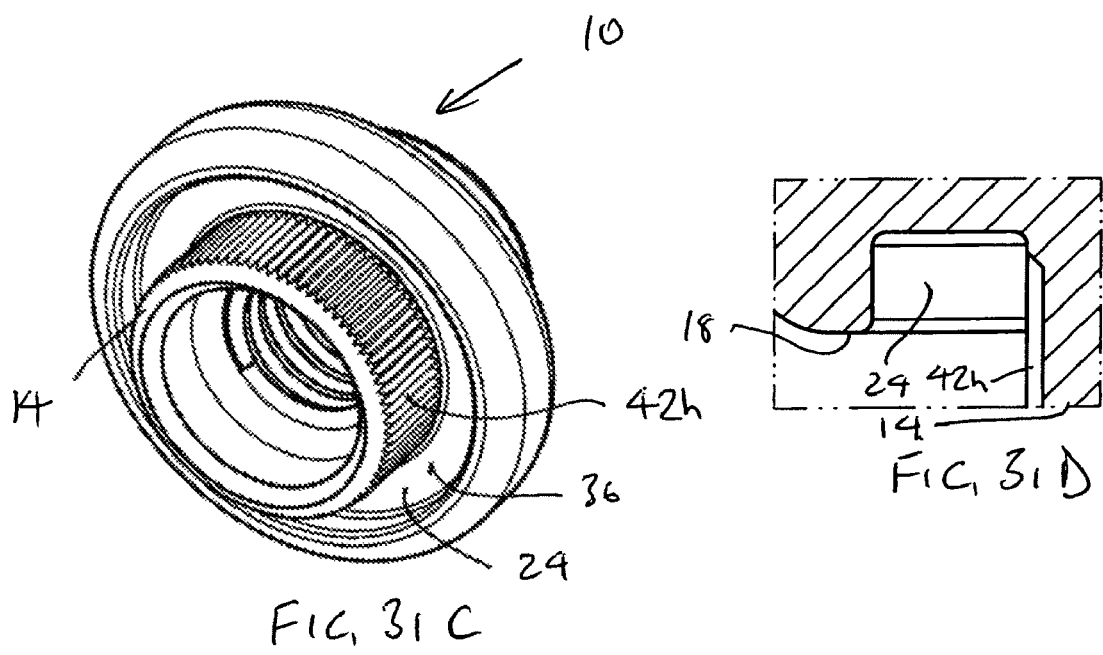
FIG. 31C
FIG. 31D

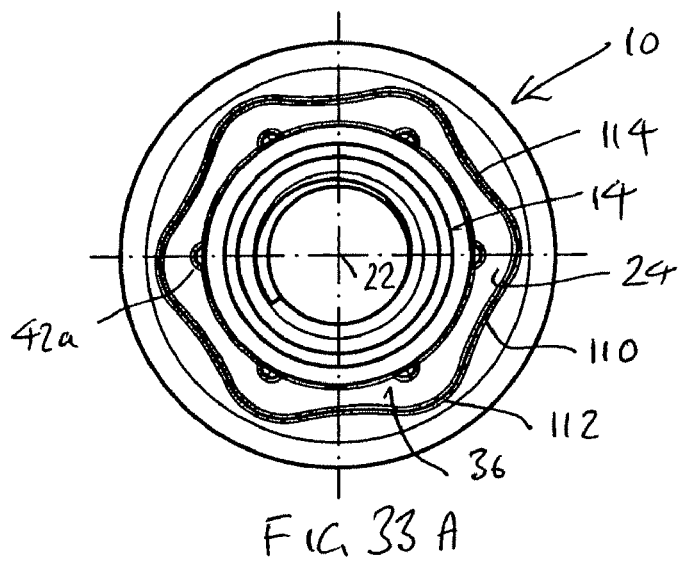
FIG 33 A
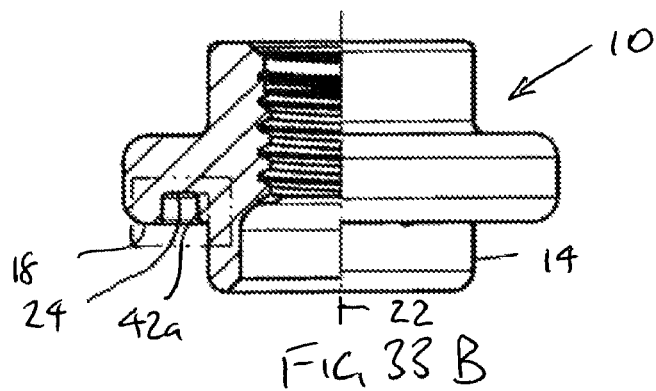
FIG 33 B
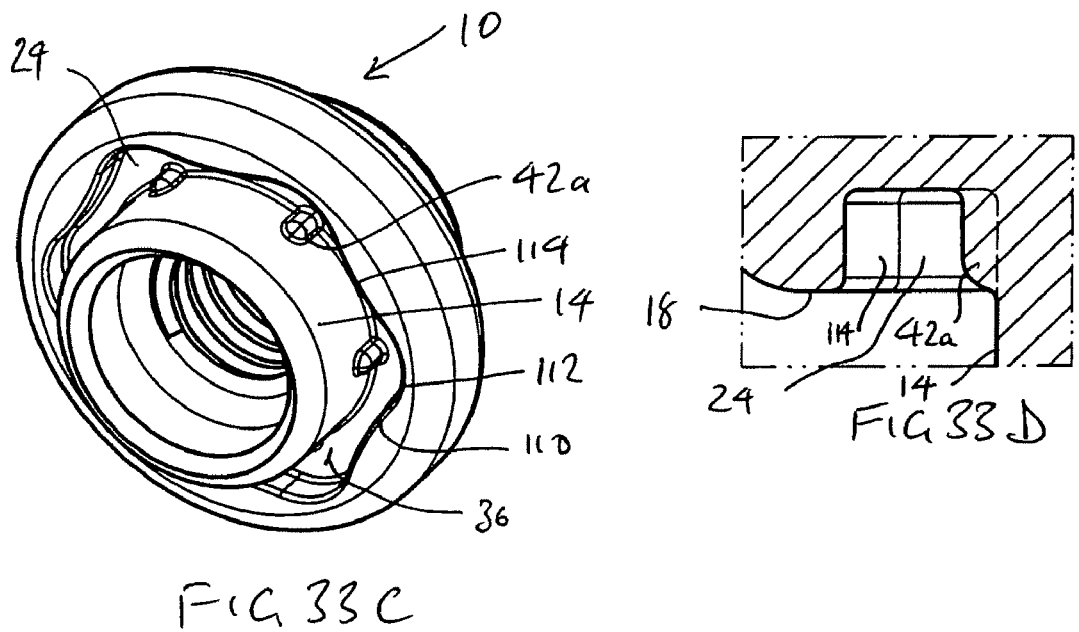
FIG 33 C
FIG 33 D

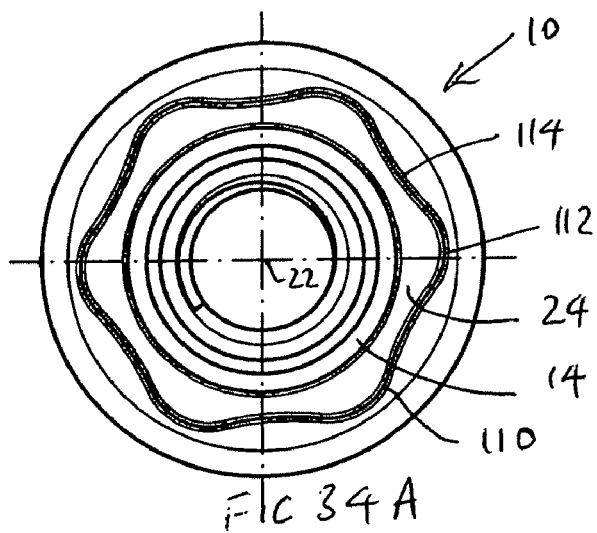
FIG 34A
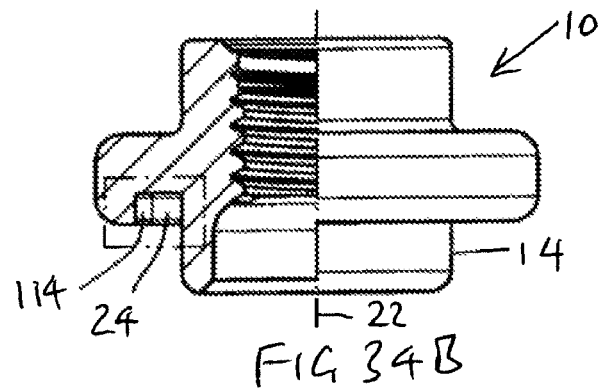
FIG 34B
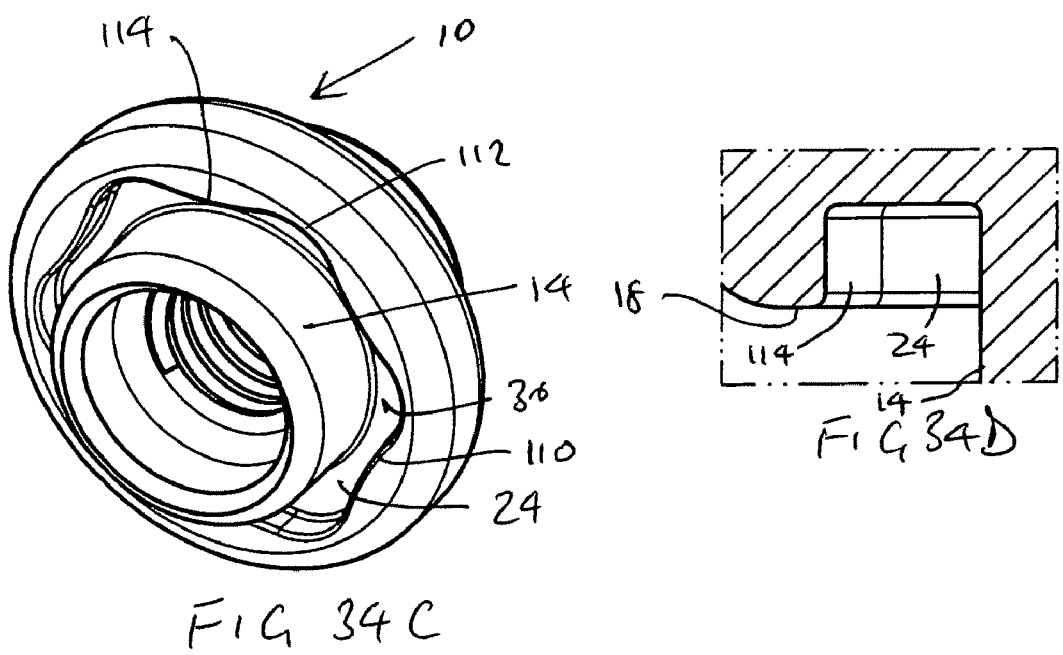
FIG 34C
FIG 34D

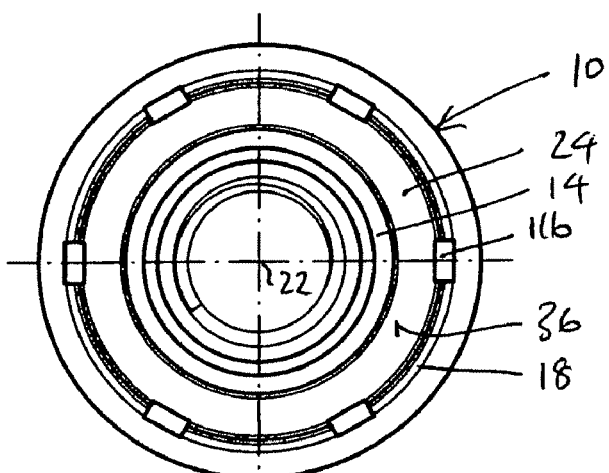
FIG 35A
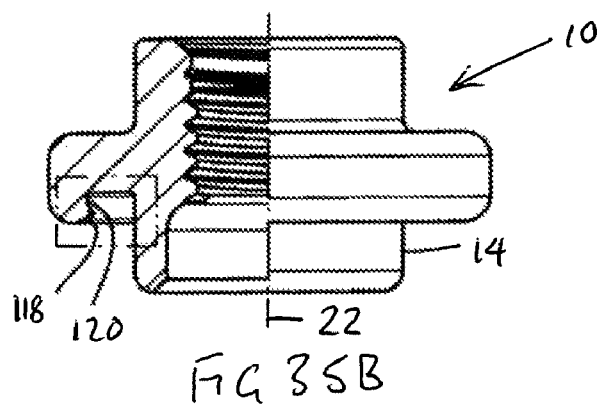
FIG 35B
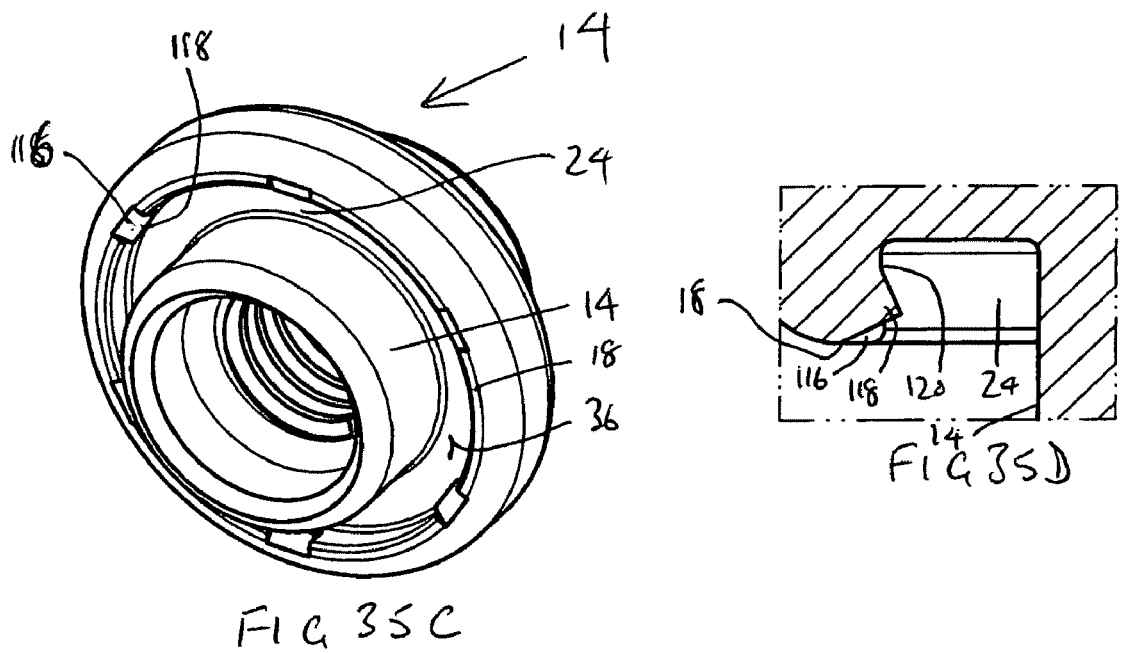
FIG 35C
FIG 35D

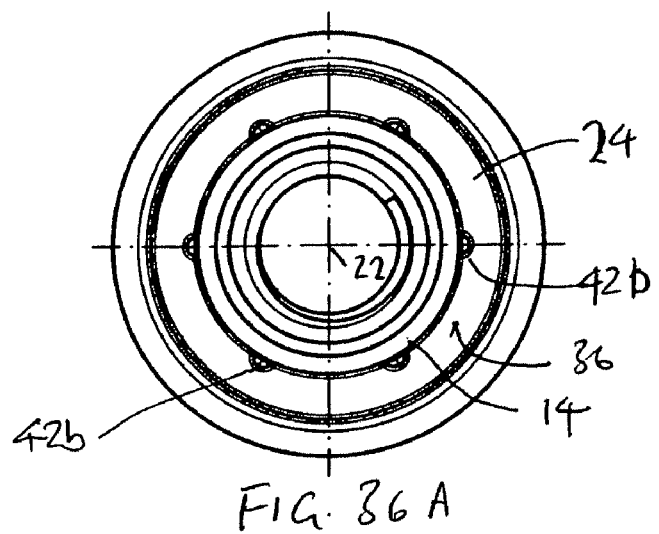
FIG. 36A
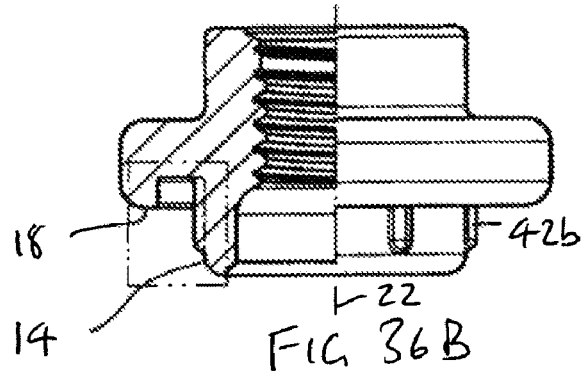
FIG. 36B
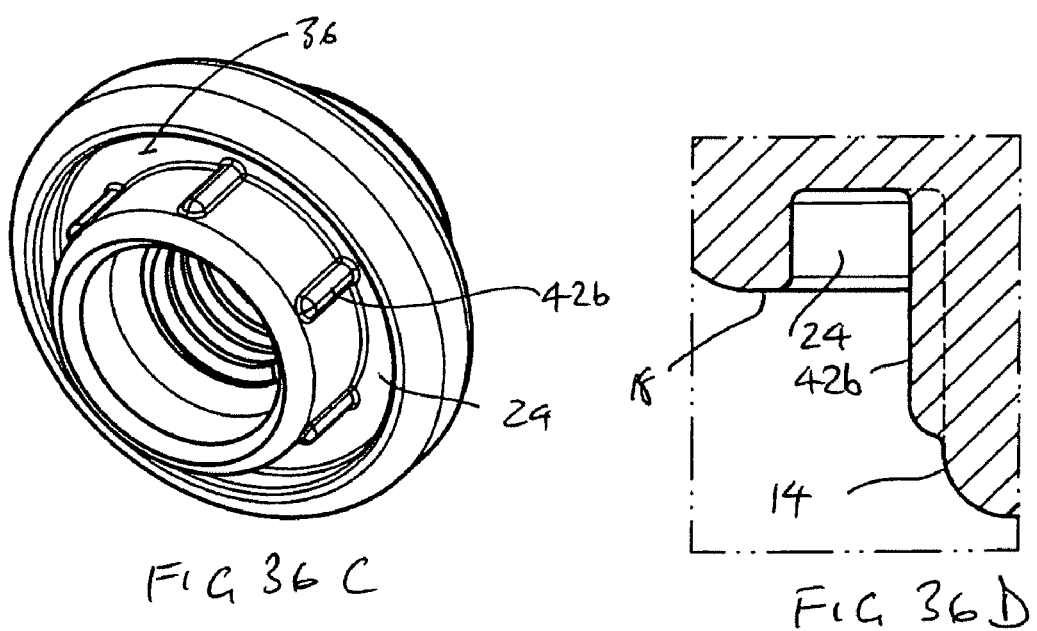
FIG. 36C
FIG. 36D

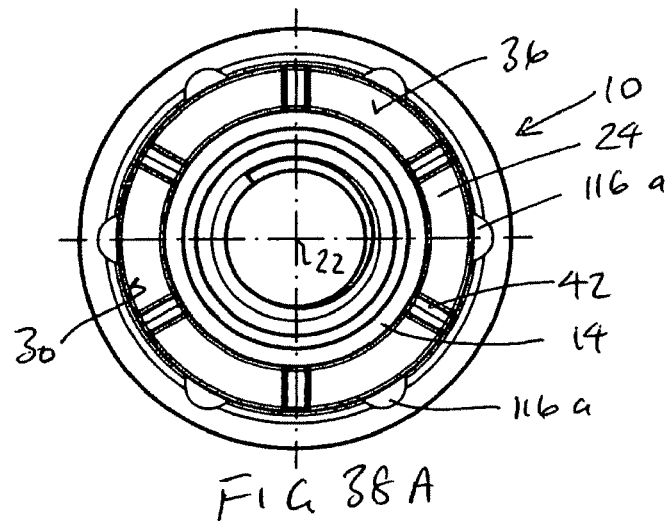
FIG 38A
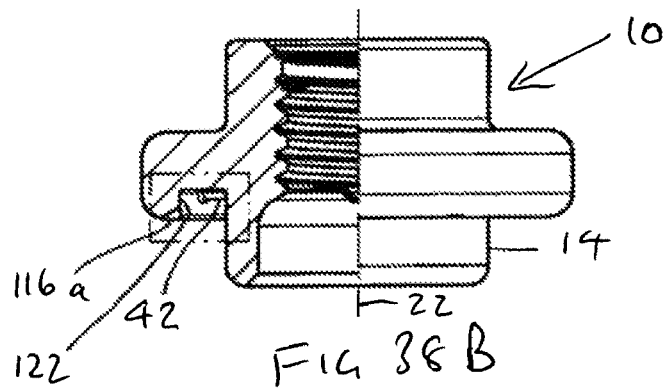
FIG 38B
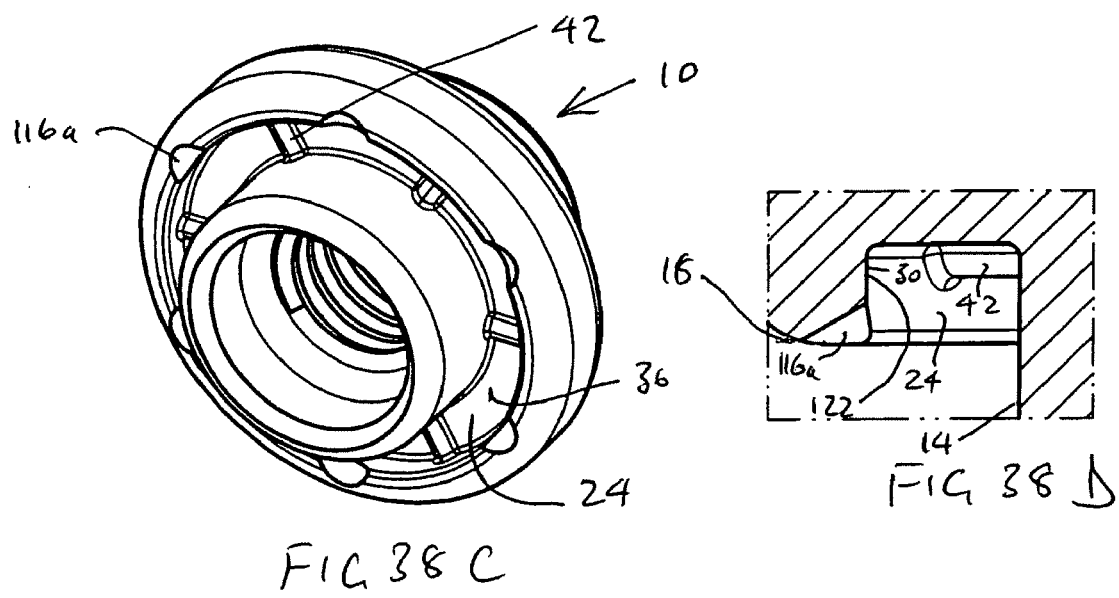
FIG 38C
FIG 38D

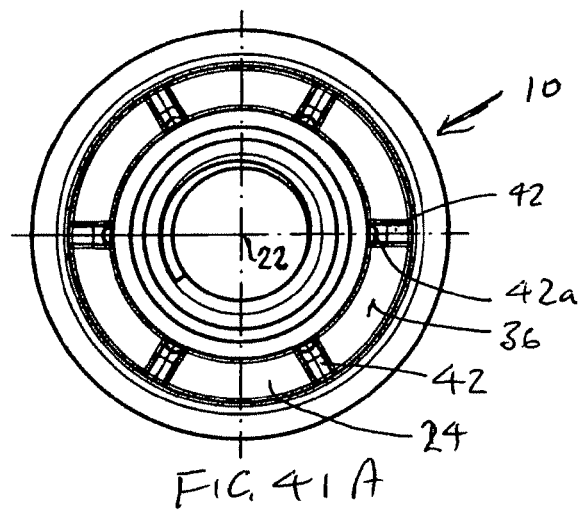
FIG. 41A
FIG. 41B
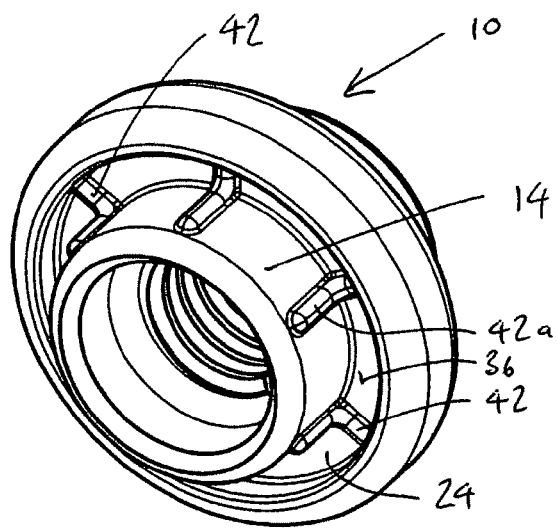
FIG. 41C
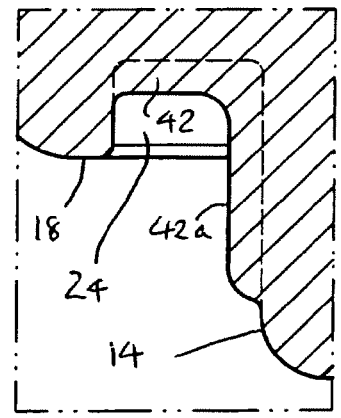
FIG. 41D

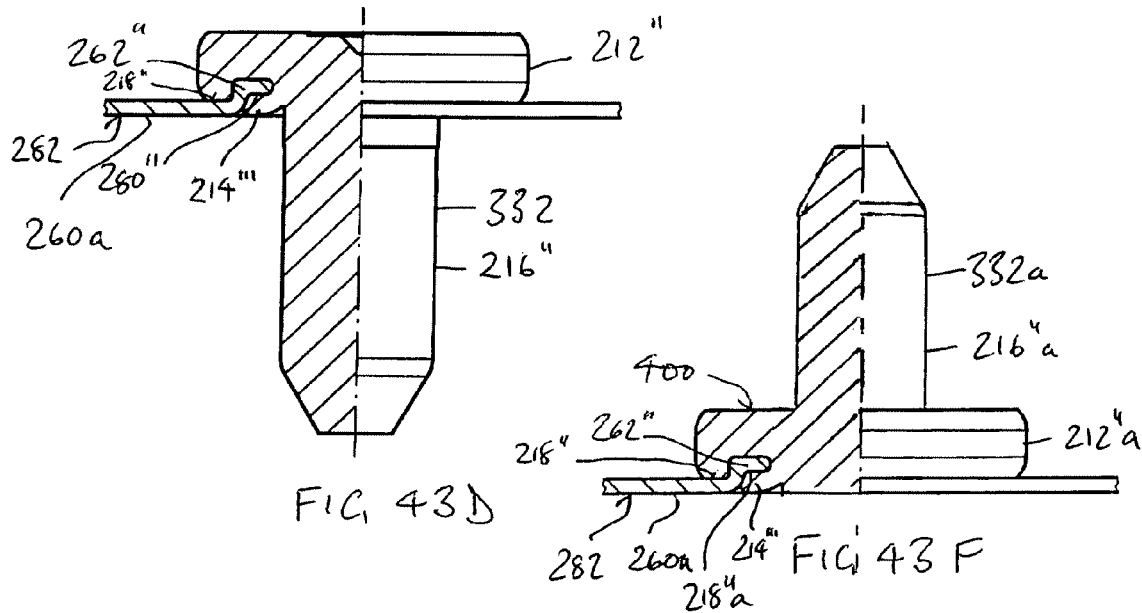
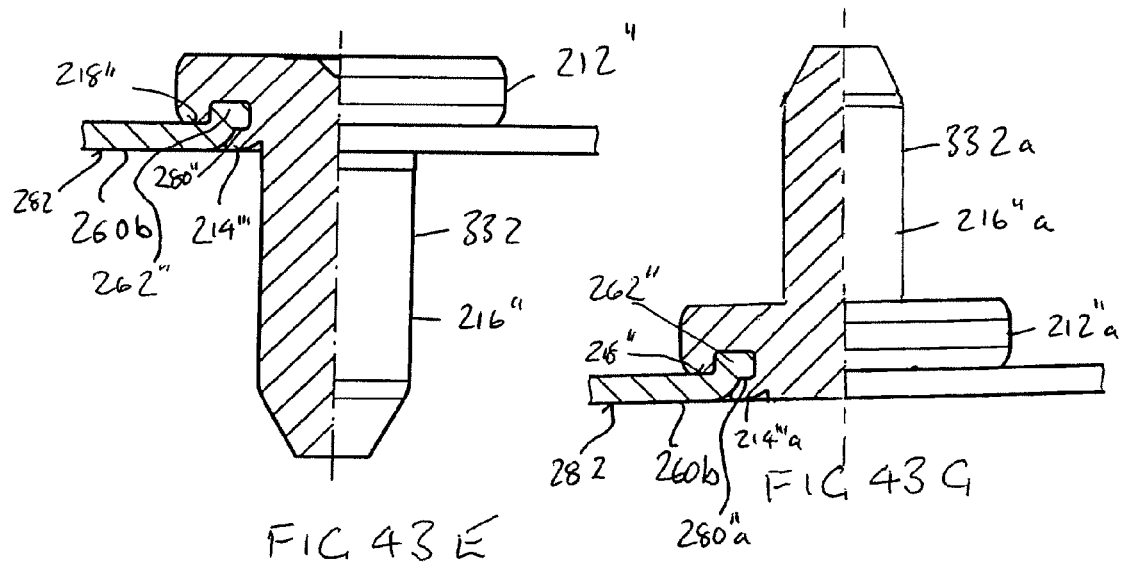

RIVET NUT AND RIVET BOLT AND COMBINATION OF A RIVET NUT OR A RIVET BOLT WITH A SHEET METAL PART

CROSS REFERENCE OF APPLICATION

This application claims the benefit of priority from PCT/EP2007/004882 filed on Jun. 1, 2007 and from PCT/EP2007/004699 filed on May 25, 2007 and from German Patent Application No. 20 2006 008 721.4, filed on Jun. 1, 2006, the contents of all of which are incorporated herein by reference.

The present invention relates to a rivet nut having a body part and a cylindrical rivet portion, with the body part having a centrally arranged thread cylinder, a ring-shaped contact surface coaxial to the thread cylinder in a plane perpendicular to the longitudinal axis of the thread cylinder and an axially aligned ring groove which is arranged radially inside the ring-shaped contact surface and radially outside the cylindrical rivet portion and which merges on the radially inner side into the outer surface of the cylindrical rivet portion and with ribs for security against rotation being provided in the region of the ring groove. The invention further relates to a rivet bolt and to the combination of a rivet bolt with a sheet metal part.

Rivet nuts of the initially named kind are well known in the field of connection elements in the form of the so-called RND nuts of the company Profil Verbindungstechnik GmbH & Co. KG and are frequently used in the industrial production of sheet metal parts, in particular, but not exclusively, in the area of car body manufacture. Such rivet nuts are protected and described in the European patent EP 1116891.

In practice, such RND nuts are usually attached to the sheet metal part by the clamping hole riveting process in accordance with the European Patent 539793. This method requires that the sheet metal part is first provided with an approximately conical elevated portion, that the rivet portion of the rivet nut is guided through a hole in the conical elevated portion and that the conical elevated portion is pressed flat at least partly with a simultaneous beading over of the rivet portion, whereby a substantial "stranglehold" arises between the sheet metal part and the rivet nut which supports the security against rotation by the radially extending ribs providing security against rotation which bridge the axially directed ring groove. In a side view, these ribs providing security against rotation have a shape which corresponds to that of the ring groove, with them having a maximum height which approximately corresponds to the maximum depth of the ring groove. Since the axial ring groove has an inclined shape on the radially outer side and is substantially presented as a conical surface having an included conical angle of approximately 135°, the axial height of the ribs providing security against rotation reduces to zero going in the direction of the ring-shaped contact surface. The sheet metal part is thus not cut through by the ribs providing security against rotation in the region of the beaded over rivet portion and the rivet bead can be received in the concave lower side of the partly pressed flat conical elevated portion. In the practical use of the sheet metal part created in this manner, a further component is attached to the sheet metal part at the rivet bead side and is fixed there by a screw which is screwed into the thread cylinder coming from the rivet bead side. In this respect, the sheet metal part is clamped tight between the component and the ring-shaped support surface by tightening the screw and a high-quality screw connection is thus created between the sheet metal part and the component.

A further advantage of a RND rivet nut can be seen in that it can be used with different sheet metal thicknesses without a respective rivet nut having a separate length of the rivet portion or form of the ring groove being required for each sheet metal thickness.

The conical elevated portion is frequently not pressed completely flat. This is perfectly admissible and even desirable for some applications since the remaining conical elevated portion is loaded in compression in the screw-in situation and a very stiff screw connection results which easily absorbs changing forces arising in operation. However, such a component assembly creates the impression that the element is not correctly riveted to the sheet metal part even though this is generally not true, above all with relatively thin metal sheets due to the rounding of the element, which can hardly be avoided for technical manufacturing reasons, radially outside of the ring-shaped support surface, amplified by the still visible conical extent of the sheet metal part.

In practice, there are furthermore possible applications in which the rivet bead side of the sheet metal part should lie in one plane where possible so that a remaining conical elevated portion has to be kept as small as possible and in which any ring recess present radially outside the rivet bead and radially inside the ring-shaped sheet metal support surface of the rivet nut should be kept as small as possible in its radial extent. It is, however, nevertheless necessary to bring about a high-strength screw connection with good resistance to be being unscrewed and pressed out, in particular with thin sheet metal parts of, for example, 0.6 mm thickness. It is furthermore desired in some applications to achieve a small construction height of the component assembly comprising the rivet nut and the sheet metal part.

It is the object of the present invention to satisfy the aforesaid demands and furthermore to provide a rivet element which is seated in a planar manner on the sheet metal surface independently of the sheet metal thickness and wherein the rivet bead does not project beyond the lower side of the metal sheet.

To satisfy this object, a rivet nut of the initially named kind is provided which is characterized in that the ring groove has, viewed in an axial sectional plane, a U-shaped cross-section with a radially outer side wall which is made relatively steep and has, at the steepest point, an inclination to the middle longitudinal axis of the rivet nut of approximately 45° to approximately −20°, preferably from approximately 30° to approximately 0°, and in that the volume of the ring groove is selected such that the volume of the respective folded over region of the rivet portion over a range of sheet metal thicknesses which is matched to the respective thread size has space within the ring recess formed by shaping the sheet metal part into the ring groove of the element and does not project beyond the side of the shaped sheet metal remote from the ring-shaped support surface.

Due to the special cross-sectional shape of the ring groove and to the axial height of the ribs providing security against rotation, which is deliberately selected as small, it is possible to produce a high-quality rivet connection and simultaneously a design on the rivet bead side of the sheet metal part which is as planar as possible The sheet metal thickness range matched to the respective sheet metal thickness is preferably selected as follows:
Thread M6 or ¼ UNF—sheet metal thickness range preferably 0.5 mm to 2.5 mm, at least 0.6 mm to 1.5 mm;
Thread M8 or 5/16 UNF—sheet metal thickness range preferably 0.5 mm to 2.5 mm, at least 0.6 mm to 1.5 mm;
Thread M10 or ⅜ UNF—sheet metal thickness range preferably 1.0 mm to 3.0 mm, at least 1.0 mm to 2.5 mm;
Thread M12 or 7/16 UNF—sheet metal thickness range preferably 1.0 mm to 3.5 mm, at least 1.0 mm to 2.5 mm.

It can be seen from this that a substantial sheet metal thickness range can be covered by a correct design in accordance with the invention of the respective rivet nut which reasonably takes into account all the sheet metal thicknesses occurring in automobile manufacturing.

The exact cross-sectional shape of the ring groove having a generally U-shaped cross-section can have one of the following cross-sectional shapes:

a) a U shape with the base region in a plane perpendicular to the middle longitudinal axis of the rivet nut and with rounded edges in the region of the transition of the base region into the side walls of the ring groove, with the rounded corners having a relatively small radius, for example in the range between one fifth and one tenth of the axial depth of the ring groove;

a) a U shape with the base region in a plane perpendicular to the middle longitudinal axis of the rivet nut and with rounded edges in the region of the transition of the base region into the side walls of the ring groove, with the rounded corners having a relatively large radius, for example in the range between two thirds and one fifth of the axial depth of the ring groove;

c) a U shape having a curved base region with an approximately circular shape which extends, however, over less than 180°, for example in the range between 180° and 150°, said base region running out into the ring-shaped support surface either directly over a small radius, for example in the range between one fifth and one tenth of the maximum axial depth of the ring groove, and merging more or less gently into the cylindrical outer surface of the rivet portion or running out into the ring-shaped support surface over a straight portion and a relatively small radius and merging more or less gently into the cylindrical outer surface;

d) a U shape having a curved base region with an approximately circular shape which extends, however, over more than 180°, for example in the range between 180° and 210°, said base region running out into the ring-shaped support surface either directly over a small radius, for example in the range between one fifth and one tenth of the maximum axial depth of the ring groove, and merging more or less gently into the cylindrical outer surface of the rivet portion or running out into the ring-shaped support surface over a straight portion and a relatively small radius and merging more or less gently into the cylindrical outer surface;

e) a cross-sectional shape tending toward a V shape with a relatively small radius or a relatively large radius in the base region which has, for example, a size less than half the maximum depth of the ring groove, with the radially outer side of the groove having a steeper angle than its radially inner side;

f) a U shape having a radially inner side and a radially outer side which both extend at least substantially parallel to the middle longitudinal axis and extend over an axial length in the range between one tenth and two thirds of the maximum axial depth of the ring groove, and having a base region with a cross-sectional shape tending toward a V shape with a relatively small radius or a relatively large radius in the base region which has, for example, a size of less than one third of the maximum depth of the ring groove, wherein f1) either the radially outer side of the groove has a steeper angle than its radially inner side, or f2) vice versa, or f3) both sides have at least substantially the same angle;

g) a U shape similar to that in accordance with the features f), f1), f2) or f3); however, with only one of the radially inner side and of the radially outer side extending at least substantially parallel to the middle longitudinal axis and the other merging in inclined form, preferably over a relatively small radius, for example, in the range between one fifth and one twentieth of the maximum axial depth of the ring groove, into the ring-shaped support surface or into the cylindrical outer surface of the rivet portion;

h) a U shape similar to that in accordance with feature a) or feature b), with, however, at least one of the radially inner side and the radially outer side of the U shape forming an undercut.

As can be seen from the above list, the U shape of the ring groove can be selected within relatively widely set limits. It above all appears important that the design of the radially outer side wall keeps to the parameters of claim 1. It is then possible to satisfy the object in accordance with the invention, provided the remaining dimensions of the ring groove are selected in accordance with the teaching in accordance with the invention.

An angle between the flange and the groove of approximately 45° up to approximately −20°, preferably from approximately 30 to 90° is essential for the desired direct clamp.

The further shape of the groove is not relevant to this function. It serves for the reception of sheet metal material and residual rivet and therefore only has to be ideally dimensioned. The shape of the security against rotation features is likewise not necessarily decisive for the areal seating of the nut on the sheet metal or for the reaching of a planar screw-on surface on the attachment of a further component to a component assembly comprising the rivet nut in accordance with the invention and a sheet metal part to which the rivet nut is attached; however, they can be selected such that they ensure the matching of the residual volume of the rivet portion to the volume of the ring recess in the ring bead of the sheet metal part after its shaping into the ring groove.

Rivet elements having a ring groove generally having a U-shaped cross-section are admittedly known per se, for example from FR-A-2792270 or from U.S. Pat. No. 3,213, 914.

In the element in accordance with FR-A-2792270, the groove only serves as a waste collection reservoir for sheet metal material displaced by axial ribs. The beaded over rivet portion in the French specification projects beyond the lower side of the sheet metal part and is not approximately areally aligned with it as is required in the subject matter of the application.

In U.S. Pat. No. 3,213,914, the rivet portion is not folded over to form a rivet bead, but a ring collar is scraped off from the rivet portion to receive the sheet metal part in the ring groove. The tool which effects the scraping off of the ring collar, however, requires a stable shape for this procedure which results in a substantial ring recess at the sheet metal part radially outside the ring collar. This means that the object in accordance with the invention is not satisfied with respect to a filling of the ring recess of the sheet metal part with the beaded over rivet portion which is as complete as possible so that the full contact of the component assembly comprising the rivet nut and the sheet metal part to a further sheet metal part and the desired direct clamp is achieved. Instead, the design in accordance with U.S. Pat. No. 3,213,914 needs a stable washer which causes costs and requires, on the other hand, that the rivet nut has to be made unnecessarily large.

With the design of the rivet nut in accordance with the invention, there is great freedom in the design of the security against rotation features. They can have one of the following designs or a combination thereof:

a) ribs providing security against rotation which extend in a radial direction over the base region of the ring groove and have an axial height which amounts to a fraction of the maximum axial depth of the ring groove;
b) ribs providing security against rotation which extend in a radial direction at their side remote from the base surface of the U-shaped groove, i.e. are disposed in a radial plane which is perpendicular to the middle longitudinal axis of the rivet nut;
c) ribs providing security against rotation which extend in raised form along the cylindrical rivet portion;
d) ribs providing security against rotation which extend in raised form along the cylindrical rivet portion and approximately up to the axial height of the ring-shaped support surface;
e) ribs providing security against rotation which extend in raised form along the cylindrical rivet portion and beyond the axial height of the ring-shaped support surface;
f) ribs providing security against rotation which extend in raised form along the cylindrical rivet portion and beyond the axial height of the ring-shaped support surface and run out directly in front of a rounded portion at the free end of the rivet portion;
g) ribs providing security against rotation which extend in raised form along the radially outer side of the ring groove;
h) ribs providing security against rotation which extend in a radial direction in the base region of the ring groove and have an at least substantially triangular shape in a side view and are higher in the region of the rivet portion than in the region of the radially outer side of the ring groove;
i) ribs providing security against rotation which extend in a radial direction in the base region of the ring groove and have an at least substantially triangular shape in a side view and are higher in the region of the radially outer side of the ring groove than in the region of the rivet portion;
j) ribs providing security against rotation which extend in a radial direction in the base region of the ring groove and have an at least substantially quadrilateral shape in a side view whose side remote from the base surface has an inclined extent and whose radially inner side disposed at the rivet portion is higher than its side disposed in the region of the radially outer side of the ring groove;
k) ribs providing security against rotation which extend in a radial direction in the base region of the ring groove and have an at least substantially quadrilateral shape in a side view, whose side remote from the base surface has an inclined extent and whose side disposed in the region of the radially outer side of the ring groove is higher than its radially inner side disposed at the rivet portion;
l) raised portions providing security against rotation in the base region of the ring groove which has an approximately star-shaped design in plan view with an inner hole which adjoins the cylindrical rivet portion, with the tips of the star-shaped design being disposed at the radially outer side of the ring groove;
m) a recess providing security against rotation in the base region of the ring groove which has an approximately star-shaped design in plan view with an inner hole which adjoins the cylindrical rivet portion, with the tips of the star-shaped design being disposed at the radially outer side of the ring groove;
n) a knurled outer side of the rivet portion;
o) a base surface of the ring groove with a design corresponding to an end face toothed arrangement;
p) a wavy extent of the radially outer side of the ring groove whose gently rounded peaks and troughs form a security against rotation;
q) radially extending recesses in the ring-shaped support surface which preferably do not extend over the full width thereof and have their lowest point adjacent to the ring groove and form projections with undercuts at the radially outer side wall of the ring groove;
r) radially extending recesses in the ring-shaped support surface which have a part-cylindrical cross-sectional shape and are inclined so that they have their lowest point adjacent to the ring groove and interrupt an undercut ring shape of the radially outer side wall of the ring groove;
s) arcuately extending elevated portions or recesses at or in the base surface of the ring groove,
wherein, in the case of discrete security against rotation features at the radially inner side of the ring groove, i.e. at the cylindrical outer surface of the rivet portion, at the base surface of the ring groove or at the radially outer side of the ring groove or at the ring-shaped support surface, they are aligned with one another in the radial direction or are offset to one another angle-wise with respect to the middle longitudinal axis or, in the case of two or more of the named possibilities, are partly aligned with one another in the radial direction and are partly offset to one another angle-wise with respect to the middle longitudinal axis.

This freedom in the selection of the security against rotation features also makes it possible to carry out a type of "fine adjustment" to match the volume of the ring recess in the sheet metal part for different sheet metal thicknesses even better to the volume of the folded over rivet portion, i.e. of the rivet bead.

It is favorable when the axial depth of the ring groove approximately corresponds to the radial thickness of the cylindrical rivet portion.

It is possible by the invention and in particular by this measure to ensure, even without use of the clamping hole riveting process, that the U-shaped ring groove is filled properly by the sheet metal part as well as by the beaded over rivet portion so that the sheet metal part is compressed during the formation of the rivet bead and hereby a permanent compressive stress is also produced in the sheet metal part in the region around the root of the rivet portion, i.e. in the region where the rivet portion merges into the body part of the rivet nut so that the preferred stranglehold arises here and indeed without deforming the sheet metal part in the region of the ring-shaped sheet metal support surface of the rivet nut.

In practical embodiments of the rivet nut, ribs providing security against rotation extending radially at the base of the ring groove can have an axial height in the range between 0.2 and 0.6 mm, but preferably of a maximum of 0.7 times the provided sheet metal thickness.

This dimensioning rule ensures that the ribs providing security against rotation do not cut through the sheet metal part, but that nevertheless a reasonable shape matched connection arises which is always held in shape matched engagement by the beaded over rivet portion in order thus to produce sufficient resistance to rotation.

It is favorable in this respect if from 4 to 24 ribs providing security against rotation are provided. The ribs providing security against rotation are preferably arranged uniformly around the middle longitudinal axis of the rivet nut.

It is particularly preferred if the base surface of the U-shaped ring groove is disposed in a radial plane which is perpendicular to the middle longitudinal axis of the rivet nut. In this embodiment, the ribs providing security against rotation can extend in a radial direction at their side remote from the base surface of the U-shaped groove, i.e. are disposed in a radial plane which is perpendicular to the middle longitudinal axis of the rivet nut.

The rivet nuts in accordance with the present teaching are as a rule circular in plan view; however, they can have a different shape; for example, they can be polygonal, in particular rectangular or square. With a rectangular or square shape, the rivet nuts can also be manufactured in accordance with the method which is described in the German patent application 102005024220.0 or in the international patent application PCT/EP2006/004977 with the publication number WO 2006/125634.

The inner diameter of the cylindrical rivet portion is slightly larger than the outer diameter of the thread cylinder and merges into it via a threaded run-in.

To achieve a small constructional height of the component assembly comprising the sheet metal part and the rivet nut, it is favorable if the end face side of the rivet nut remote from the rivet portion is disposed at least substantially in a plane which is perpendicular to the middle longitudinal axis of the rivet nut.

With ribs providing security against rotation which extend in raised form along the cylindrical rivet portion, they preferably run out before the rounded portion of the outer side of the free end of the rivet portion.

The combination of a rivet nut in accordance with the present teaching with a sheet metal part is characterized in that the sheet metal part is provided in the region of the rivet portion with an elevated portion which is matched at least substantially to the shape of the U-shaped groove and has a ring recess which is similar to the groove shape at its side remote from the U-shaped groove, but which is smaller than the U-shaped groove by approximately the thickness of the sheet metal and in that the beaded over rivet portion is arranged completely within the recess and does not project beyond the side of the sheet metal part remote from the thread cylinder.

The volume of the ring-shaped recess corresponds at least substantially to the volume of the respective beaded over rivet portion.

In this respect, the ribs providing security against rotation engage in a shape matched manner into the sheet metal material, but do not cut through it.

It is particularly favorable that the attachment of the rivet nut or of the rivet bolt to the sheet metal part by a rivet die with the present design of the rivet nut or of the rivet bolt has the result that the margin of the sheet metal part in the region of the perforation through which the rivet portions extends is made in a thickened or bead-like form and the rivet bead is provided on the side facing the thread cylinder with a corresponding ring recess which receives the thickened margin.

This design results in an increase in the security against rotation and also in an increased in the resistance to pressing out.

Figure 1B:
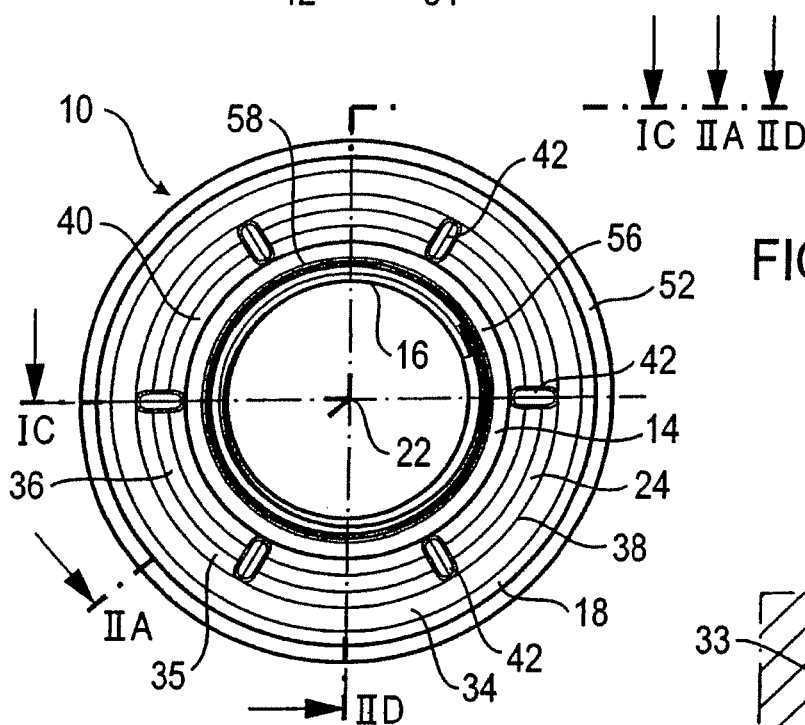
Figure 1D:
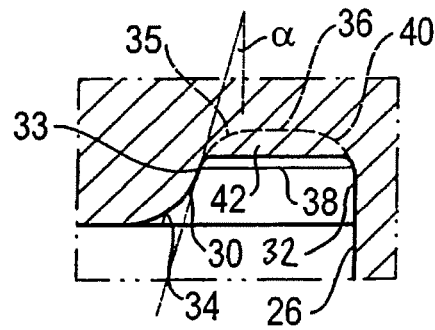
Figure 1C:
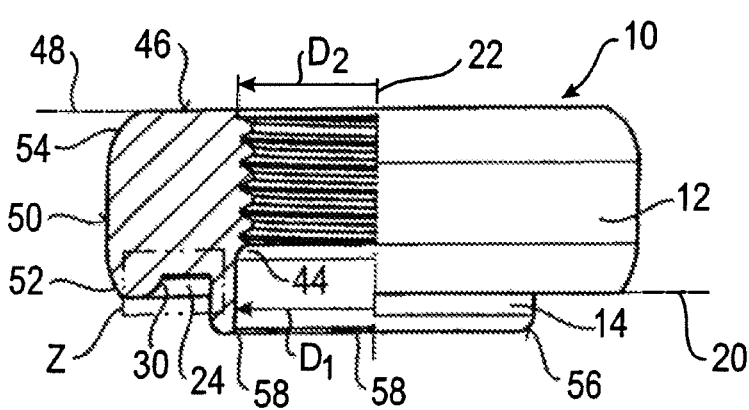
Figure 2A:
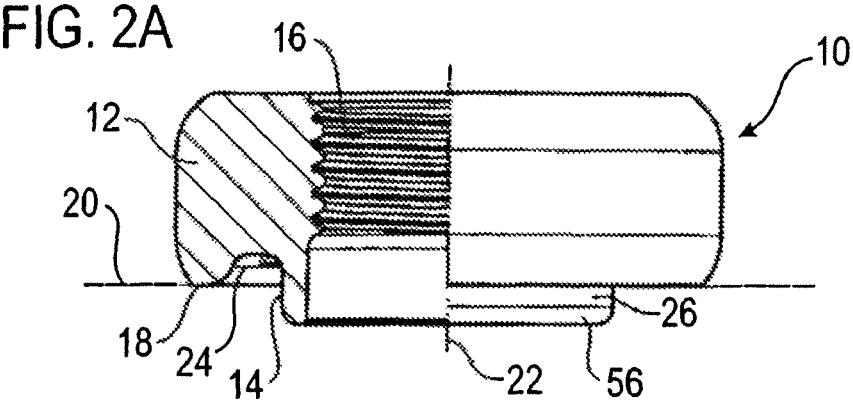
Figure 2B:
Figure 2C:
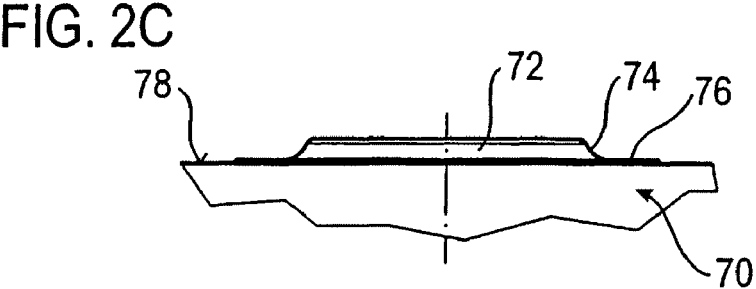
Figure 2D:
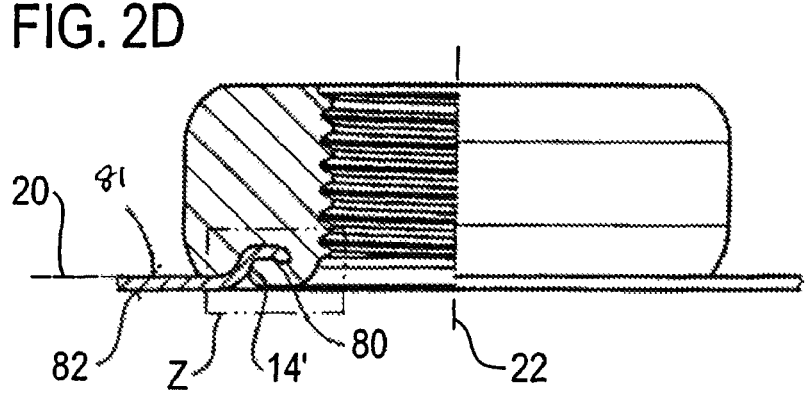
Figure 2E:
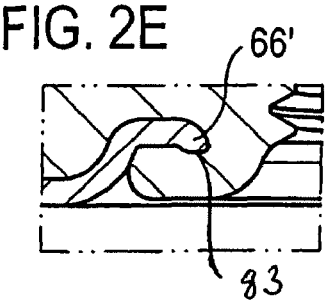
Figure 2F:
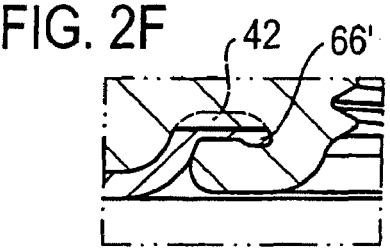
Figure 3A:
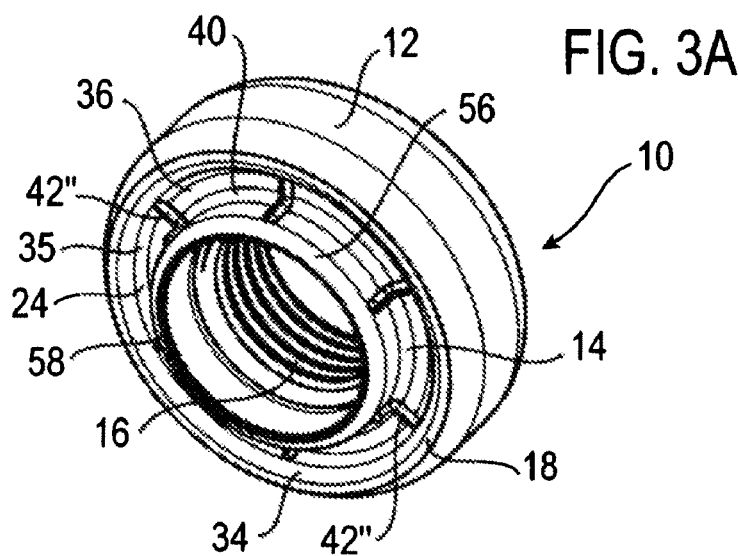
Figure 3B:
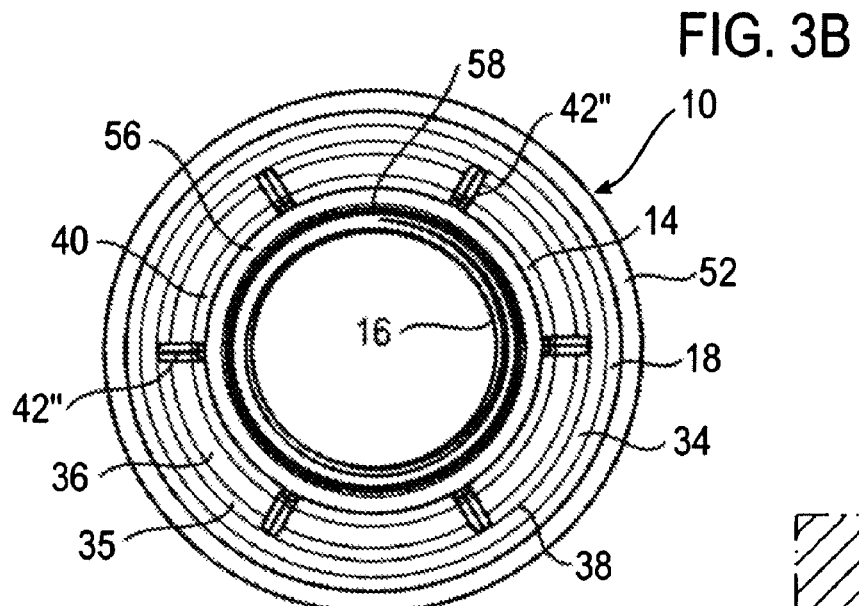
Figure 3D:
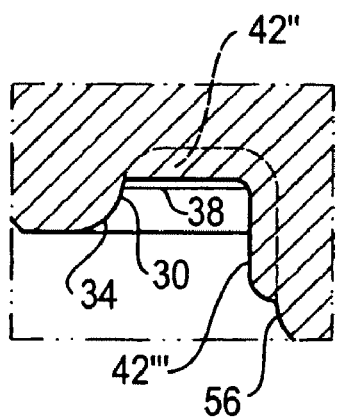
Figure 3C:
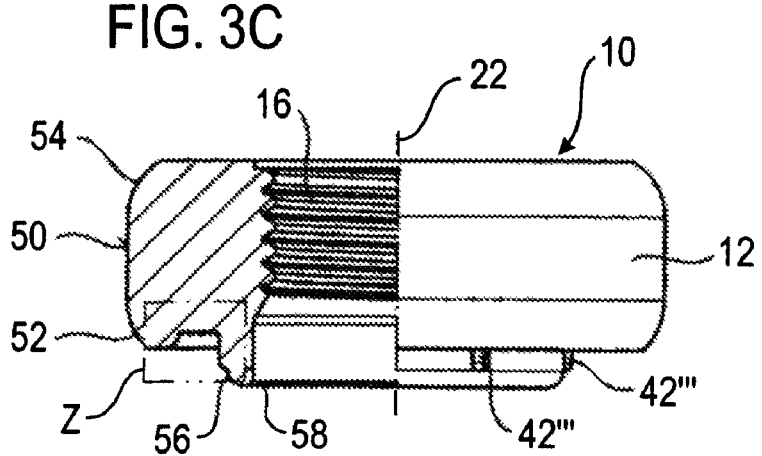
Figure 4A:
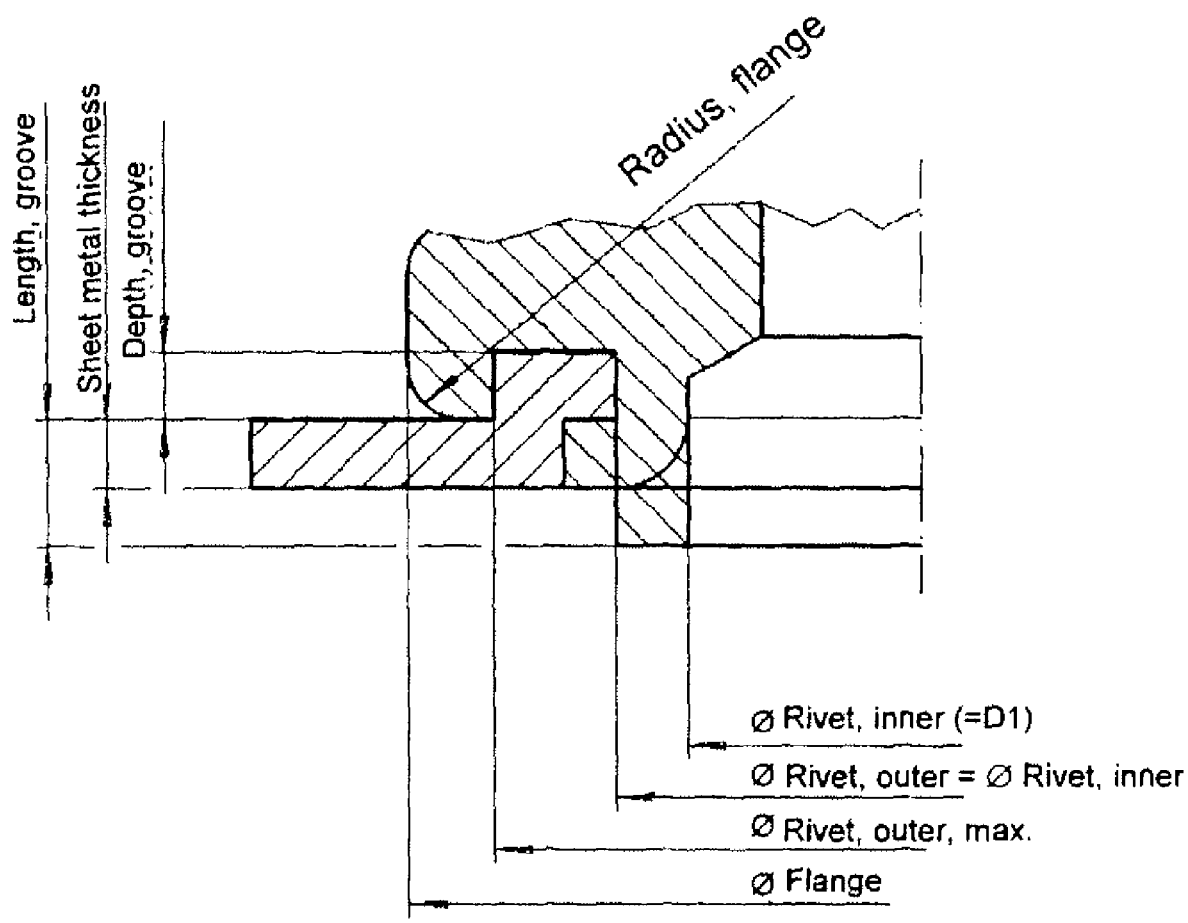

The invention will be explained in more detail in the following with reference to an embodiment and to the drawing, in which are shown:

FIG. 1A a perspective representation of a rivet nut in accordance with the invention;

FIG. 1B a plan view of the rivet nut of FIG. 1A corresponding to the arrow direction 1B;

FIG. 1C a partly sectioned representation and side view of the rivet nut of FIGS. 1A and 1B according to the plane IC-IC of FIG. 1B;

FIG. 1D a detailed drawing of the region Z of the representation in accordance with FIG. 1C;

FIG. 2A a partly sectioned representation and a representation shown partly in a side view of the rivet nut of FIGS. 1A-1D according to the plane 2A-2A of FIG. 1B;

FIG. 2B a sectioned view of a sheet metal part for use with the rivet nut according to FIG. 2A;

FIG. 2C a side view of a die for use with the sheet metal part of FIG. 2B and of the rivet nut of FIG. 2A for the formation of the rivet bead;

FIG. 2D a representation of the component assembly which arises by the riveting of the rivet nut in accordance with FIG. 2A and using the sheet metal part according to FIG. 2B while using the die of FIG. 2C, with the representation of FIG. 2D taking place partly in section and partly in a side view;

FIGS. 2E, 2F two different enlarged representations of the detail Z, and indeed once (FIG. 2E) at a point at which no rib providing security against rotation is provided, and once (FIG. 2F) at a point where the sectional plane is placed through the rib providing security against rotation; and FIGS. 3A-3D drawings in accordance with the drawings of FIGS. 1A-1D, but of a further rivet nut in accordance with the invention;

FIG. 4A a schematic representation for the explanation of the design of a groove rectangular in cross-section for the purpose of the present invention;

FIG. 4B a table setting forth the abbreviations used in the calculation;

FIG. 4C a tabular compilation of the result of the calculation for four thread sizes M6, M8, M10 and M12;

FIGS. 5A-5M different possible cross-sectional shapes for the ring groove of an element in accordance with the invention;

FIGS. 6A, 6B-16A, 16B the assembly situation for the groove shapes in accordance with FIGS. 5A-5M for a respective thin metal sheet each and a thick metal sheet each, i.e. the situation in which the rivet nut or the rivet element is riveted to the respective sheet metal part;

FIGS. 17A-17D to 41A-41D different examples for possible security against rotation features which can be used with the rivet nut in accordance with the invention or with the rivet bolt in accordance with the invention;

FIGS. 42A-42E the use of the present invention with a self-punching rivet nut;

FIGS. 43A-43G the use of the present invention with two different rivet bolts.

All the aforesaid Figures are drawn to scale, but enlarged, with only one section of the sheet metal part and of the die being shown. It is generally a case of the representation of elements (rivet nuts or rivet bolts) with an M8 thread. The exception is the rivet nut of FIGS. 42A to 42E which has an M6 thread. The other dimensions can be derived from these indications as required.

First making reference to FIGS. 1A to 1D, they show a rivet nut 10 having a body part 12 and a cylindrical rivet portion 14, with the body part having a centrally arranged thread cylinder 16, a ring-shaped support surface 18 coaxial to the thread cylinder in a plane 20 perpendicular to the longitudinal axis 22 of the thread cylinder (simultaneously the middle longitudinal axis of the rivet nut) and an axially aligned ring groove 34 arranged radially inside the ring-shaped support surface 18 and radially outside the cylindrical rivet portion 14. The ring groove 24 merges on the radially inner side into the outer surface of the cylindrical rivet portion and ribs 42 providing security against rotation are provided in the region of the ring groove 24.

As can in particular be seen from FIG. 1C and FIG. 1D, the ring groove 24 has, seen in an axial sectional plane IC, a U-shaped cross-section with a radially outer side wall 30 which is made relatively steep and has, at the steepest point 33, an inclination α (FIG. 1D) toward the middle longitudinal axis of the rivet nut in the range from approximately 45° to approximately −20°, preferably from approximately 30° to approximately 0°, in this case of α=15°. The steepest point 33 can be formed by an inflection point or inflection region which, as in this example, is formed by two mutually merging radii 34, 35 at the inlet of the ring groove 24 and at the transition from the radially outer side 30 of the ring groove into its base surface 36. The base surface 36 of the U-shaped ring groove is preferably disposed in a radial plane which is perpendicular to the middle longitudinal axis 22 of the rivet nut parallel to the plane 20. The designation "inflection point" naturally applies to the sectional plane which can be seen in FIG. 1C or 1D. Sine there is an infinite number of possible sectional planes around the middle longitudinal axis 22, they form an infinite number of individual inflection points corresponding to a line 38 which can be recognized clearly in FIG. 1D. The base surface 36 of the ring groove 24 merges over a further radius 40 into the outer surface 36 of the rivet portion 14.

In this example, ribs 42 providing security against rotation are present which extend in the radial direction over the base region 36 of the ring groove 24 and have an axial height which amounts to a fraction of the maximum axial depth of the ring groove 24.

The axial depth of the ring groove 24 corresponds approximately to the radial thickness of the cylindrical rivet portion. It is particularly favorable when the volume of the beaded over rivet portion (14' in FIG. 2D) substantially corresponds to the volume of the ring recess 80 (FIG. 2D) of the sheet metal part pressed in the ring groove, and indeed even when this has the result that the axial thickness of the beaded over rivet portion 14 does not correspond to the axial depth of the ring groove 14, i.e. to the spacing between the base surface 36 of the groove and the plane 20 in FIG. 1C or 2A.

The axial height of the ribs providing security against rotation is disposed in the range between 0.2 and 0.6 mm, but should not exceed approximately 85% of the sheet metal thickness provided.

In this example, six ribs 42 providing security against rotation are present; however, this is not critical; for example, from 3 to 24 ribs 42 providing security against rotation can be provided without restriction which are preferably arranged uniformly around the middle longitudinal axis 22 of the rivet nut.

The ribs 42 providing security against rotation extend at their side remote from the base surface of the U-shaped groove in a radial direction, i.e. in a radial plane which is perpendicular to the middle longitudinal axis 22 of the rivet nut.

The inner diameter $D_1$ of the cylindrical rivet portion (FIG. 1C) is slightly larger than the outer diameter $D_2$ of the thread cylinder and merges into it via a threaded run-in 44.

The end face side 46 of the rivet nut remote from the rivet portion 14 is disposed at least substantially in a plane 48 which is perpendicular to the middle longitudinal axis 22 of the rivet nut 10.

It can be seen clearly from the Figures, in particular from FIG. 1C, that the jacket surface 50 of the rivet nut 10 merges over two rounded surfaces 52 and 54 into the ring-shaped sheet metal support surface 18 or the end face side 46. It is also not a case of clear radii here, but rather of surfaces which arise by the manufacture of the element by means of an impact molding process.

If the element, as is also possible, is manufactured in a progressive tool in accordance with the aforesaid PCT application PCT/EP2006/125634, it has, instead of the circular shape in accordance with the enclosed Figures, a rectangular shape, with smaller radii then only being present at two opposite sides of the element, and indeed at the transition from these sides into the corresponding sheet metal support surface and into the corresponding end face side. With a rectangular or square or polygonal element, the sheet metal support surface 18 is likewise to be called ring-shaped; it has a circular inner boundary and an outer, more square or polygonal boundary.

Finally, FIG. 1C shows that the rivet portion 14 has a rounded portion 56 outwardly at its free end face and inwardly a conical, or also rounded, surface 58. This inner conical or rounded surface is of advantage in the riveting process here which will be described in more detail in the following in connection with FIGS. 2A-2F.

The rivet nut 10 in accordance with FIGS. 1A-1D can again be seen in FIG. 2A, but here partly sectioned and in a side view in accordance with the plane IIA-IIA of FIG. 1B. A sheet metal part 60 is located directly thereunder and aligned thereto with a boss 62 which is circular in plan view and is perforated to form a circular hole 64 with a hole margin 66.

The centrally arranged hole 64 has a middle longitudinal axis which is aligned with the middle longitudinal axis 22 of the rivet nut 10. The outer shape of the boss 62 corresponds at least substantially to the inner shape of the ring groove 24. The diameter of the hole 64 is dimensioned such that it at least substantially corresponds to the outer diameter of the cylindrical rivet portion 14 or is possibly slightly smaller or larger than it. If the hole 64 is selected to be somewhat smaller in diameter than the rivet portion 14, the rounded surface 56 at the free end face of the rivet portion 14 has the result that the hole is slightly stretched and calibrated when the rivet nut is pushed though the hole, which is necessary to carry out the riveting procedure. A die 70 is located beneath the sheet metal part 60 in FIG. 2C and has a middle projection 72 which merges over a concave radius or a shoulder 74 into a circular surface 76 which projects slightly, for example by less than 0.2 mm, above the free end surface 78 of the die. The middle shaped projection 72 of the die 70 is dimensioned such that it cooperates with the conical surface or the rounded surface 58 of the free end face end of the rivet portion to roll or fold the rivet portion radially outwardly in the riveting process to form the rivet bead 14' in accordance with FIG. 2D. This riveting process can be carried out, for example, in a manner known per se in a press, in a C rack or by a robot.

The riveted state of the rivet nut can be seen clearly from the further FIGS. 2D-2F. In the riveted state, the sheet metal part 60 is provided in the region of the rivet portion with a raised portion 62' which is at least substantially matched to the shape of the U-shaped groove 24. On its side remote from the U-shaped groove, the sheet metal part 60' has a ring recess 80 which is similar to the groove shape, but which is smaller than the U-shaped ring groove 24. The beaded over rivet portion 14 is disposed completely within the ring recess 80 and does not project beyond the side of the sheet metal part remote from the thread cylinder 16. The upper side of the sheet metal part is disposed in the plane 20 outside the rivet nut which is to be understood as a continuation of the plane of the ring-shaped sheet metal support surface. Further away from the rivet nut 10, the sheet metal part can easily have a special shape which differs from the plane 20. It is only important that the sheet metal part is disposed in the plane 20 in a limited region radially outside the rivet nut 10.

Metal sheets of different thicknesses can be used with an embodiment of the rivet nut, for example such that the thickness of the sheet metal part 60 is in the range between 0.6 mm and 2.5 mm, preferably between 0.6 mm and 1.5 mm.

The volume of the U-shaped ring recess 80 of the sheet metal part corresponds at least substantially to the volume of the beaded over rivet portion.

It can be seen from FIGS. 2E and 2F that the ribs 42 providing security against rotation engage in shape matched manner from above into the sheet metal material, but do not cut through it.

It can furthermore be seen from FIGS. 2E and 2F that the margin 66' of the sheet metal part 60 is made in thickened or bead-like form in the region of the perforation 64 through which the rivet portion 14 extends and that the rivet bead 14' is provided with a corresponding ring recess 82 on the side facing the thread cylinder 16 which receives the thickened margin and it.

FIGS. 3A-3D show a further rivet nut 10 in accordance with the invention which is very similar to the rivet nut of FIGS. 1A-1D or of FIGS. 2A-2F. For this reason, features of the rivet nut in accordance with FIGS. 3A-3D, which coincide with those of the previous Figures or which have the same function, are provided with the same reference numerals and it is understood that the previous description also applies to these features and does not have to be repeated separately.

The major difference between the embodiment in accordance with FIGS. 3A-3D and the previous embodiment is that the ribs 42 providing security against rotation are not only present in the region of the base surface 36 of the ring groove 24, but also extend in raised form along the cylindrical rivet portion, as shown at 42''. In this example, the ribs 42'' providing security against rotation extend directly to the rounded portion 56 at the outer side of the free end face of the rivet portion 24.

It is, however, likewise conceivable to make the ribs 42'' providing security against rotation in accordance with the unpublished German application 102006000918.5 of Jan. 5, 2006 whose disclosure is made part of the disclosure of the present application.

Furthermore, the region of the ribs 42 providing security against rotation which is provided at the base surface 36 of the ring groove 24 can be omitted so that ribs 42'' providing security against rotation are only provided at the rivet portion 14.

With reference to FIGS. 4A and 4B, it is now shown in an approach how the cross-section of a rectangular U-shaped groove can be calculated to satisfy the demand that the ring recess 80 always has a volume for a range of sheet metal thicknesses which is able to receive the volume of the beaded over rivet portion, with the volume of the beaded over rivet portion reducing as the sheet metal thickness increases.

FIG. 4A shows in a schematic form the design of the element in the region of the ring groove and the table in accordance with FIG. 4B contains the definition of the dimensions of the element which are of importance for the design of the rectangular groove.

The calculation procedure is as follows:
It results from preset geometrical conditions:

$$\emptyset_{Nmax} = \emptyset_{F1} - 2*B_{F1} \tag{1}$$

The width of the support surface is calculated from the surface pressure to be exerted as a maximum by this surface in dependence on the maximum bolt force fixed according to DIN.

$$A_{Fl} \geq \frac{F_{Bmax}}{P_{max}} \tag{2}$$

from geometrical considerations, the following can also be written:

$$A_{Fl} = \frac{((\emptyset_{Fl} - 2*R_{Fl})^2 - \emptyset_{Nmax}^2)*\pi}{4} \tag{3}$$

the maximum permitted outer diameter $\emptyset_{Nmax1}$ of the groove can now be derived from (2) and (3):

$$\emptyset_{Nmax} = \sqrt{(\emptyset_{Fl} - 2*R_{Fl})^2 - \frac{4*F_{Bmax}}{\pi*P_{max}}} \tag{4}$$

The minimum permitted inner diameter $\emptyset_{Nmin}$ is equal to the outer diameter of the rivet:

$$\emptyset_{Nmin} = \emptyset_{Na} \tag{5}$$

The groove must receive the beaded over rivet independently of the sheet metal thickness. In a first approximation, the volume of the rivet portion can thus be set equivalent to that of the groove:

$$V_N = \frac{(\emptyset_{Na}^2 - \emptyset_{Ni}^2)*\pi}{4}*l_N = \frac{(\emptyset_{Nmax}^2 - \emptyset_{Nmin}^2)*\pi}{4}*l_N \tag{6}$$

The depth of the groove thus becomes:

$$t_N = \frac{\emptyset_{Na}^2 - \emptyset_{Ni}^2}{\emptyset_{Nmax}^2 - \emptyset_{Nmin}^2}*l_N \tag{7}$$

The check is made for common sheet metal thicknesses with reference to the actual circumstances after the riveting.

The table of 4C then shows the coincidence between the volume of the ring recess "of the residual groove" and the calculated volume of the beaded over part of the rivet portion "of the residual rivet" for different sheet metal thicknesses. It can be seen from the last three columns of FIG. 4C that it is possible to adapt the respective volume of the residual rivet to the volume of the residual groove for different thread diameters (left hand column of FIG. 4C). It must in another respect be pointed out with regard to the table of FIG. 4C that the column "Bolt force, max" gives the values in accordance with DIN for screw bolts with metric thread in the sizes 6 mm, 8 mm, 10 mm and 12 mm. It can be seen from the adjacent column "Surface pressure" that the surface pressure is within the normal range. All dimensions are given in mm and al volumes in mm³, the bolt force in Newtons and the surface pressure in Newton/mm².

The table in accordance with FIG. 4C is obvious with respect to the values given and does not need any further explanation.

This calculation, however, ignores the volume of the security against rotation features provided. They can, however, be included in a refined calculation and can also be selected in part such that a better matching of the volume of the residual rivet to the volume of the residual groove takes place for a plurality of sheet metal thicknesses.

The calculation explained above naturally only applies to a ring groove 24 with a strictly rectangular cross-section. However, corrections for any radii present or for cross-sectional shapes of the ring groove differing from a rectangular cross-section can easily be made.

It was already expressed above that the ring groove 24 generally having a U-shaped cross-section permits different freedoms in the selection of the precise cross-sectional shape. FIGS. 5A-5M give examples for the specific choice of the U shape.

In the description of FIGS. 5A to 5M and of the further Figures up to FIGS. 41A to 41D, the same reference numerals are used as in connection with the previous Figures, but the reference symbols are in part provided a lower-case letter for distinction. It is understood that the previous description also applies to parts or features having the same reference numerals with or without reference numerals unless anything different is stated. New features are provided with new reference numerals.

Figure 5A:
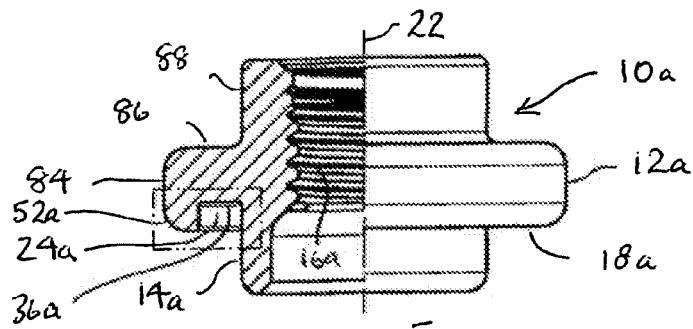

FIG. 5A show an element 10a which is very similar to the element of FIG. 4A, but has a stepped shape of the body part 12A. In the specific embodiment of the element of FIG. 5A, the body part 12a has a cylindrical section 84 which has the ring-shaped support surface 18a and which merges over a ring shoulder 86 which extends in the radial direction and serves as a pressure shoulder in the attachment of the rivet nut in a cylindrical section 88 of smaller transverse dimension in comparison with the named cylindrical section 84. In this respect, the thread cylinder 16a is located partly in the offset cylindrical section 88 of smaller transverse dimension and partly in the body part 12a of the element, but does not substantially extend beyond the base surface 36a of the U-shaped groove 24a (which also applies in the elements of FIGS. 1 to 3). The cross-sectional shape of the rectangular groove 24a in accordance with FIG. 5A is shown at a large scale in FIG. 5B. It can be seen that here the ring groove 24a has a U shape and that rounded corners 90a, 92a are present which have a relatively small radius, for example less than one tenth of the axial depth ($t_N$, FIG. 4) of the ring groove 24a.

A cross-sectional shape is therefore present here to which basically the calculation applies which was explained in connection with FIGS. 4A-4C.

Figure 5B:
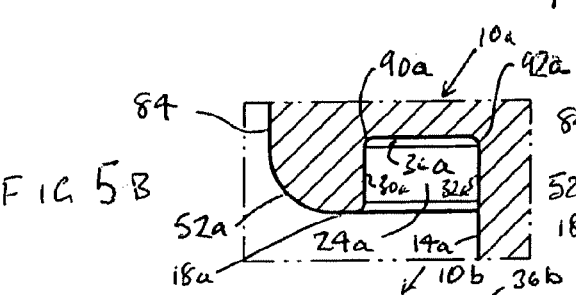
Figure 5C:
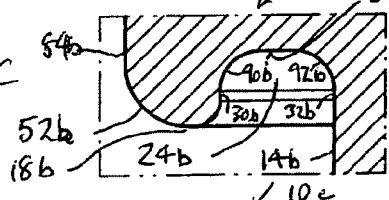

An alternative to this is shown in FIG. 5C. Here, the ring groove 24b has a U shape with the base region in a plane perpendicular to the middle longitudinal axis 22 of the rivet nut and with rounded corner 90b, 92b in the region of the transition of the base region 36b into the side walls of the ring groove 24b, with the rounded corners 90b, 92b having a relatively large radius, for example in the range between two thirds and one fifth of the axial depth ($t_N$, FIG. 4) of the ring groove 24b.

Since the rounded corners 90b, 92b have larger radii in comparison with FIG. 5B, the region of the radially inner wall 32b and of the radially outer wall 30b, which are parallel to the middle longitudinal axis 22 of the element, i.e. it has, at the steepest point, an inclination to the middle longitudinal axis of the rivet nut 0°, is much shorter than in the embodiment in accordance with FIG. 5B.

Figure 5D:
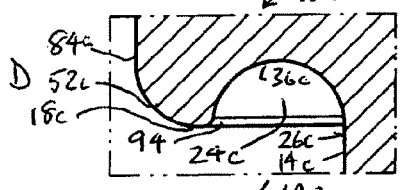

A further alternative cross-sectional shape is shown in FIG. 5D. Here, the ring groove 24c has a U shape, with a curved base region 36c with an approximately circular shape which extends, however, over less than 180°, for example in the range between 180° and 150°, said base region running out into the ring-shaped support surface 18c either directly over a small radius 94, for example in the range between one fifth and one tenth of the maximum axial depth of the ring groove, and merging more or less gently into the cylindrical outer surface 26c of the rivet portion 14c or running out into the ring-shaped support surface over a straight portion (not shown) and a relatively small radius and merging more or less gently into the cylindrical outer surface. Since the angle is less than 180°, the radial outer side wall has an angle to the middle longitudinal axis of the rivet nut with a positive sign.

Figure 5E:
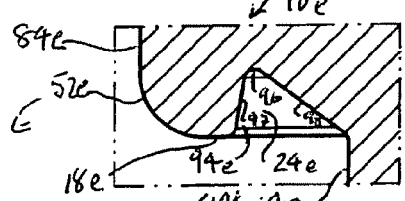
Figure 5F:
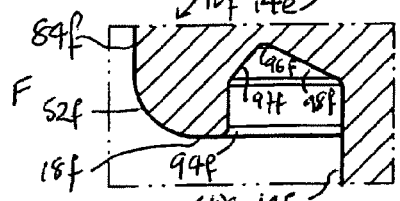
Figure 5G:
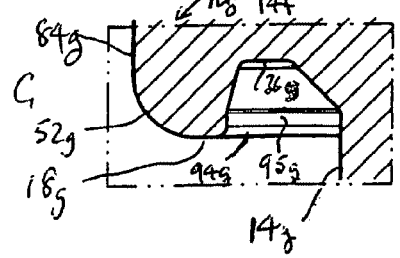
Figure 5H:
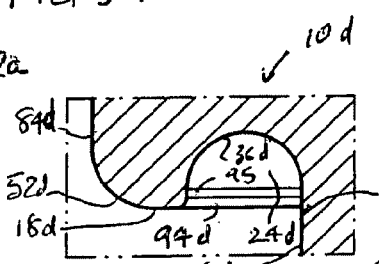

Alternatively to this, the ring groove 24d can have a U shape as shown in FIG. 5H, with a curved base region 36d with an approximately circular shape which extends, however, over 180° or more, for example in the range between 180° and 210°, said base region running out into the ring-shaped support surface either directly over a small radius 94d, for example in the range between one fifth and one tenth of the maximum axial depth of the ring groove, and merging more or less gently into the cylindrical outer surface of the rivet portion or—as shown—running out into the ring-shaped support surface over a straight portion 95 and a relatively small radius and merging more or less gently into the cylindrical outer surface 26d. Since the angle is larger than 180°, the radial outer side wall has an angle to the middle longitudinal axis of the rivet nut with a negative sign.

The shape in accordance with FIG. 5E can be considered as a further alternative where the ring groove has a cross-sectional shape tending toward a V shape with a relatively small or relatively large radius 96 in the base region which has a size, for example, of less than half the maximum depth ($t_N$, FIG. 4) of the ring groove 24e, with the radially outer side 97 of the groove 24e having a steeper angle than its radially inner side 98.

There is also the possibility of so-to-say combining a groove shape in accordance with FIG. 5E with a rectangular groove, whereby the groove shape of FIG. 5F results. Here, the ring groove has a U shape, with the radially outer side 97f of the groove having a steeper angle than its radially inner side 96f.

As further possible modifications (not shown), the radially inner side of the groove could have a steeper angle than the radially outer side or both sides could have at least substantially the same inclination. The base surface of the groove can also, as shown in FIG. 5G, instead of a simple rounded portion, have a surface 36g which extends in a plane which is perpendicular to the middle longitudinal axis 22 of the element.

Figure 5I:
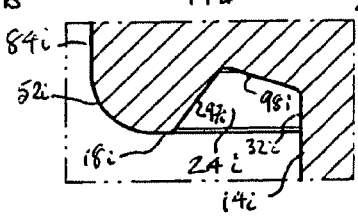
Figure 5J:
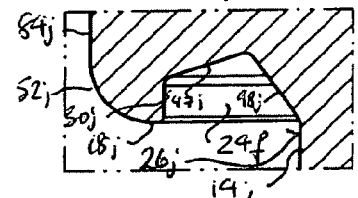
Figure 5K:
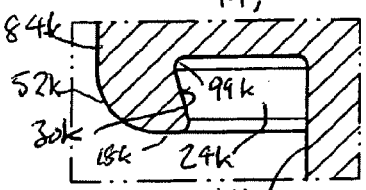

Further alternatives consist, as shown in FIGS. 5I and 5K, of giving the ring groove 24i or 24j a U shape which is similar to the U shape of FIG. F5 or 5G, with one of the radially inner sides 98j and of the radially outer side 97j of the U shape, however, merging directly (except for a radius such as 94i or 94j) into the ring-shaped support surface 18k or into the cylindrical surface 26j of the rivet portion 14j.

Figure 5L:
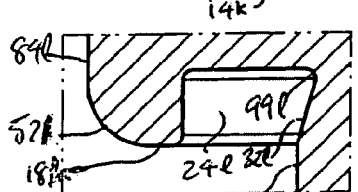
Figure 5M:
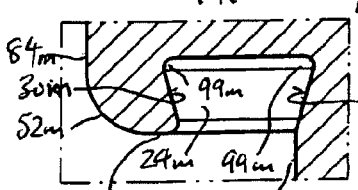

There is further the possibility, as shown in FIGS. 5K, 5L and 5M, of giving the ring groove 24k, 24l or 24m a U shape similar to the U shape of FIG. 5B or 5C, with at least one of the radially inner side 23l or 32m and of the radially outer side 30k or 30m of the U shape, however, forming an undercut 99k, 99l or 99m. In FIGS. 5K and 5M, the corresponding radially outer wall 30k or 30m has, at the steepest point, i.e. over the total straight portion of the radially outer wall, an angle to the middle longitudinal axis of the rivet nut with a negative sign, here with an angle of approximately −15°.

Figure 6A:
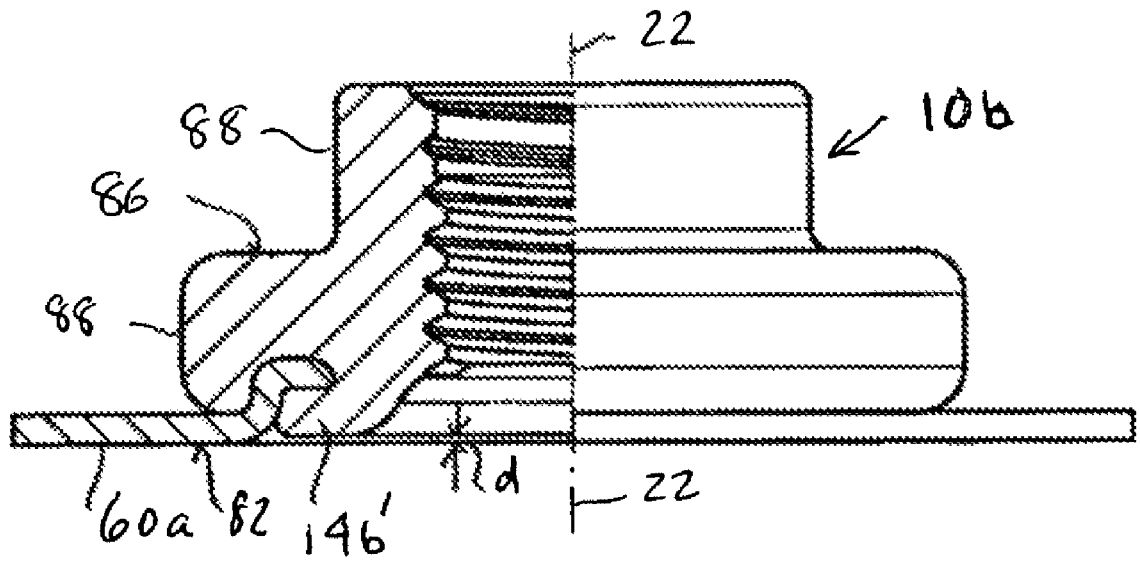
Figure 6B:
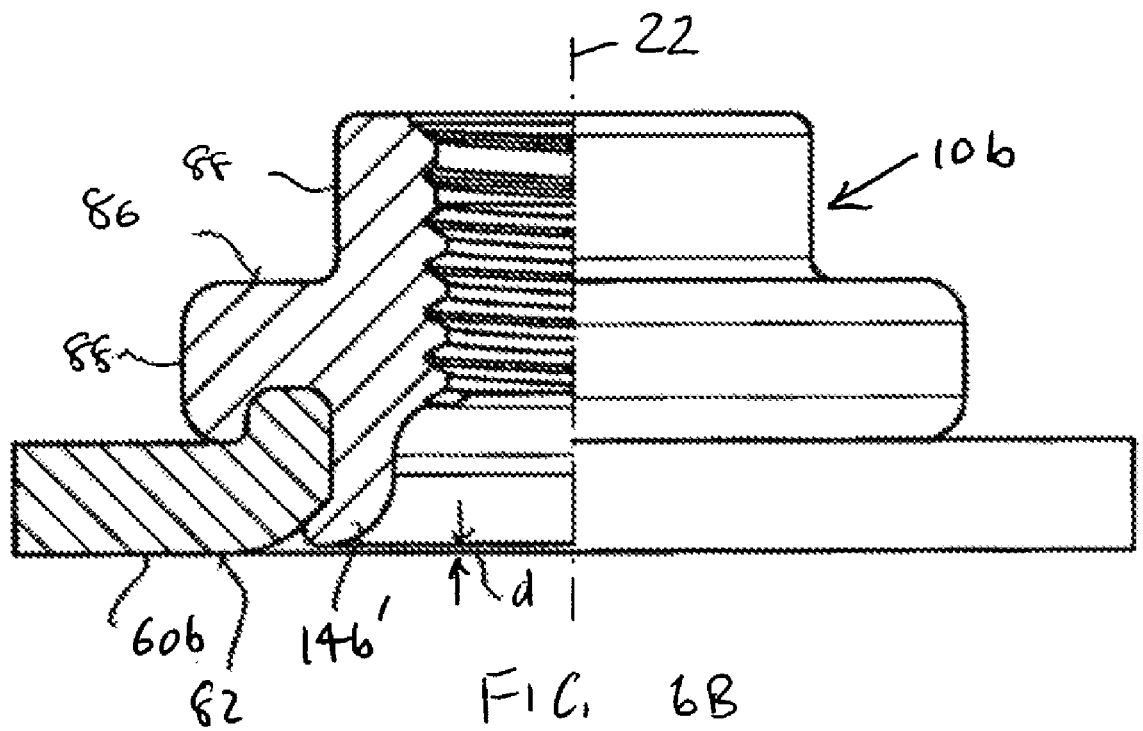

The following FIGS. 6A, 6B up to and including 16A, 16B now show how, in each case for a thin metal sheet 60a and for a thick metal sheet 60b, the rivet nut/sheet metal connection is formed for each of the embodiments of FIGS. 5C to 5M. These drawings are to scale and are drawn in a scale of 4:1 so that they are all M8 elements. The shape of the ring groove of FIGS. 5A and 5B corresponds almost identically to the shape of the ring groove in FIG. 4A so that a corresponding representation is not shown for this embodiment.

It can be seen from FIGS. 6A, 6B to 16A, 16B that is always possible for both thin and thick metal sheets to carry out the riveting such that the rivet bead 14b'-14m' is disposed at least substantially aligned with the lower side 82 of the sheet metal part 60a, 60b in the region of the ring-shaped support surface or is slightly set back beneath this sheet metal surface, with a spacing d of approximately 0.2 mm being permitted since such a spacing between the component assembly (as shown) and the screwed on component (not shown) is not irritating in the screw-on situation, actually serves the direct clamp in the region of the ring-shaped contact surface.

It can furthermore be seen from these examples that the desired direct clamp can always be reached and that the rivet bead is always able to hold the sheet metal part clamped in the U-shaped groove of the respective element in tight contact against any security against rotation features (not shown).

Figure 7A:
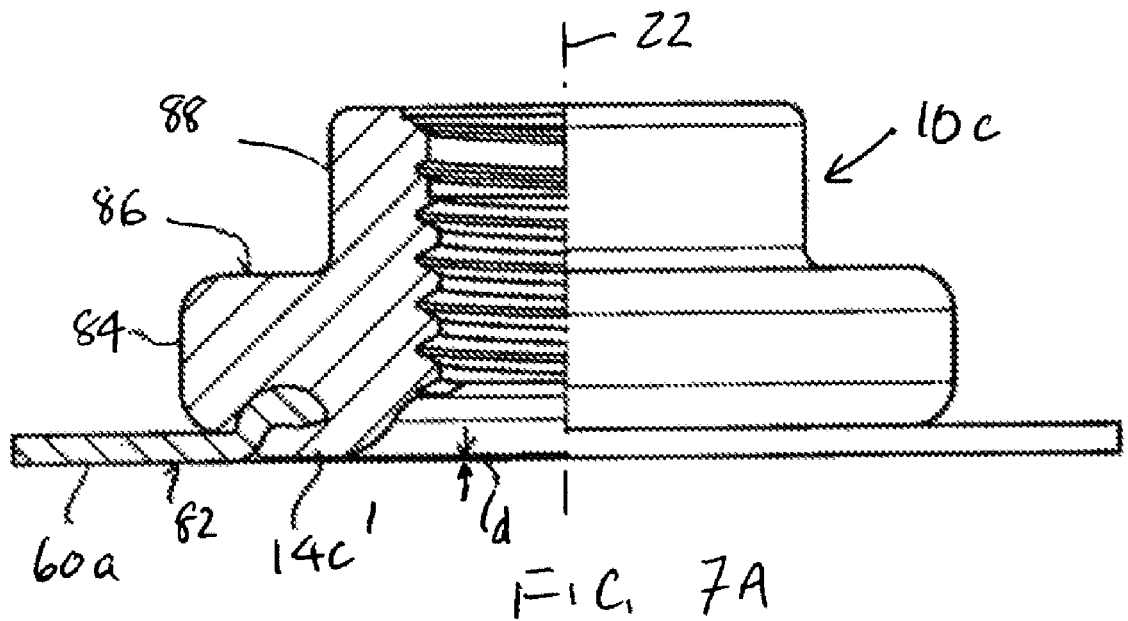
Figure 7B:
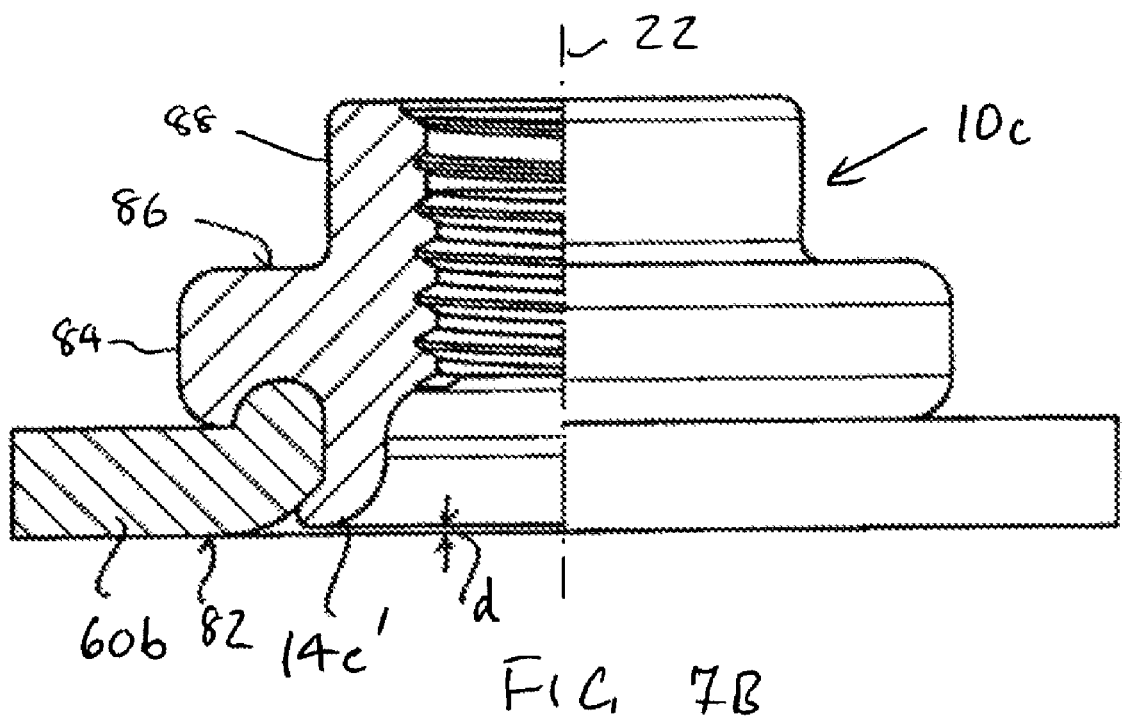
Figure 8A:
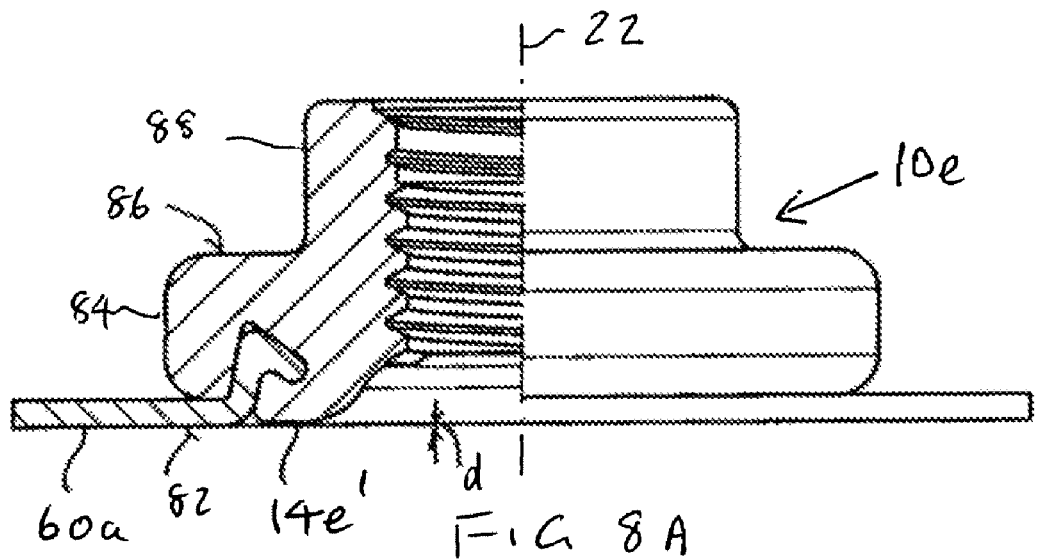
Figure 8B:
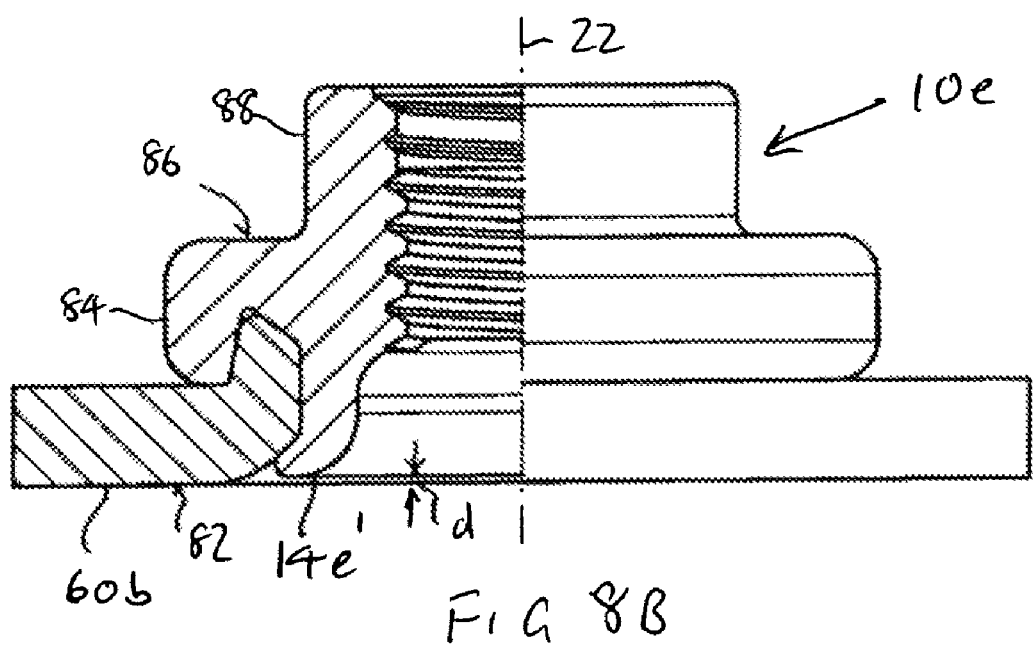
Figure 9A:
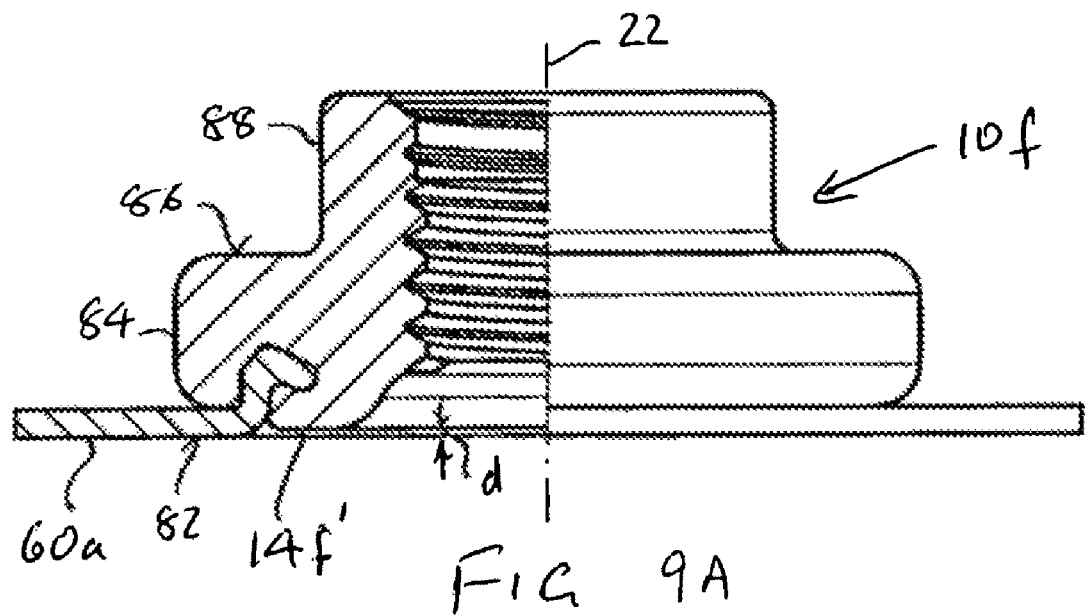
Figure 9B:
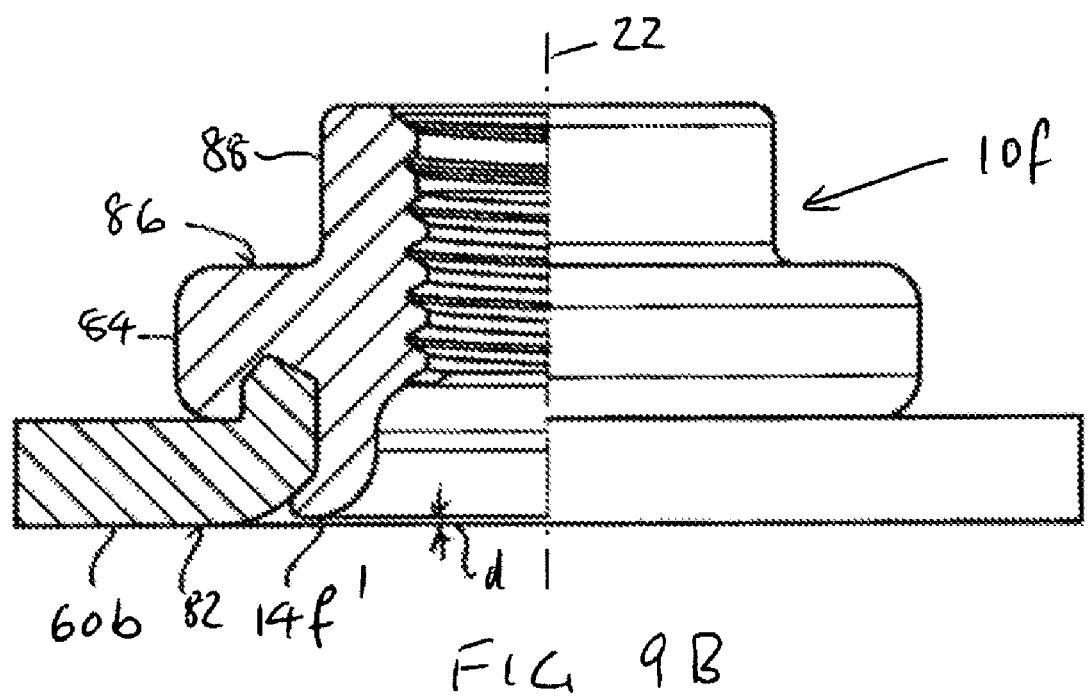
Figure 10A:
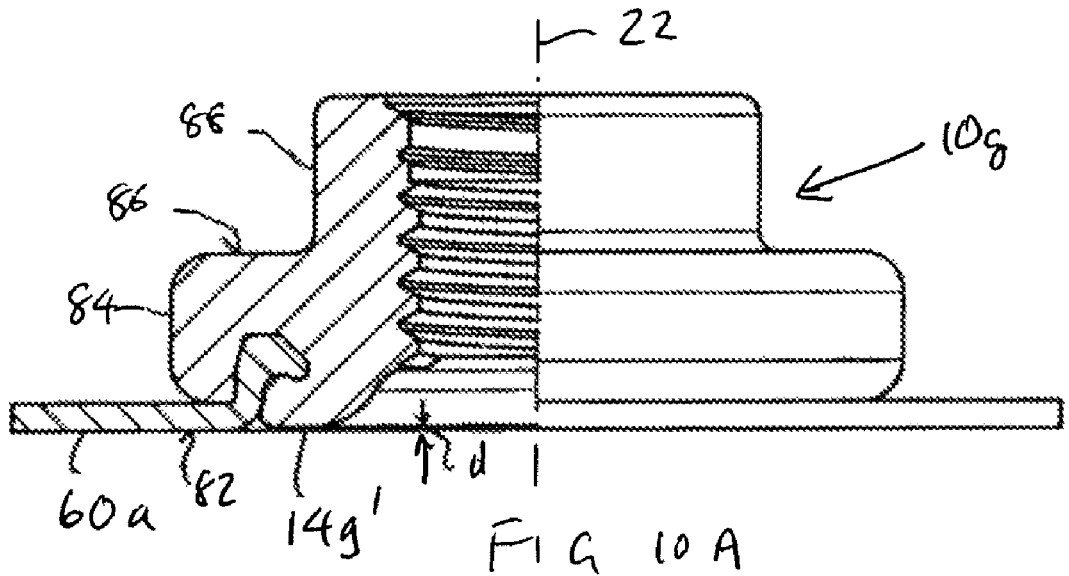
Figure 10B:
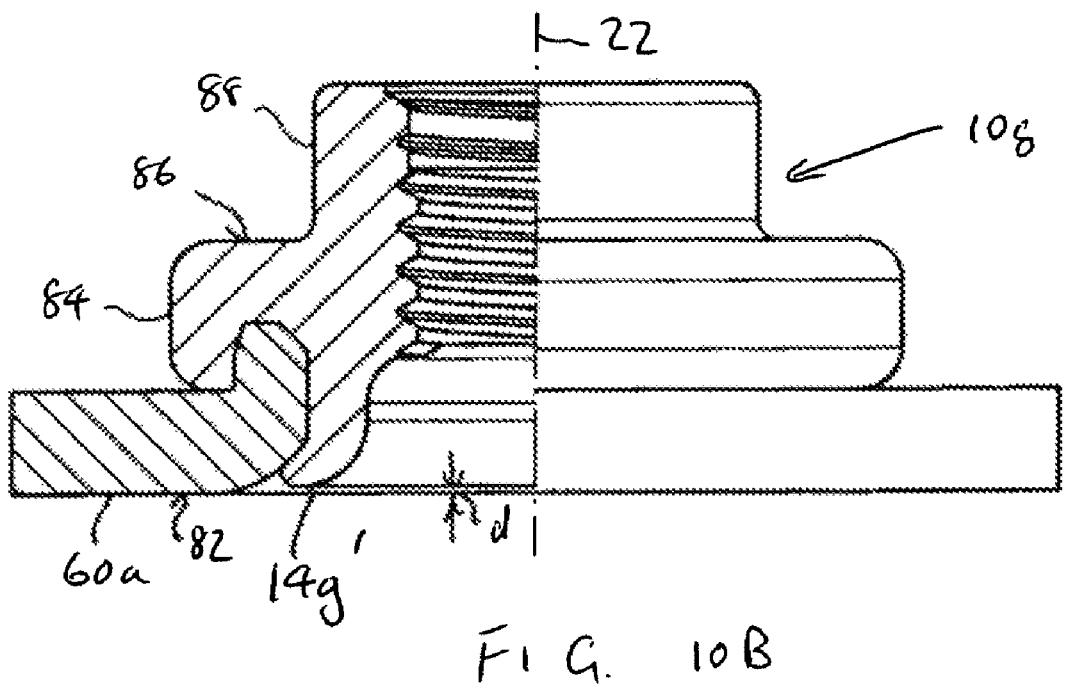
Figure 11A:
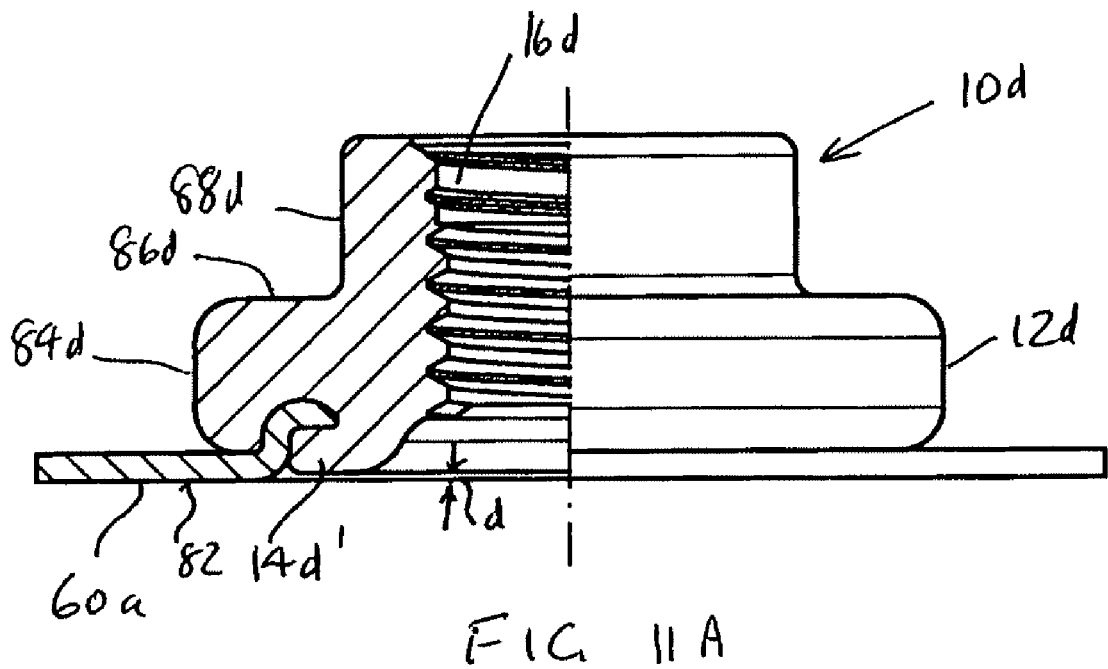
Figure 11B:
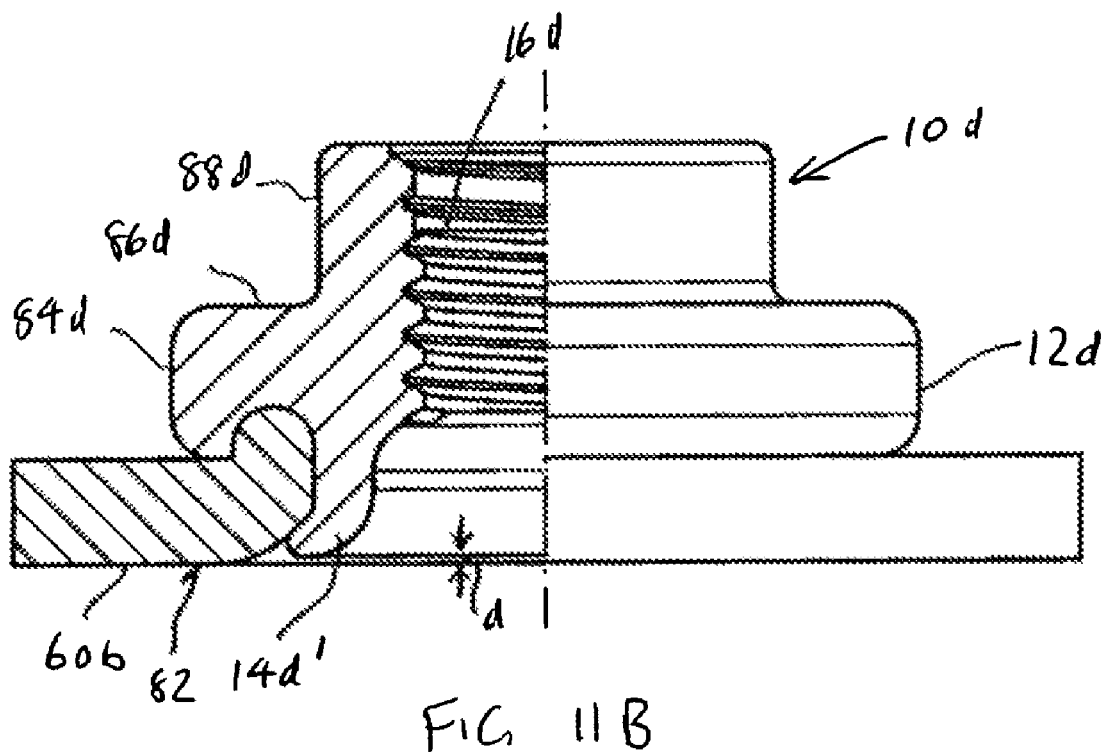
Figure 12A:
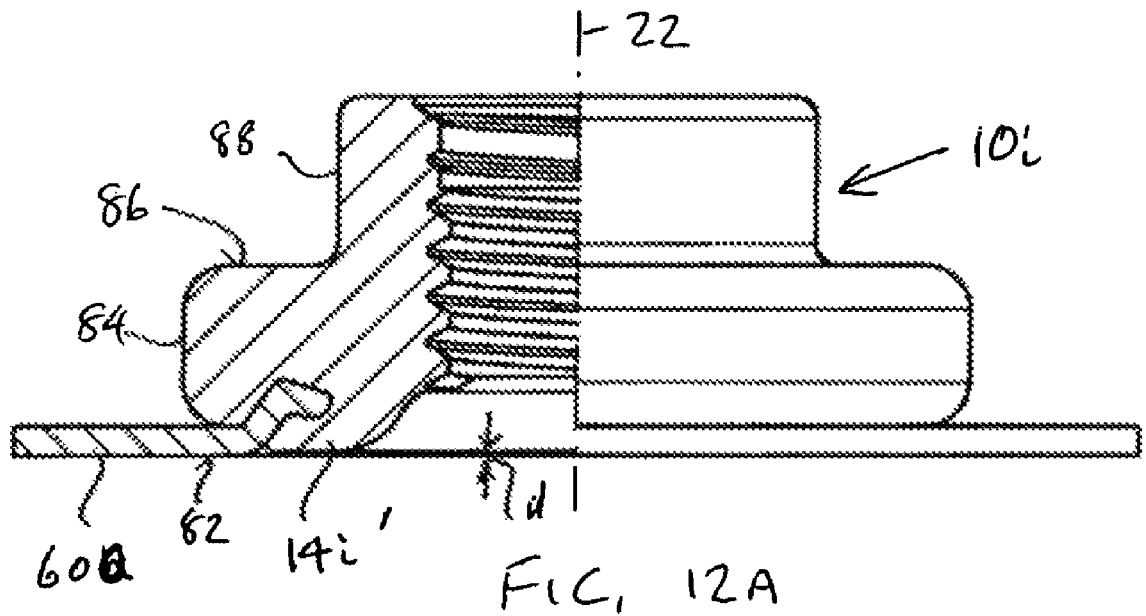
Figure 12B:
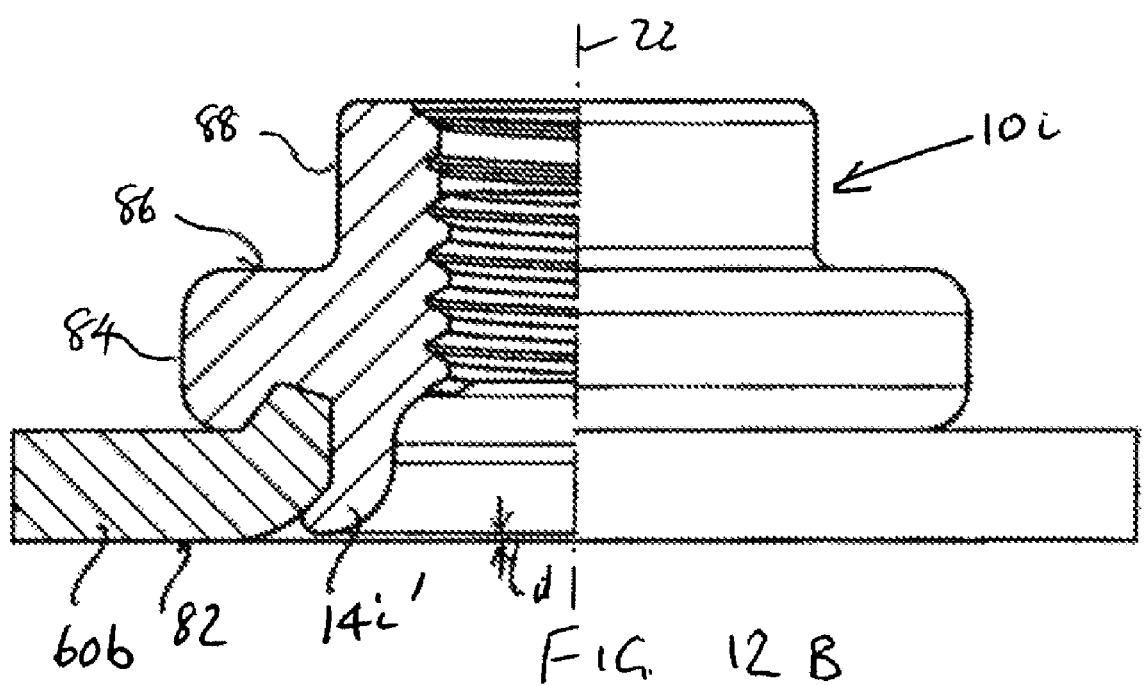
Figure 13A:
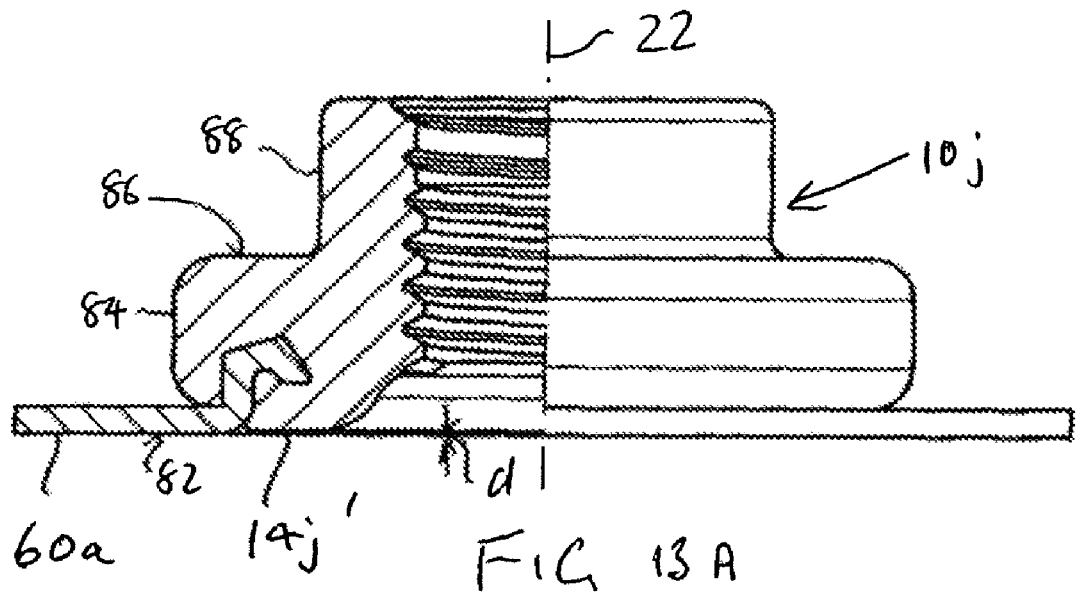
Figure 13B:
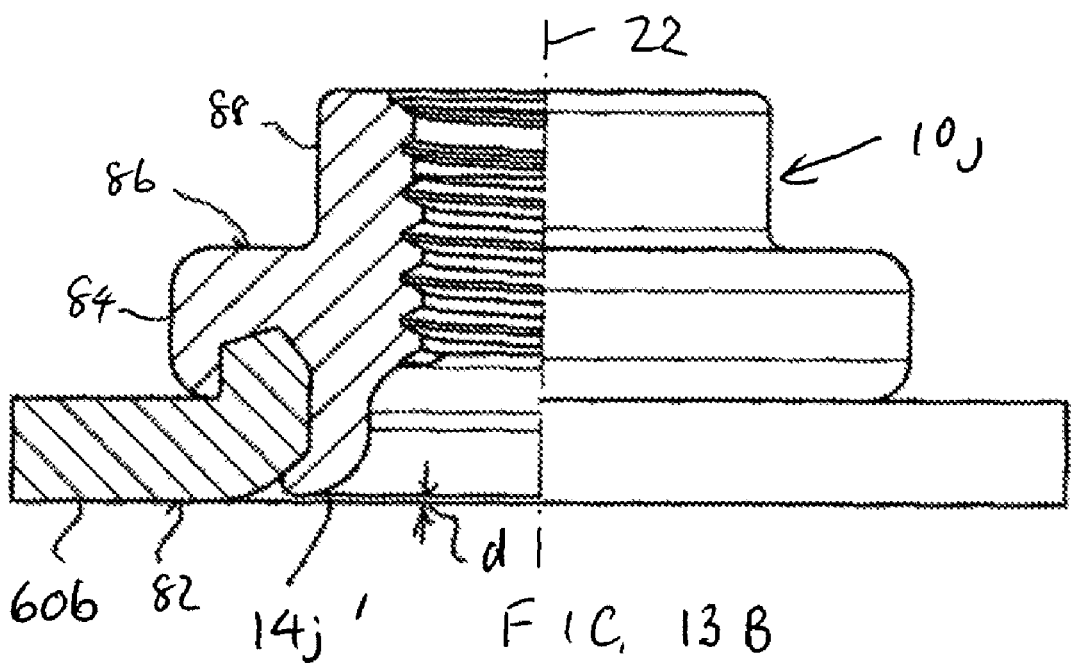
Figure 14A:
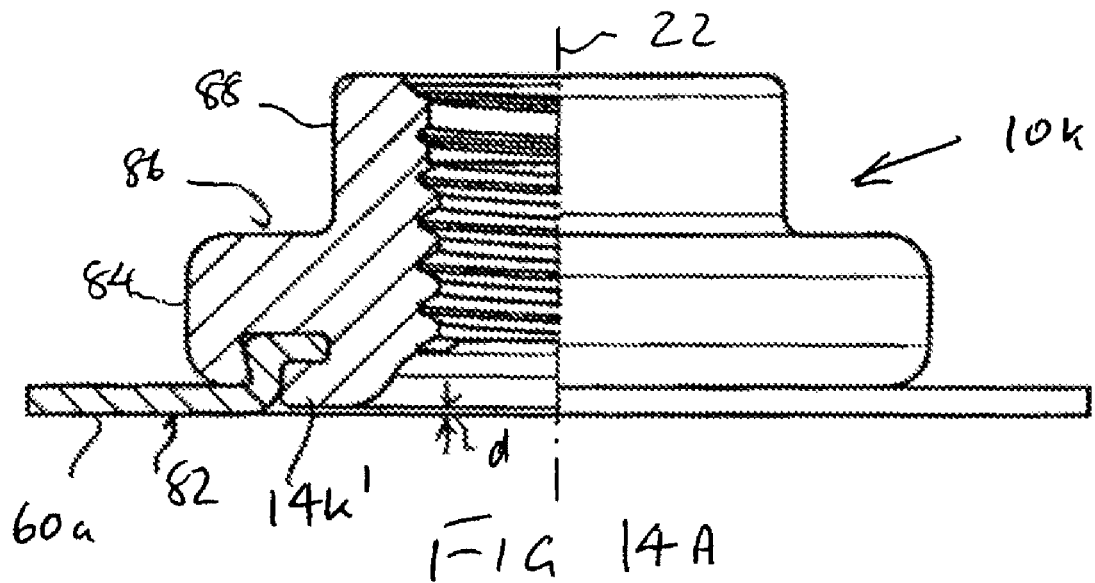
Figure 14B:
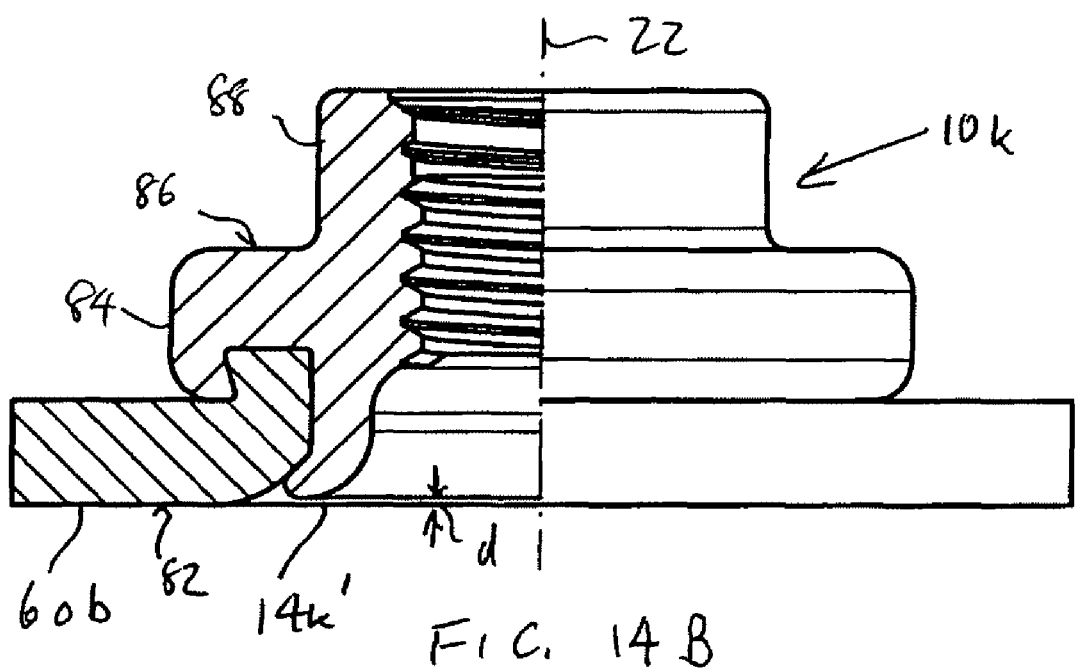
Figure 15A:
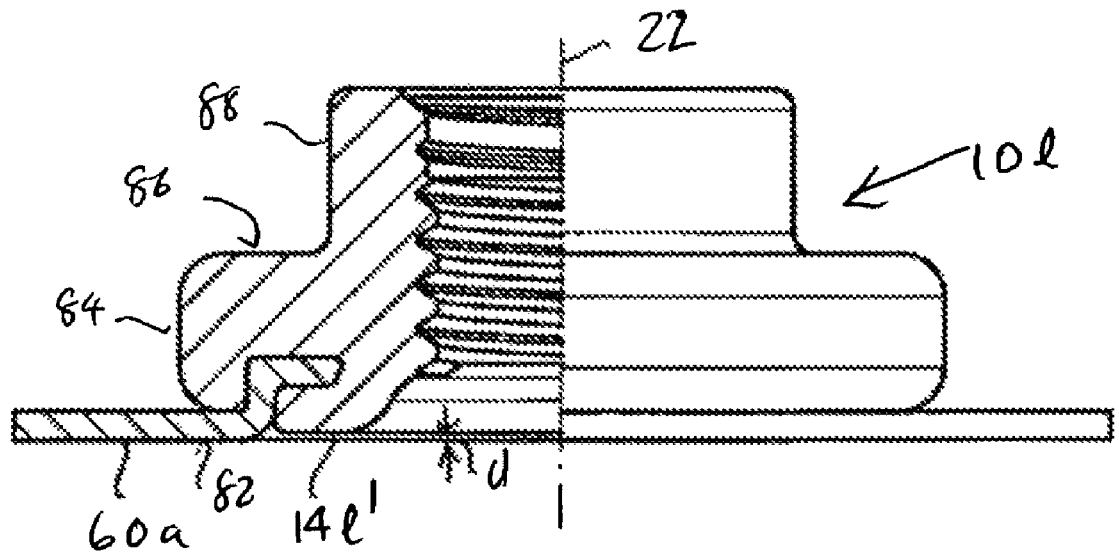
Figure 15B:
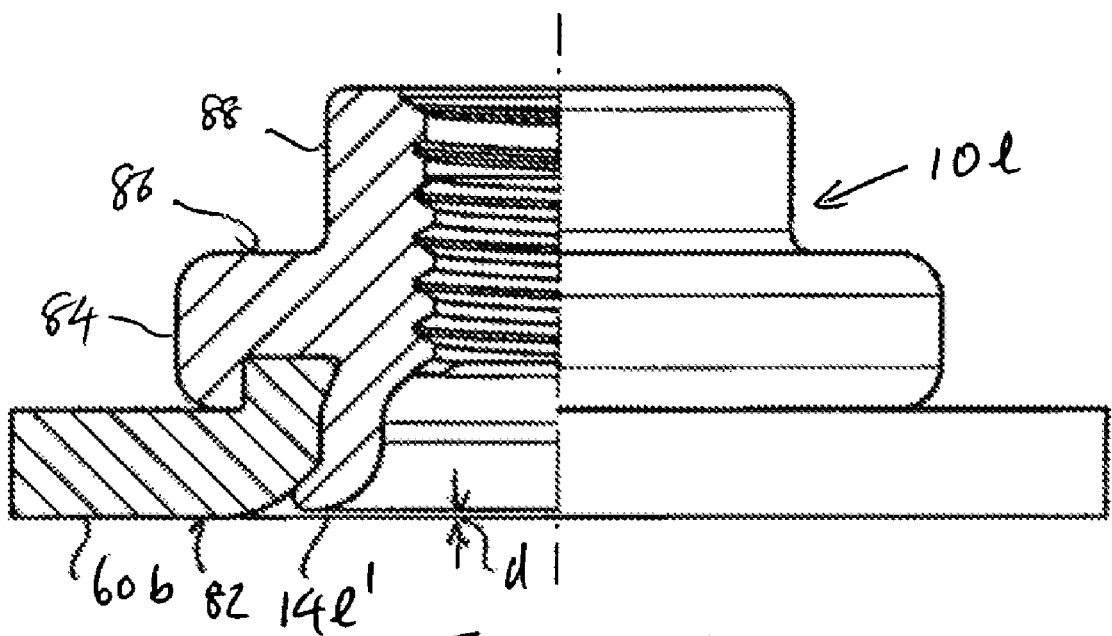
Figure 16A:
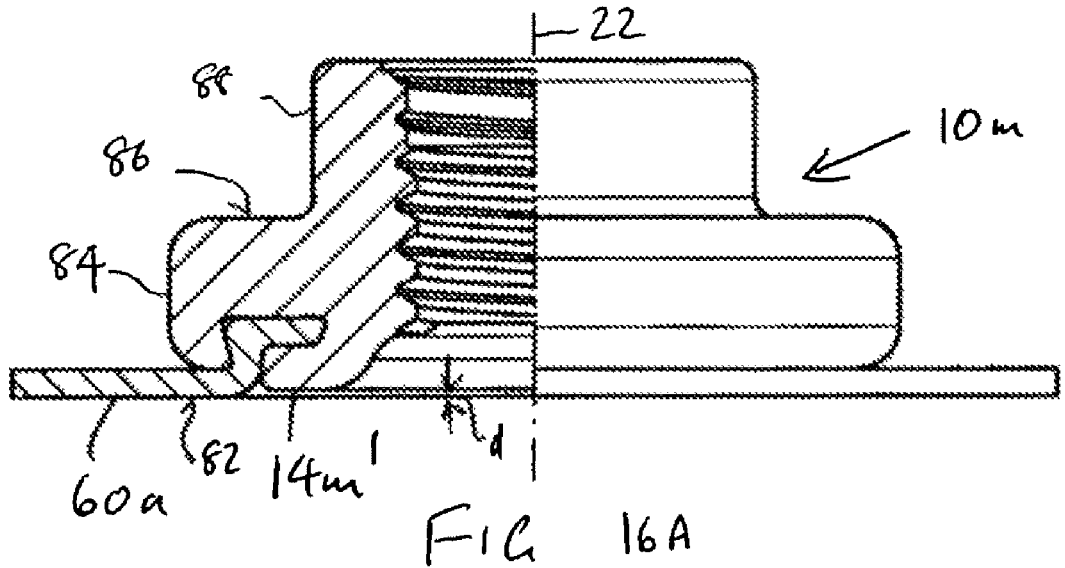
Figure 16B:
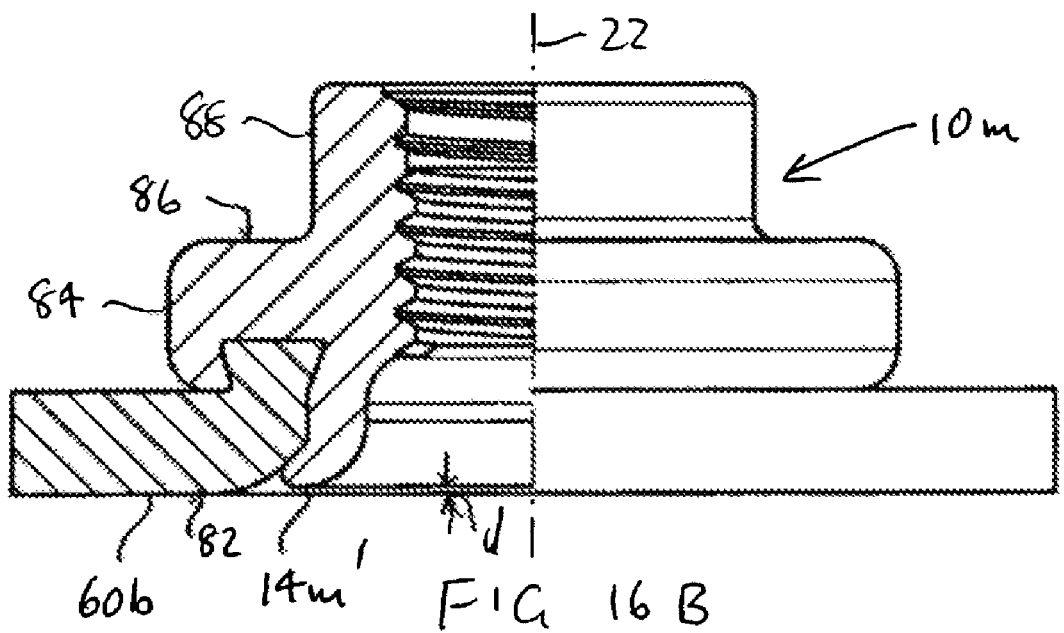
Figure 18A:
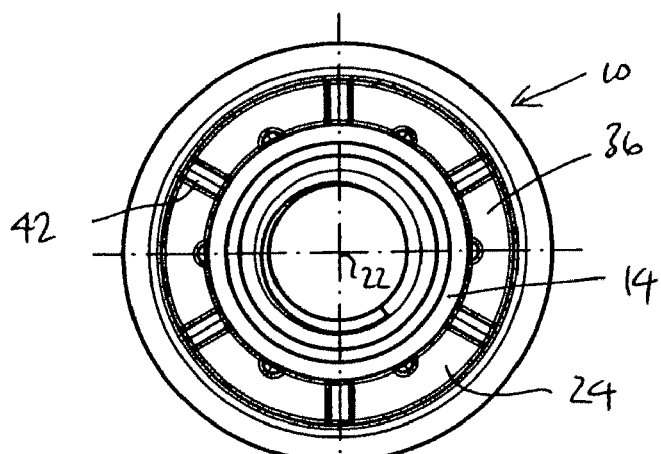
Figure 18B:
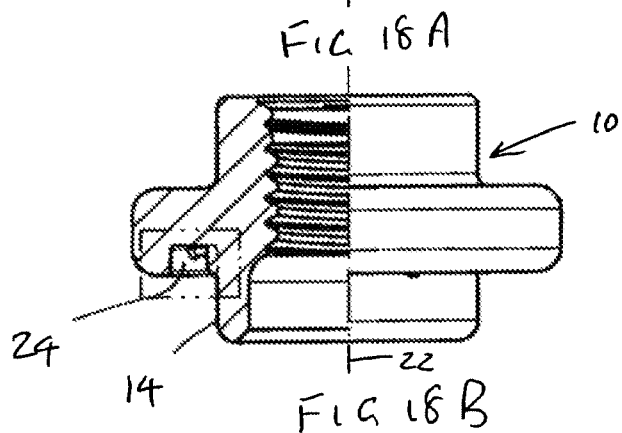
Figure 18C:
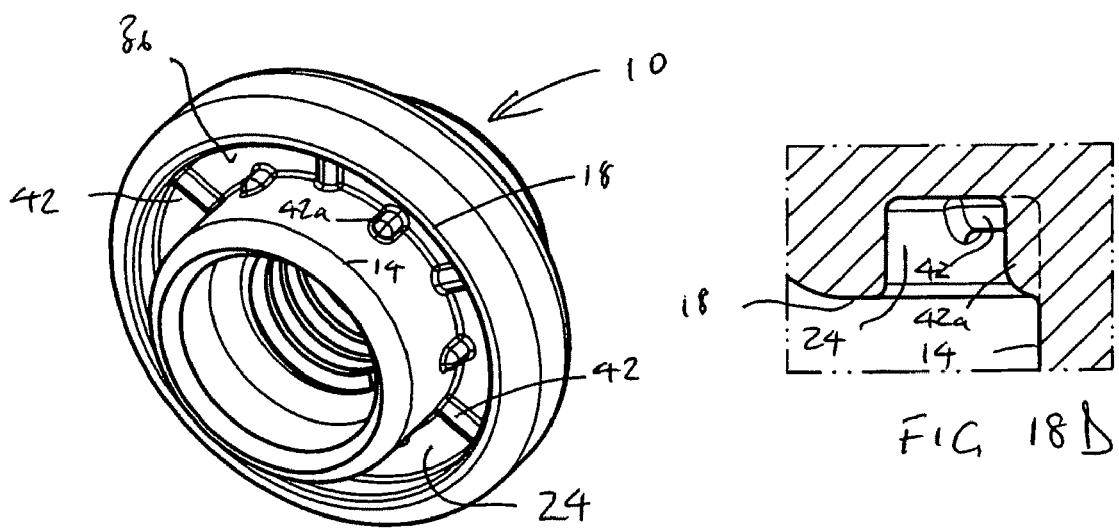
Figure 18D:
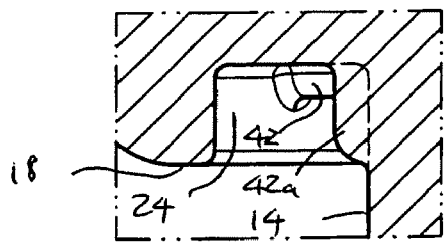
Figure 19A:
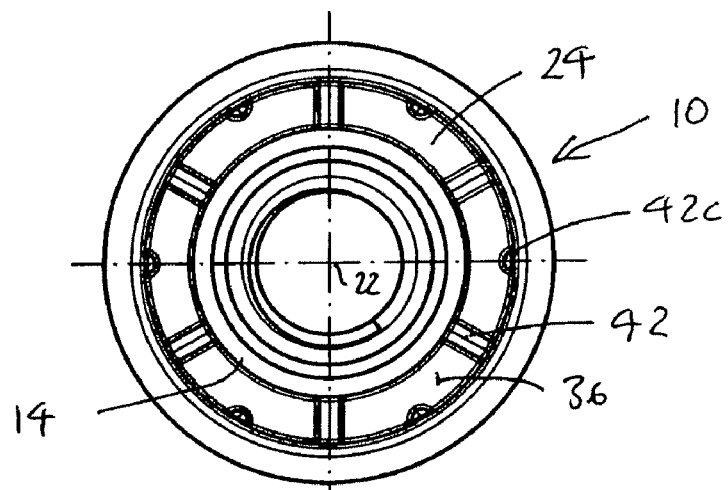
Figure 19B:
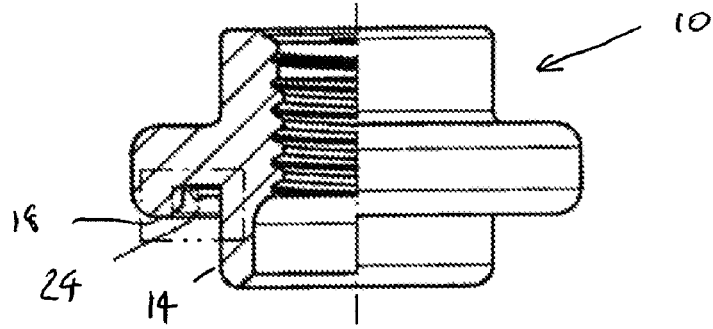
Figure 19C:
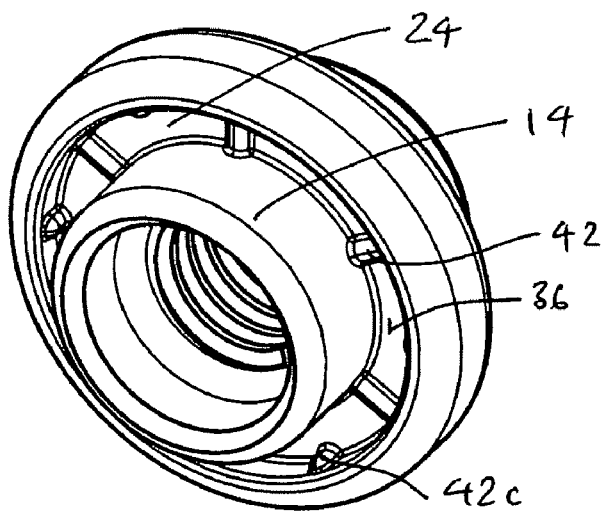
Figure 19D:
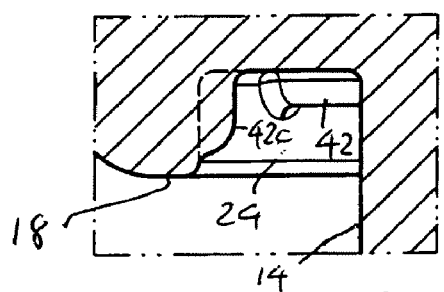
Figure 21A:
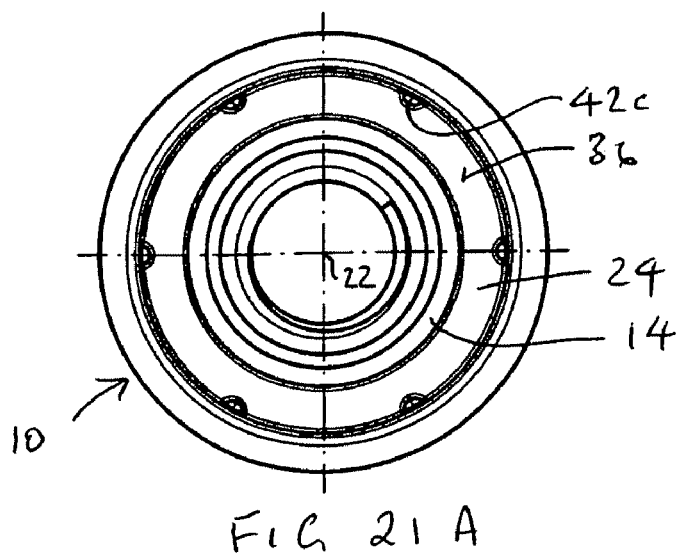
Figure 21B:
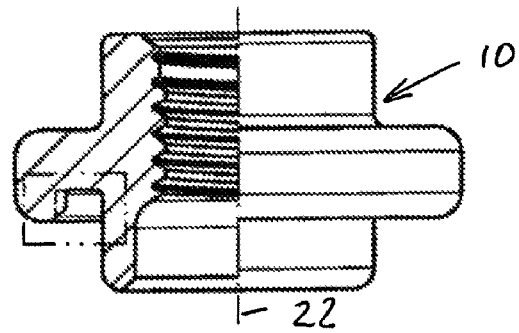
Figure 21C:
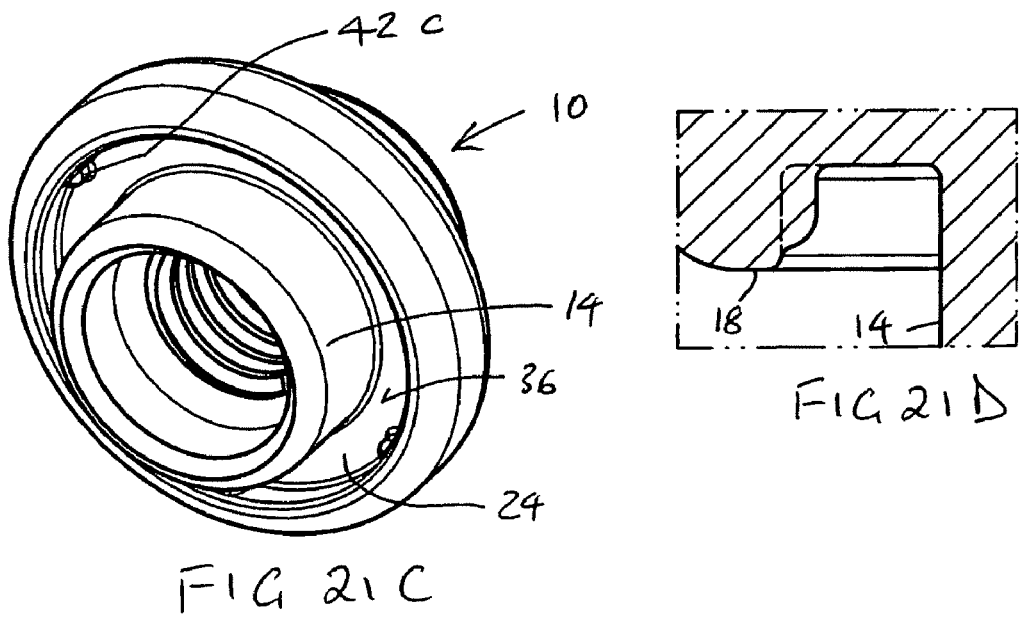
Figure 21D:
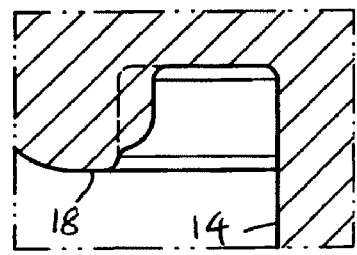
Figure 23A:
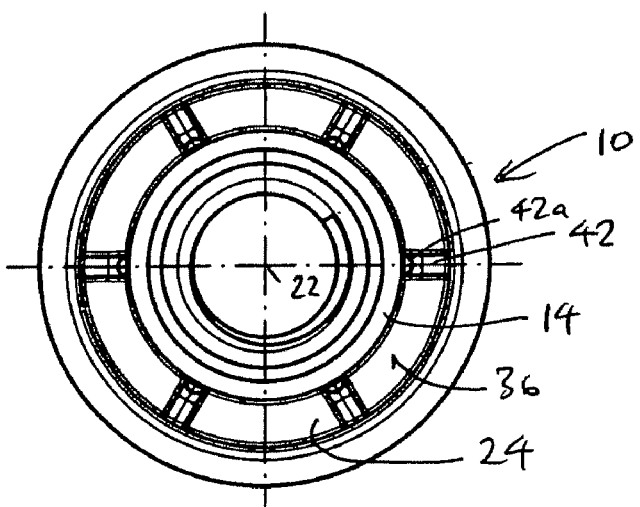
Figure 23B:
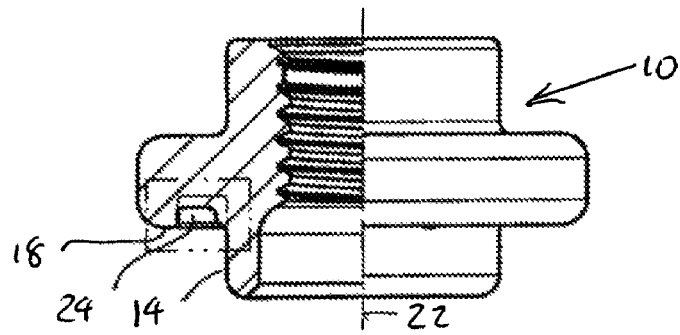
Figure 23C:
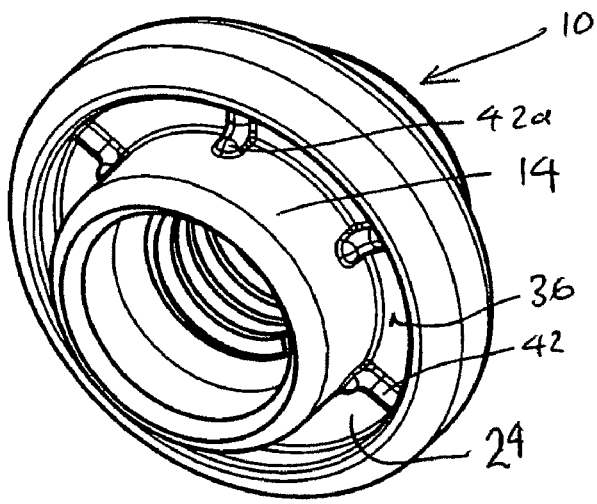
Figure 23D:
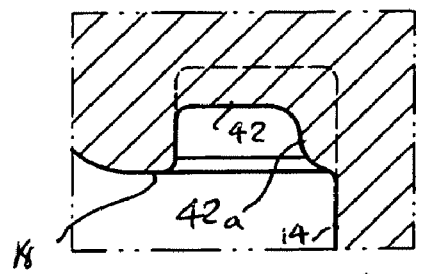
Figure 24A:
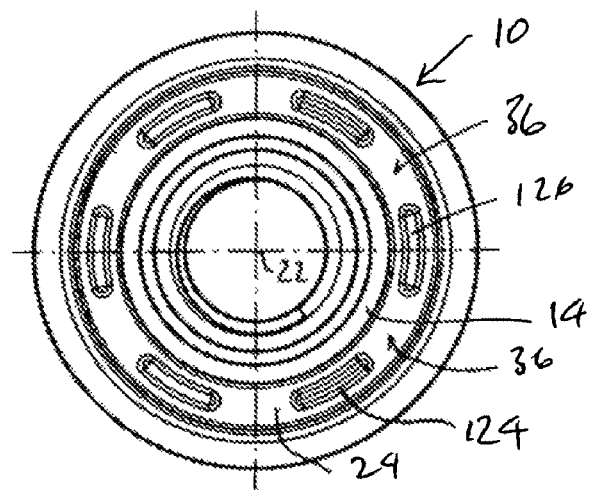
Figure 24B:
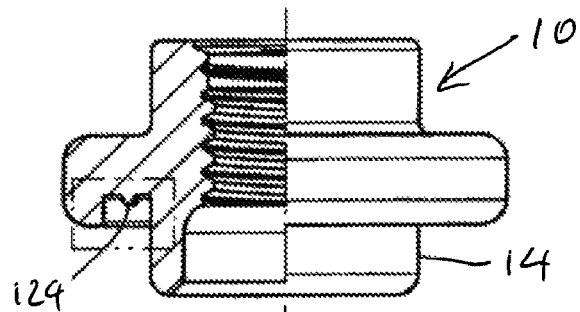
Figure 24C:
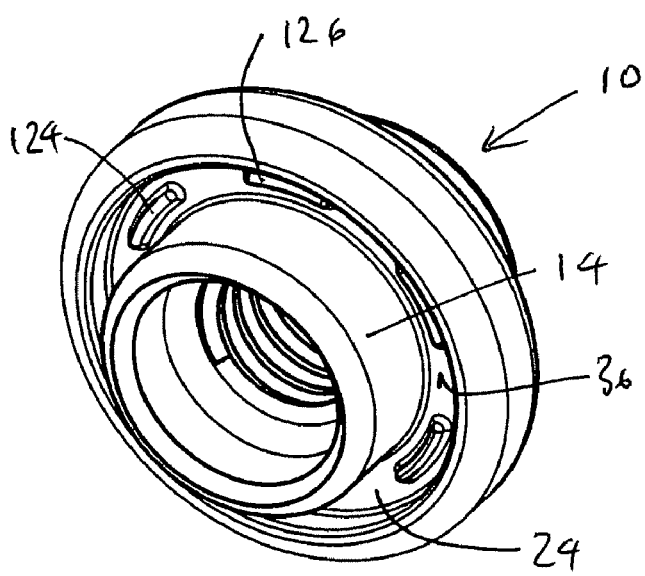
Figure 24D:
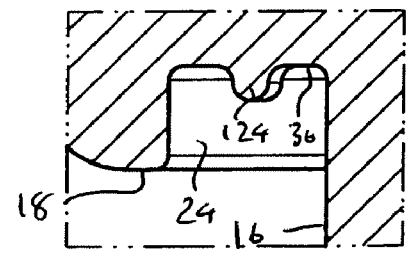
Figure 25A:
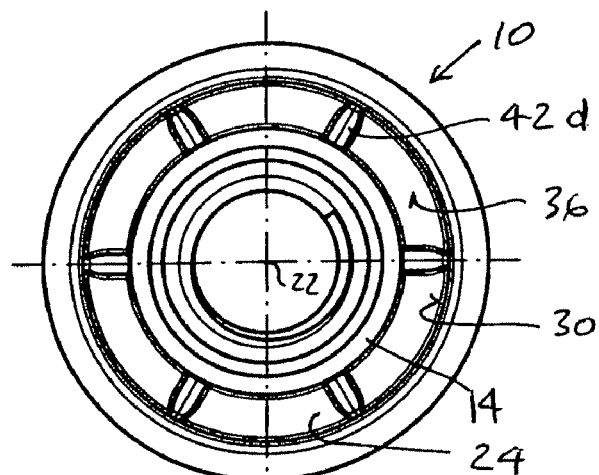
Figure 25B:
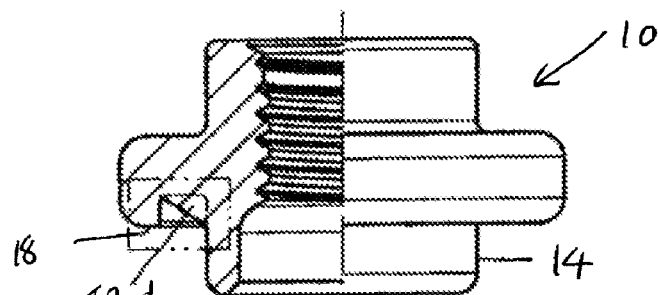
Figure 25C:
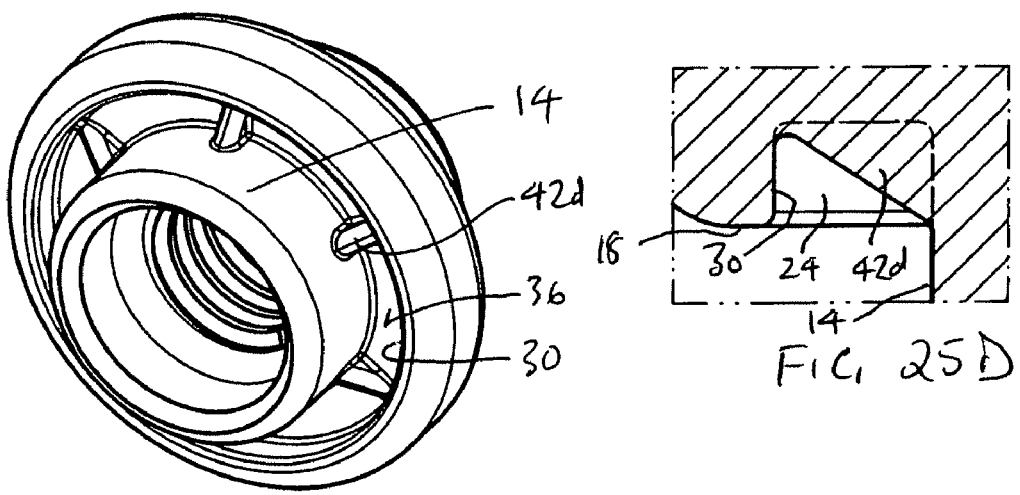
Figure 25D:
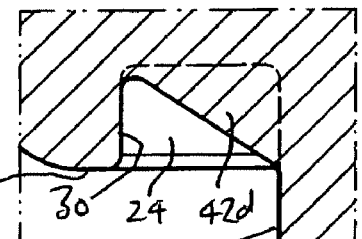

In these Figures, the association with the FIGS. 5C to 5M is as follows:

| FIGS. 6A, 6B | FIG. 5C |
| FIGS. 7A, 7B | FIG. 5D |
| FIGS. 8A, 8B | FIG. 5E |
| FIGS. 9A, 9B | FIG. 5F |
| FIGS. 10A, 10B | FIG. 5G |
| FIGS. 11A, 11B | FIG. 5H |
| FIGS. 12A, 12B | FIG. 5I |
| FIGS. 13A, 13B | FIG. 5J |
| FIGS. 14A, 14B | FIG. 5k |
| FIGS. 15A, 15B | FIG. 5L |
| FIGS. 16A, 16B | FIG. 5M. |

The security against rotation features used can be realized in the most varied manners. Examples for the security against rotation features can be seen from the further FIGS. 17A, 17B, 17C, 17D to 41A, 41B, 41C and 41D. In this respect, the representation A shows for each Figure number a plan view of the rivet nut seen in the direction of the rivet portion 14 and of the ring groove 24; the representation B shows, on the right hand side of the middle longitudinal axis 22, the rivet nut 10 in a side view and, on the left hand side of the middle longitudinal axis 22, an axial section through the rivet nut: the representation C shows a perspective representation of the rivet nut in a view from the right hand side of the cylindrical rivet portion; and the representation D shows an enlarged representation of the region of the ring groove corresponding to the region of the representation B shown with a rectangular frame.

FIGS. 17A to 17D show an element with ribs 42 providing security against rotation which extend in a radial direction over the base region 36 of the ring groove 24 and have an axial height which amounts to a fraction of the maximum axial depth of the ring groove 24.

FIGS. 18A to 18D show an element similar to FIGS. 17A to 17D with ribs 42 providing security against rotation which extend in a radial direction at their side remote from the base surface 36 of the U-shaped ring groove and are disposed in a radial plane which is perpendicular to the middle longitudinal axis 22 of the rivet nut. In addition to this, ribs 42a providing security against rotation are provided which are arranged offset angle-wise around the longitudinal axis 22 to the ribs 42 providing security against rotation and which extend in raised from along the cylindrical rivet portion 14 and indeed approximately up to the axial height of the ring-shaped support surface 18. The ribs 42 providing security against rotation could, however, also be omitted, as shown in FIGS. 20A to 20D, so that only the ribs 42a providing security against rotation are shown.

In the embodiment in accordance with FIGS. 37A to 37D, ribs 42b providing security against rotation are provided which extend in raised form along the cylindrical rivet portion 14 and beyond the axial height of the ring-shaped support surface 18. Here, ribs 42 providing security against rotation and arranged offset angle-wise are likewise provided in the region of the base surface 36.

FIGS. 41A to 41D show an arrangement of the ribs 42, 42a providing security against rotation which is very similar to that of FIGS. 37A to 37D, but with the difference that the ribs 42a providing security against rotation are here aligned with the ribs 42 providing security against rotation angle-wise around the longitudinal axis 22 and are made in one piece with them. They likewise extend over the total length of the rivet portion 14 up to the rounded portion at the free end face end of the rivet portion 14. The ribs 42, 42b providing security against rotation have a right-angled shape in a side view.

The embodiment in accordance with FIGS. 36A to 37D also has ribs 42b which provide security against rotation and which extend in raised form along the cylindrical rivet portion 14 and beyond the axial height of the ring-shaped support surface and run out directly before a rounded portion 56 at the free end of the rivet portion 14. Here, however, no ribs providing security against rotation are provided in the region of the base surface 36.

There is furthermore the possibility, as shown in FIGS. 21A to 21D, of providing ribs 42c providing security against rotation which extend in raised form along the radially outer side of the ring groove 24, and indeed without ribs providing security against rotation in the region of the base surface 36.

It would also be conceivable, as shown in FIGS. 19A to 19D, to supplement such ribs 42c providing security against rotation in accordance with FIGS. 21A to 21D with ribs 42 providing security against rotation which are provided at the base surface 36 and are arranged offset to the ribs 42c providing security against rotation angle-wise around the longitudinal axis 22.

In addition, as shown in FIGS. 22A to 22c, the ribs 42c providing security against rotation are aligned angle-wise with the ribs 42 providing security against rotation and merge into one another, for example such that the individual ribs 42, 42c providing security against rotation have a right-angled shape overall in a side view.

Another right-angled shape of the ribs providing security against rotation is shown in FIGS. 23A to 23D. Here, ribs 42 providing security against rotation are combined in the region of the base surface 36 of the ring groove 24 with ribs 42a providing security against rotation aligned angle-wise therewith which are located at the rivet portion 14 to form ribs providing security against rotation having a right-angled shape.

FIGS. 25A to 25D show ribs 42d providing security against rotation which extend in the radial direction in the base region 36 of the ring groove 24 and have an at least substantially triangular shape in a side view. They are higher in the region of the rivet portion 14 than in the region of the radially outer side 30 of the ring groove 24.

Figure 26A:
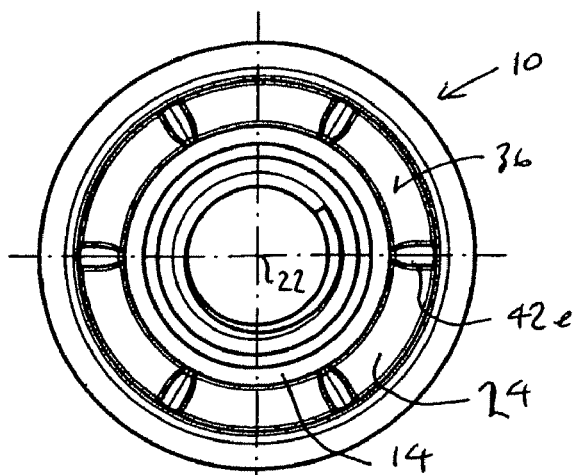
Figure 26B:
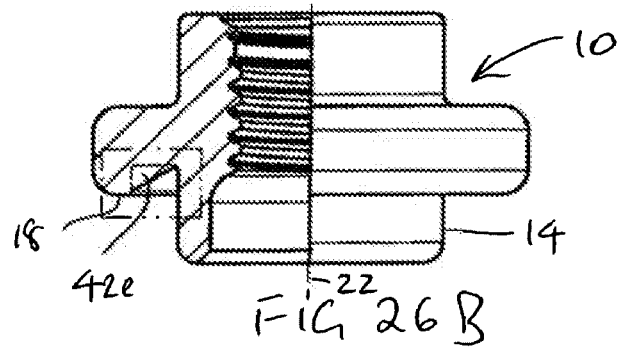
Figure 26C:
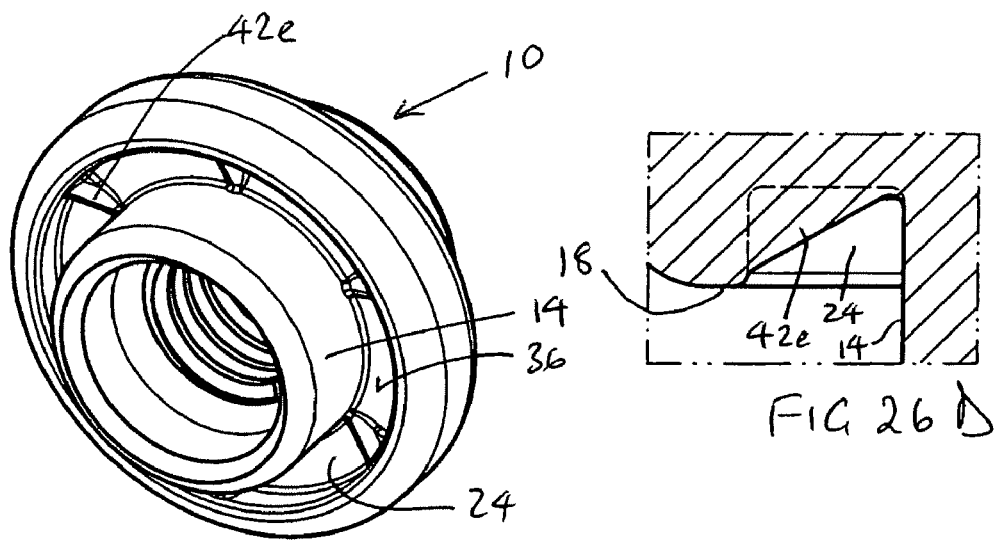
Figure 26D:
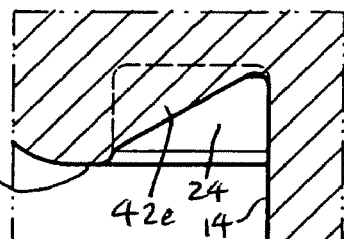
Figure 28A:
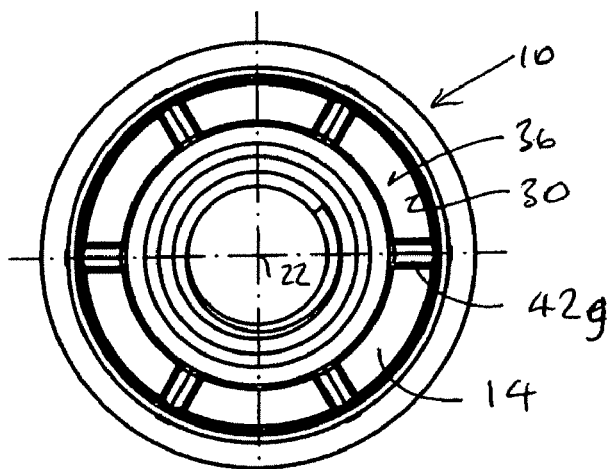
Figure 28B:
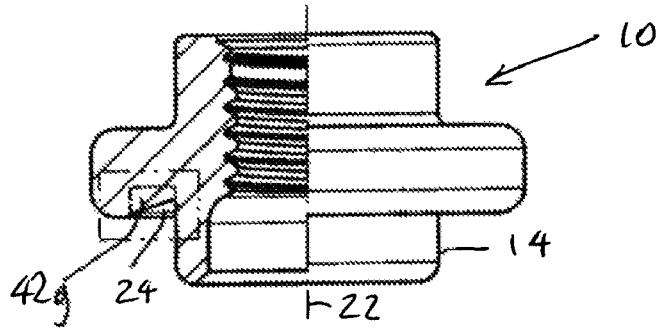
Figure 28C:
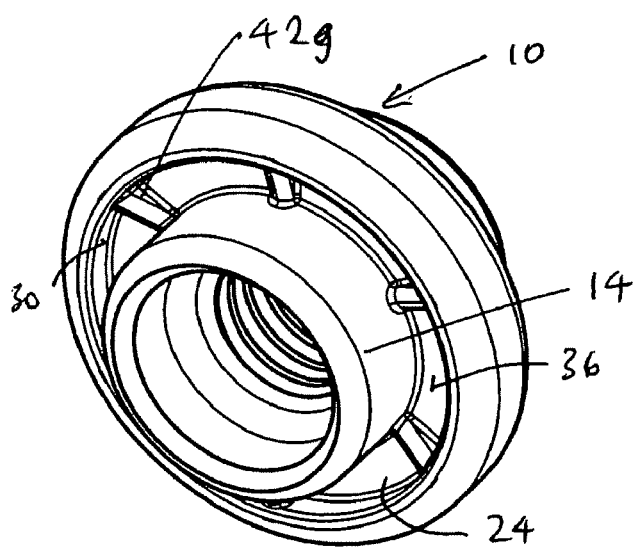
Figure 28D:
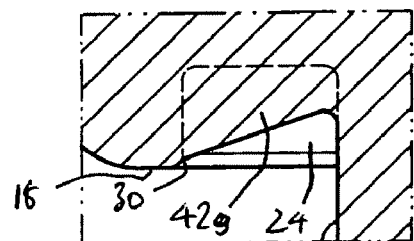
Figure 29A:
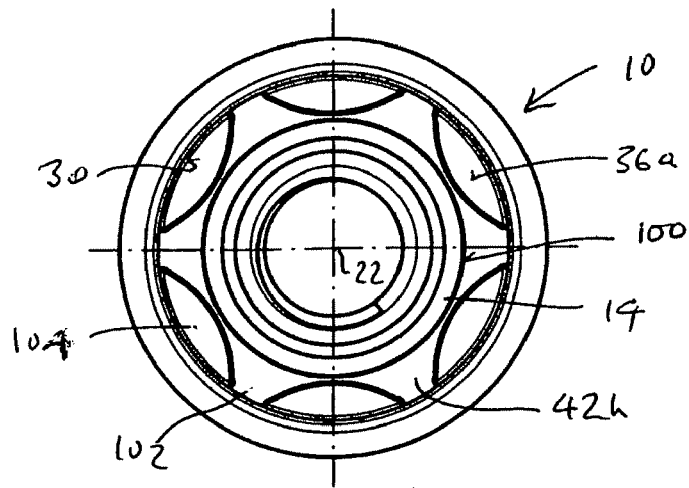
Figure 29B:
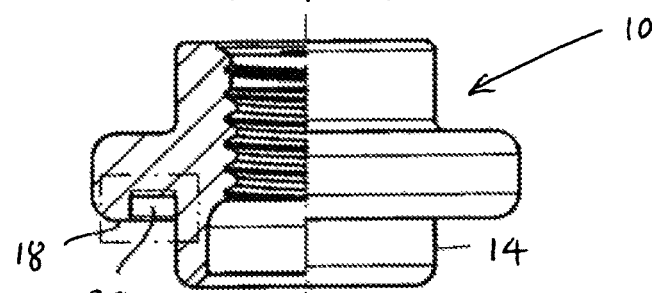
Figure 29C:
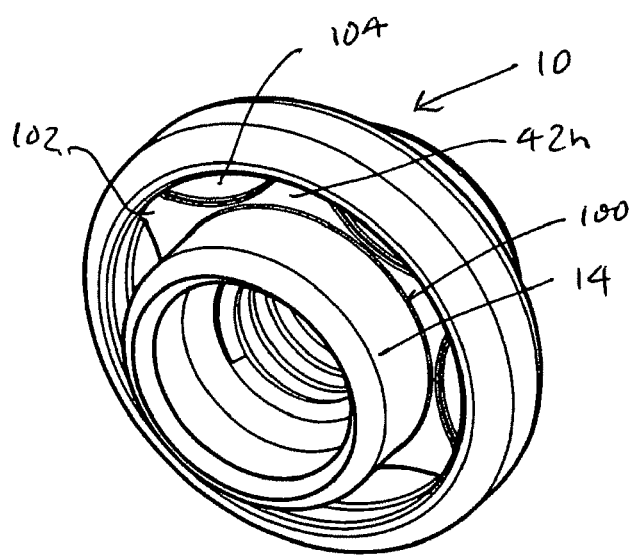
Figure 29D:
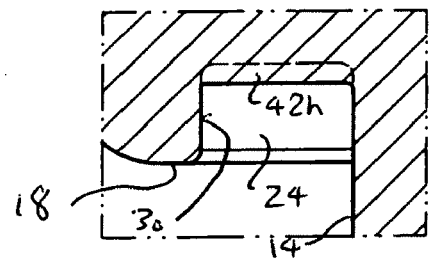
Figure 32:
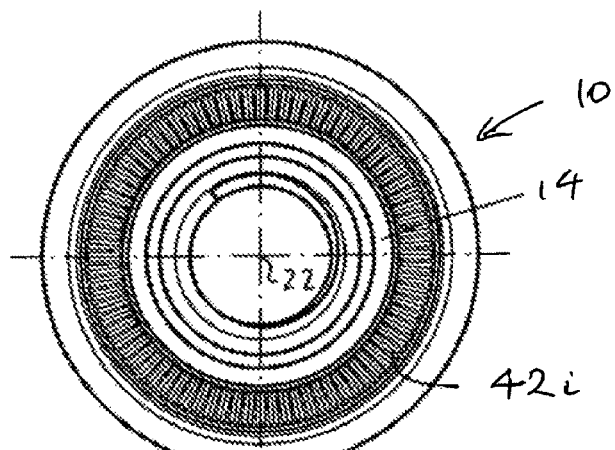
Figure 32:
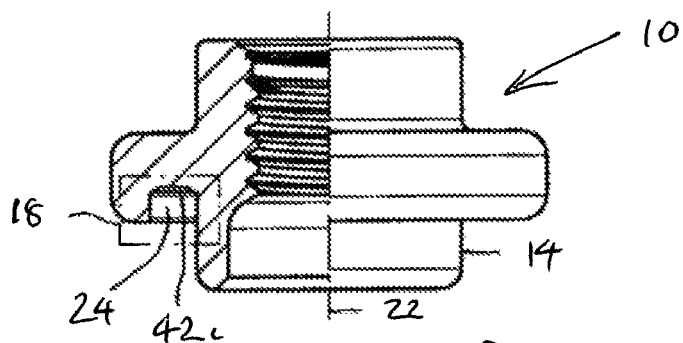
Figure 32:
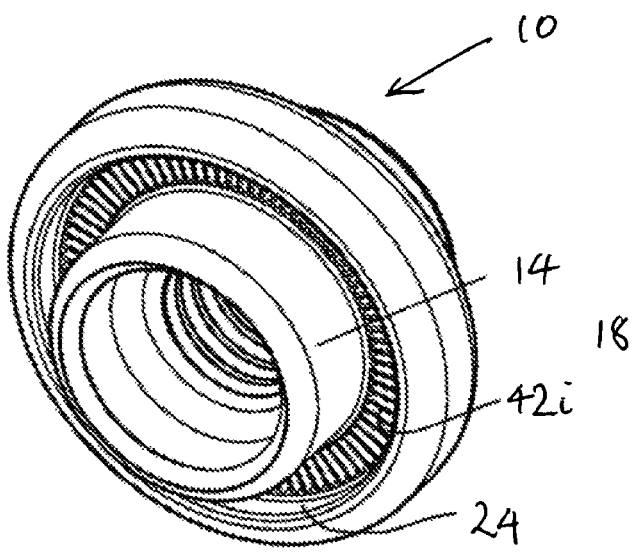
Figure 32:
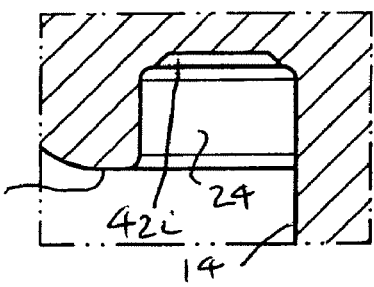
Figure 37A:
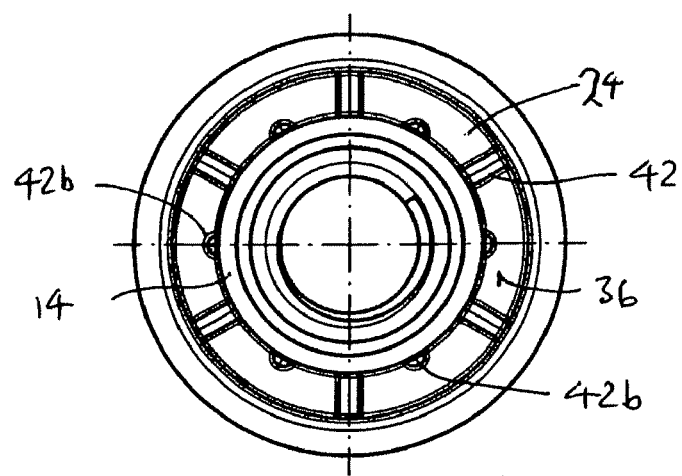
Figure 37B:
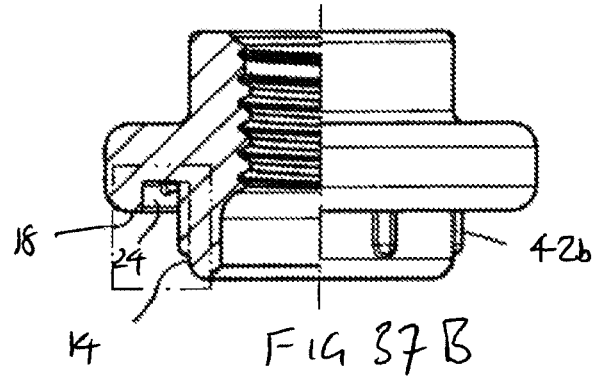
Figure 37C:
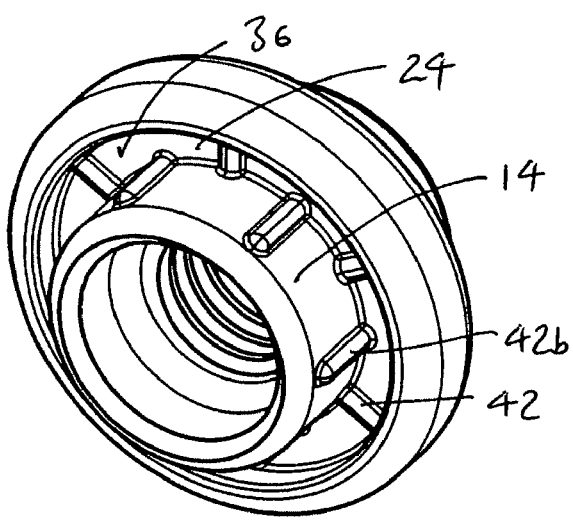
Figure 37D:
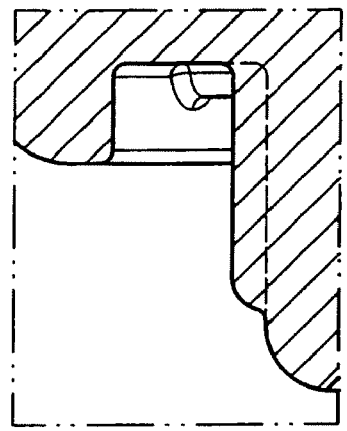
Figure 39A:
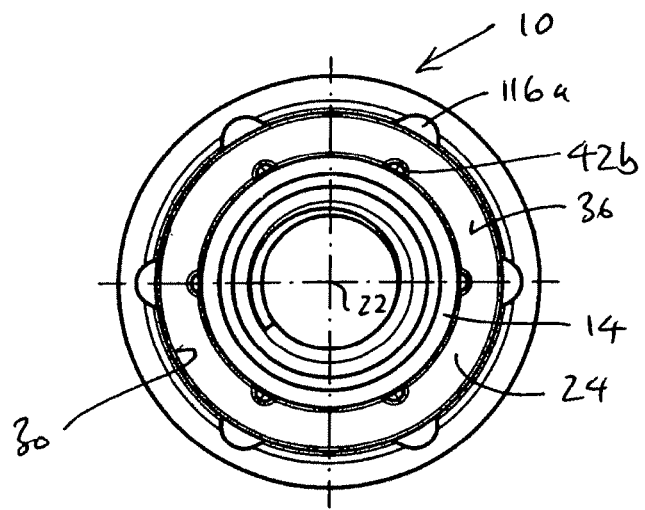
Figure 39B:
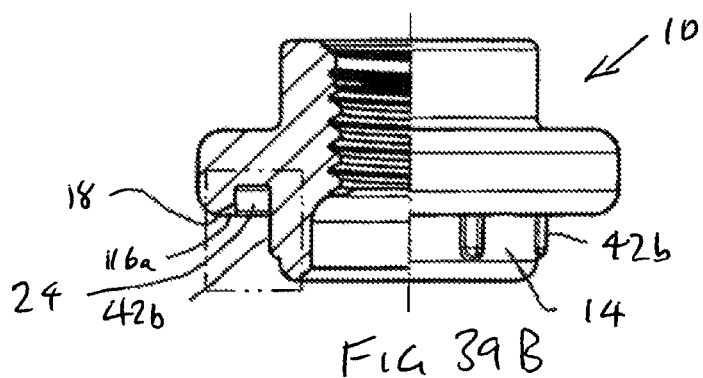
Figure 39C:
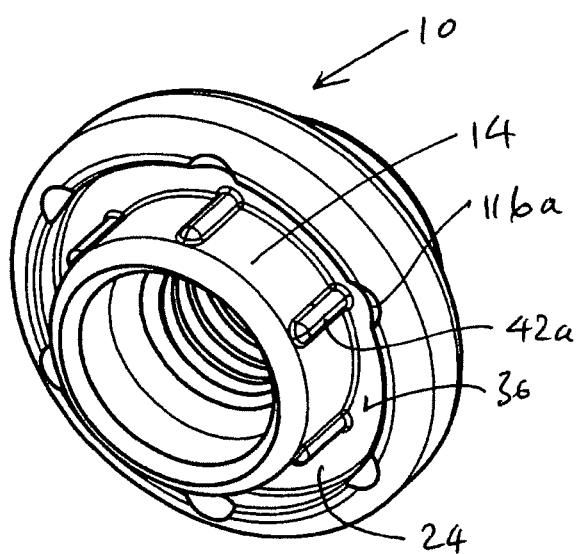
Figure 39D:
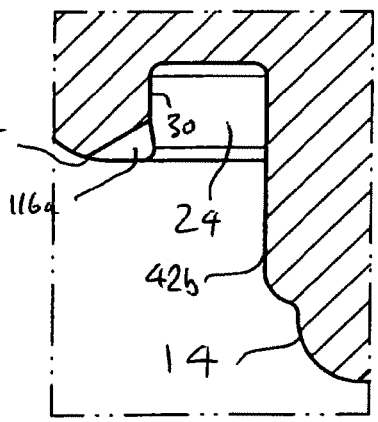
Figure 40A:
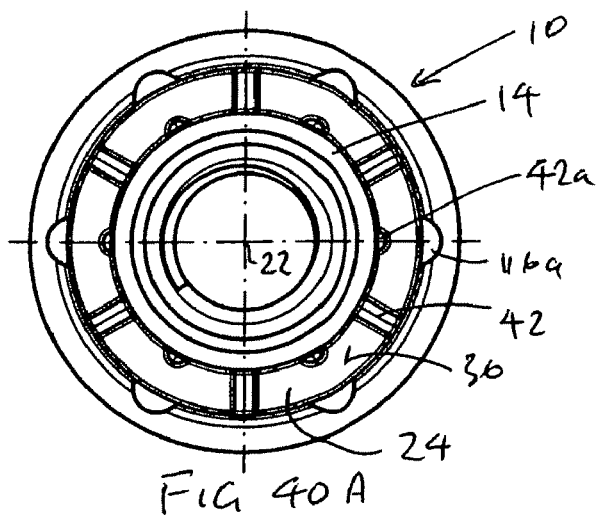
Figure 40B:
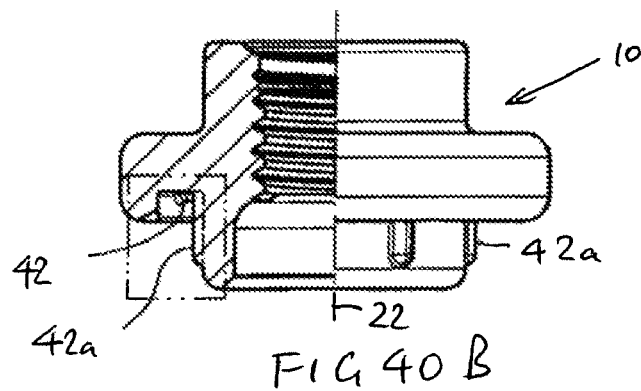
Figure 40C:
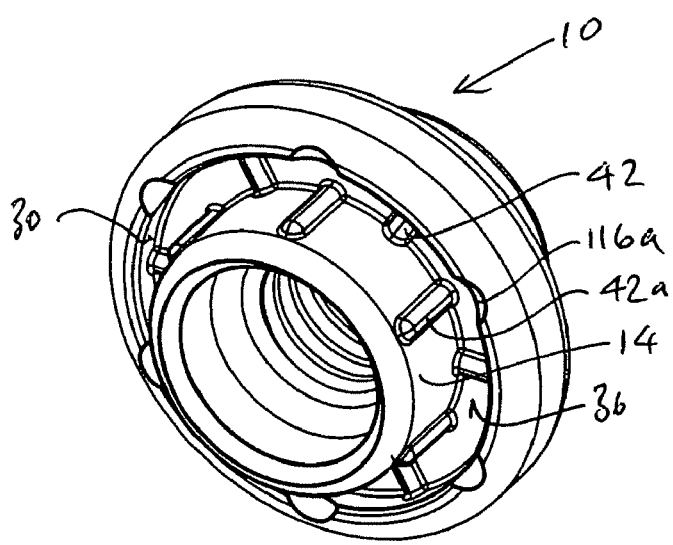
Figure 40D:
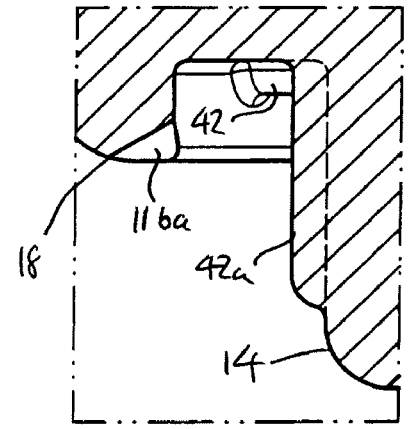

The converse arrangement is also possible, namely as shown in FIGS. 26A to 26B, with ribs 42a providing security against rotation which extend in a radial direction in the base region 36 of the ring groove 24 and have an at least substantially triangular shape in a side view and are higher in the region of the radially outer side 30 of the ring groove than in the region of the rivet portion 14.

A further modification of the ribs 42*b* providing security against rotation in accordance with FIGS. 25A to 25D is also possible, namely as shown in FIGS. 27A to 27B, with ribs 42*f* providing security against rotation which extend in a radial direction in the base region of the ring groove and have an at least substantially quadrilateral shape in a side view whose side remote from the base surface 36 has an inclined extent and show radially inner side disposed at the rivet portion 14 is higher than its side disposed in the region of the radially outer side 30 of the ring groove 24.

This arrangement an also be modified, as shown in FIGS. 28A to 28D. Here, ribs 42*g* providing security against rotation are provided which extend in a radial direction in the base region 36 of the ring groove 24 and have an at least substantially quadrilateral shape in a side view, whose side remote from the base surface 36 has an inclined extent and whose side disposed in the region of the radially outer side 30 of the ring groove is higher than its radially inner side disposed at the rivet portion.

The security against rotation can, however, also be realized, as shown in FIGS. 29A to 29D, namely in the form of an elevated portion 42*h* providing security against rotation in the base region of the ring groove 24 which has an approximately star-shaped design in a plan view with an inner hole 100 which adjoins the cylindrical rivet portion 14, with the tips 102 of the star-shaped design being disposed at the radially outer side 30 of the ring groove 24. Recesses or pockets 104 are formed in the base surface region 36*a* between the tips 102. Sheet metal material which is pressed into the pockets 104 abuts the side walls of the pockets and thus prevents rotation of the rivet nut relative to the sheet metal part.

A recess 106 providing security against rotation could, as shown in FIGS. 30A to 30D, be provided in the base region 36 of the ring groove 14 which has an approximately star-shaped design in a plan view with an inner hole 100*a* which adjoins the cylindrical rivet portion, with the tips 102A of the star-shaped design being disposed at the radially outer side 30 of the ring groove 14. Elevated portions 108 are here disposed between the tips 102*a* whose side walls, as in the embodiment of FIGS. 29A to 29D, prevent rotation of the rivet nut relative to the sheet metal part.

Furthermore, in accordance with FIGS. 31A to 31D, security against rotation can be provided in the form of a knurled outer side 42*h* of the rivet portion 14.

Alternatively or additionally to this, in accordance with FIGS. 32A to 32D, a base surface 36 of the ring groove 14 can be provided for this purpose with a design 42*i* corresponding to an end face toothed arrangement.

A wavy extent 110 of the radially outer side of the ring groove 14 could also be considered, as shown in FIGS. 33A to 33D, whose gently rounded peaks 112 and valleys 114 form a security against rotation. This shape can optionally be complemented by further security against rotation features such as the ribs 42*a* providing security against rotation. Such ribs 42*a* providing security against rotation can also be omitted, whereby the design in accordance with FIGS. 34A to 34D results.

In the embodiment in accordance with FIGS. 35A to 35D, the security against rotation is provided by radially extending recesses 116 in the ring-shaped support surface 18 which preferably do not extend over the full width thereof and have their lowest point adjacent to the ring groove 14 and form projections 118 with undercuts 120 at the radially outer side wall of the ring groove.

Alternatively to this, in accordance with FIGS. 38A to 38D, radially extending recesses 116*a* can be provided in the ring-shaped support surface 18 which have a part cylindrical cross-sectional shape and are inclined so that they have their lowest point adjacent to the ring groove 24 and interrupt an undercut ring shape 122 of the radially outer side wall 30 of the ring groove 24. These security against rotation features can be supplemented by ribs 42 providing security against rotation in accordance with FIGS. 38A to 38D or by axial ribs 42*b* providing security against rotation in accordance with FIGS. 39A to 39B or by ribs 42 and 42*b* providing security against rotation in accordance with FIGS. 40A to 40D.

In accordance with FIGS. 24A to 24D, alternating arcuately extending elevated portions 124 and recesses 126 can be considered at or in the base surface 36 of the ring groove 24. However, only arcuate elevated portions 124 or only arcuate recesses 126 can also be provided.

In the case of discrete security against rotation features such as 42*a*, 42*b*, 42, 124, 126, 42*c*, 116*a* at the radially inner side 32 of the ring groove 24, i.e. at the cylindrical outer surface of the rivet portion 14, at the base surface 36 of the ring groove 24 or at the radial outer side 30 of the ring groove or at the ring-shaped support surface 18, they can be aligned with one another in the radial direction or are offset angle-wise to one another with respect to the middle longitudinal axis or, in the case of two or more of the named possibilities, are partly aligned with one another in the radial direction and are partly offset angle-wise to one another with respect to the middle longitudinal axis. Examples for this can be seen from FIGS. 18A to 18D, 19A to 19D, 37A to 37D, 38A to 38D, 39A to 39D and 40A to 40D.

Other security against rotation features or combinations of the security against rotation features set forth with one another or with other security against rotation features could naturally also b considered.

FIGS. 42A to 42E show that the present invention can also be used with a rivet nut in the form of a so-called skirt element 10", wherein the rivet portion 14" is provided as a skirt around a centrally arranged punched section 130. The principle of such skirt nuts is described, for example, in the PCT application PCT/EP2003/007436 which was published as WO 2004/034520. There, however, in combination with an element having a conical contact surface and not in combination with an element having a ring groove as proposed here. The principle of the beading over of the skirt-shaped rivet portion 14" is, however, the same, only with the difference that in the present embodiment the rivet bead 14''' which is manufactured from the skirt-shaped rivet portion 14" here comes to rest in a ring recess 80" of the sheet metal part 60*a* or 60*b* (FIG. 42D or 42E) so that a complete planar lower side is achieved in the region of the rivet bead, i.e. the free surface of the rivet bead is disposed aligned with the lower side 82" of the sheet metal part or is possibly set back by up to 0.2 mm with respect to this free surface. The punched section 130 admittedly projects through the sheet metal part, but this can be advantageous, for example, if the element should have a centering function. It is important that, on the provision of a corresponding hole in the further component which is attached to the component assembly in accordance with FIGS. 42D to 42E, the direct clamp between the further component and the ring-shaped support surface 18" of the rivet nut takes place and that a compressive stress arises in the sheet metal part by the matching of the volumes of the ring recess 80 in the sheet metal part and of the folded over volume of the ring rivet, as with all other embodiments, which results in a considerable stranglehold between the sheet metal part and the element.

Figure 42A:
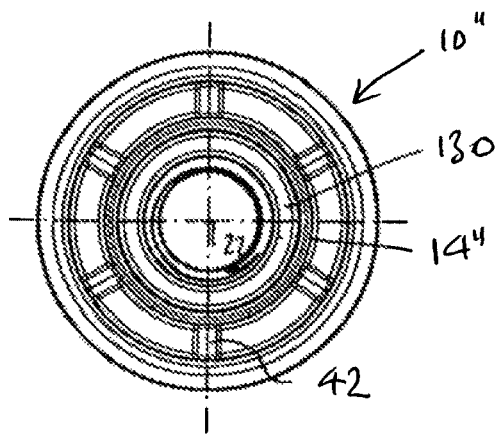
Figure 42B:
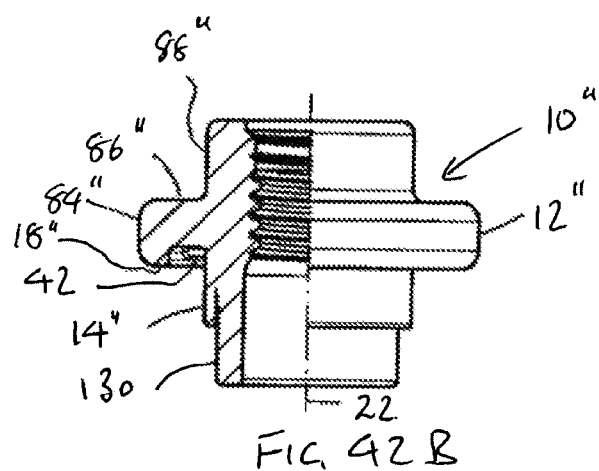
Figure 42C:
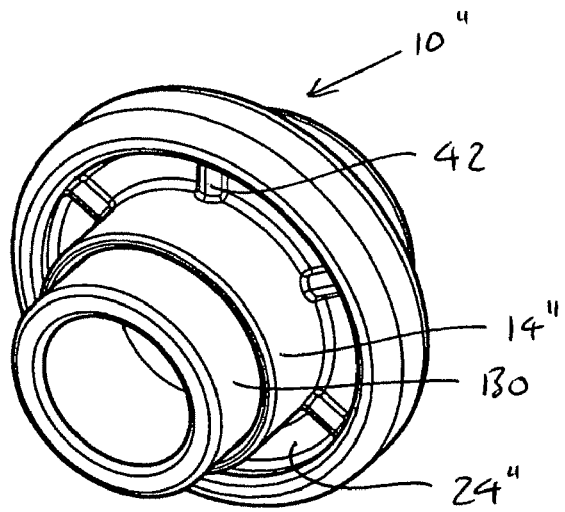
Figure 42D:
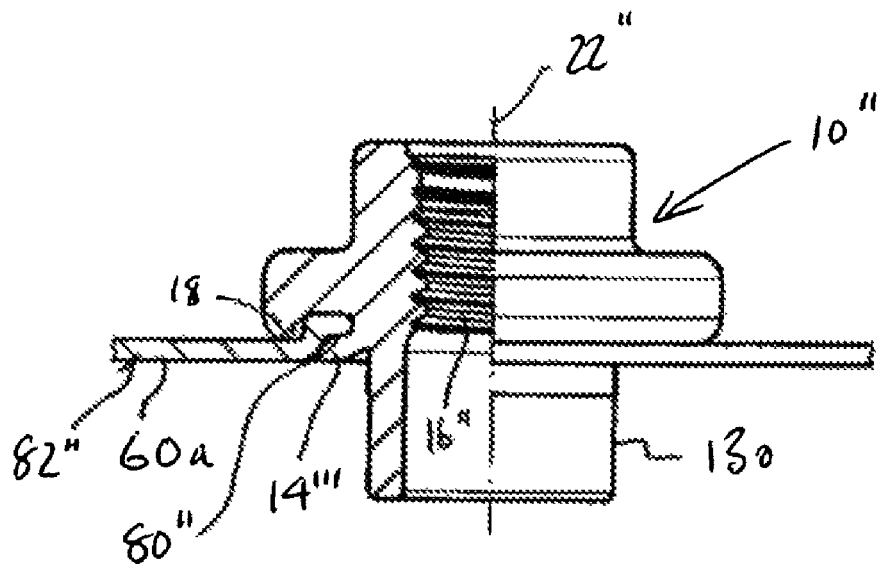
Figure 42E:
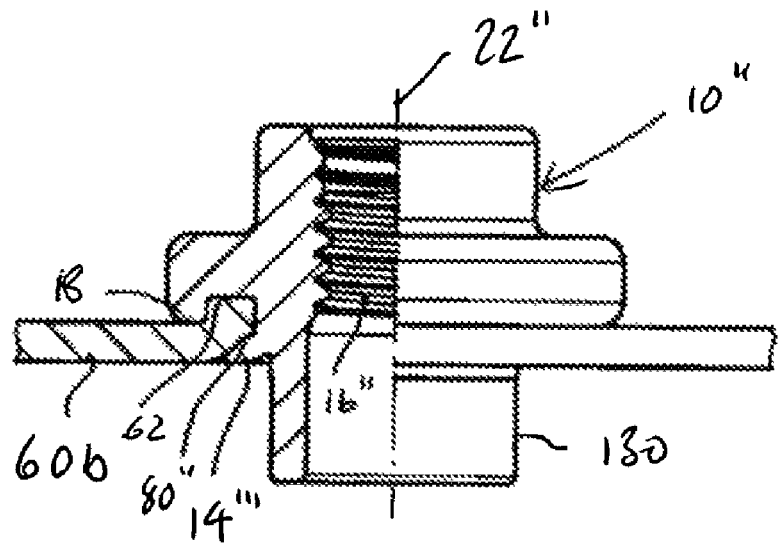

The special form of the bead in the sheet metal part so that it at least substantially fills the ring groove can be realized in the self-punching introduction of the element, provided that the die is designed such that the assembly situation in accordance with FIG. 42D or 42E is achieved. It is, however, not absolutely necessary to introduce the element into the sheet metal part in a self-punching manner in accordance with FIGS. 42A to 42C, but the metal sheet could rather be prebossed and preholed as in the previous embodiments.

In this embodiment, it is in another respect not absolutely necessary that a thread cylinder 16" is present. Instead, the element could be provided with a throughgoing bore which could then, for example, serve for the reception of a thread-forming or thread-cutting screw or as a bearing sleeve for a rotatable shaft. With such a design, the planar lower side could then have special advantages in the region of the rivet bead, for example if the shaft or axle were part of a window lift system in an automobile.

For details of how such an element is combined with a sheet metal part from a technical manufacturing aspect, reference is made to the PCT application PCT/EP2003/007436 mentioned above. A further rivet nut of this kind is described in the application PCT/EP02/03187 having the publication number WO 02/077468. The content of these two applications is herewith made part of the disclosure of the present application by reference. It should be expressed at this point that features of FIGS. 42A to 42E which are provided with reference numerals which correspond to those of the previous Figures are to be understood in precisely the same manner, even if the reference numerals are provided with a dash or with multiple dashes for the distinguishing of the embodiments. That is, the previous description also applies to these features even if they are provided with a dash or with multiple dashes. In other words, the description of all feature having the same base reference numerals also applies to the embodiment in accordance with FIGS. 42A to 42E.

Figure 43A:
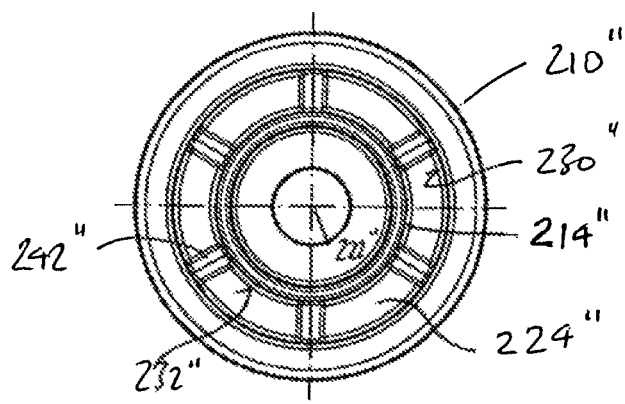
Figure 43B:
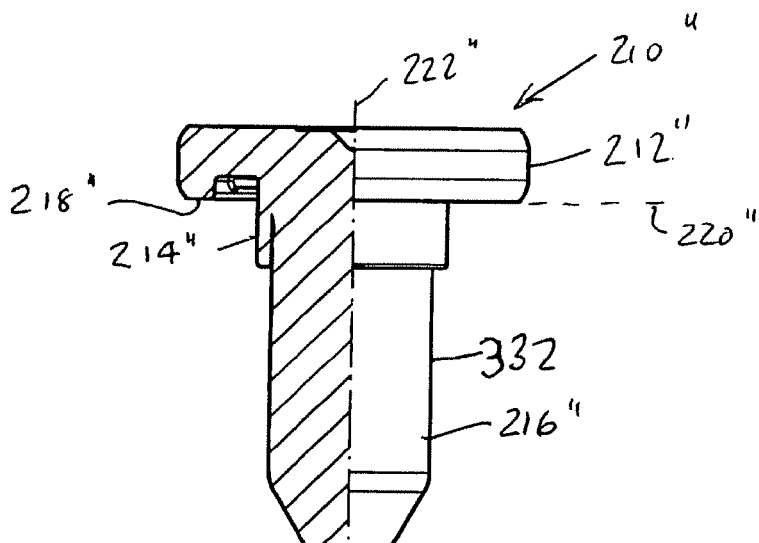
Figure 43C:
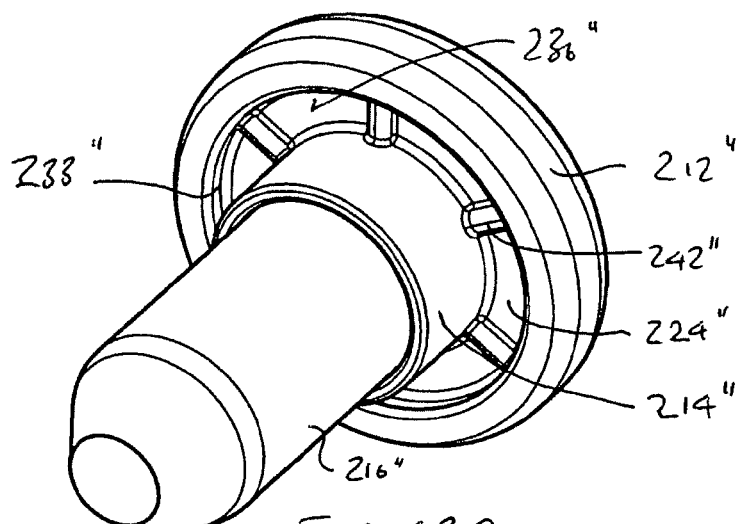

The same also applies to the further FIGS. 43A to 42G, with the reference numerals used there having been incremented by the base number 200 to bring about a clear distinction. That is, if the number 200 is subtracted from the respective reference numeral, the previous description of the corresponding features also applies here, unless something different has been stated.

Referring to FIGS. 43A to 43G, a bolt element 210" is shown here which is very similar to the element 10", but has a shaft part 332 with a thread cylinder 216" instead of an inner thread cylinder 16".

An element of this kind is described in European Patent 539 743. In the European Patent 539 743, a ring recess of the ring groove is present in the lower side of the bolt head or of the head part 212, and indeed on the side from which the shaft part projects. The ring groove in the European Patent 539 743 is, however, not designed so that it could satisfy the object set here. On the other hand, there is no reason why the ring groove in this European Patent should not be designed as proposed here.

The rivet bolt 210" is provided with a body part 212", a shaft part 332 having a thread cylinder 216" and a cylindrical rivet portion 214". The body part 212' has a ring-shaped support surface 218" coaxial to the thread cylinder in a plane 220" perpendicular to the longitudinal axis 222" of the thread cylinder and has an axially aligned ring groove 224" arranged radially inside the ring-shaped support surface 218" and radially outside the cylindrical rivet portion 214". The ring groove 224" merges on the radially inner side 232" into the outer surface of the cylindrical rivet portion 214", with ribs 242" providing security against rotation being provided in the region of the ring groove 224". The rivet bolt is characterized in that the ring groove 224" has a U-shaped cross-section considered in its axial sectional plane with a radially outer side wall 230" which is made relatively steep and has, at the steepest point 233", an inclination to the middle longitudinal axis of the rivet bolt in the range from approximately 45° to approximately −20°, preferably from approximately 30° to approximately 0°, with the steepest point 233" being able to be formed by an inflection point or inflection range which is formed by two mutually merging radii at the inlet of the ring groove 224" and at the transition from the radially outer side 30 of the ring groove in its base surface 236". The rivet bolt is furthermore characterized in that the ribs 242" providing security against rotation extend in a radial direction over the base region 236" of the ring groove 224" and have an axial height which amounts to a fraction of the maximum axial depth of the ring groove 224" and/or extend in raised form along the cylindrical rivet portion 214". Furthermore the volume of the ring groove is selected such that the volume of the respective folded over region 214" of the rivet portion over a range of metal sheet thicknesses which is matched to the respective thread size has space within the ring recess 280" formed by shaping the sheet metal part 260a or 260b into the ring groove 224" of the element and does not project beyond the side 282" of the shaped sheet metal remote from the ring-shaped support surface.

As can be seen from a comparison of FIGS. 43D and 43E, it is also possible with the bolt element to completely accommodate the beaded over rivet portion 214" within the ring recess 218" formed in the boss of the sheet metal part so that the lower side of the rivet bead 241'" lies in FIGS. 43D and 43E in areal alignment with the lower side 282 of the sheet metal part and thus creates a planar screw-on surface.

It is, however, also possible to modify the bolt element in accordance with FIGS. 43A to 43E, and indeed as shown in FIG. 43F or G. Here, the shaft part 323a projects away from the end face side of the body part 212"a which is remote from the sheet metal part 260a or 260b and not from the rivet portion side of the body part 212, as in the embodiment in accordance with FIGS. 43A to 43E. This means that the shaft part 332a is arranged on the opposite side of the body part 212" from the cylindrical rivet portion 214". This embodiment has the advantage that the rivet bead side of the element lies in areal alignment with the lower side 282 of the sheet metal part 260a or 260b and this can be advantageous for some applications. Any small irregularities which remain in the region of the rivet bead can easily be filled with a filler before the lacquering of the sheet metal part if this is the visible side. The component to be screwed on is here attached to the end face side of the body part 212"a remote from the sheet meta part and is fastened to the contact surface 400 by a nut (not shown) which is screwed onto the thread cylinder 216"a.

Finally, it is pointed out that in all embodiments all the materials can be named as examples for the material of the section and of the functional elements made thereof which achieve the strength values of class 8 of the ISO standard or higher within the framework of cold shaping, for example, a 35B2 alloy in accordance with DIN 1654. The fastening elements formed in this manner are inter alla suitable for all commercial steel materials for drawable sheet metal parts and also for aluminum or its alloys. Aluminum alloys, in particular those with a high strength, can also be used for the section or for the functional elements, e.g. AlMg5. Sections or functional elements of higher strength magnesium alloys such as AM50 can also be considered, for example.

In other words, the present invention has the underlying concept that the shape and the volume of the axial ring groove in the fastening element and the length and radial thickness of the cylindrical rivet portion are matched to one another such that, irrespective of which thickness the sheet metal part has within a wide range (such as is set forth in claim 2 for different screw sizes), with an least substantially complete contact of the sheet metal part at the ring-shaped support surface of the element at the radially outer side wall of the axial ring groove of the element and at the base surface of the axial ring groove of the element, the volume of the ring recess in the sheet metal part on the side of the sheet metal part remote from the ring-shaped contact surface is shaped into the rivet bead at the radially outer side wall of the axial ring groove of the element and at the base surface of the axial ring groove and which reduces as the sheet metal thickness increases, largely corresponds to or is slightly larger than the volume of the rivet portion which likewise reduces as the thickness of the sheet metal part increases—since the radial width of the ring recess and the available length of the region of the rivet portion to be beaded over decreases as the sheet metal thickness increases.

This means that the volume of the rivet portion to be beaded over can always be received in the volume of the axial ring recess in the sheet metal part, i.e. of the axial ring recess on the side of the sheet metal part remote from the ring-shaped contact surface—the lower side in the Figures—such that the corresponding lower side of the rivet bead is aligned with the lower side of the sheet metal part in the region of the ring-shaped support surface of the fastening element, i.e. is disposed in a plane, or is set back with respect to the lower side of the sheet metal part, and indeed by a maximum of approximately 0.2 mm.

The thickness of the sheet metal part in the region of the fastening element, i.e. preferably in the region of the ring-shaped support surface of the element, of the radially outer side of the axial ring groove of the element and of the base surface of this axial ring groove, preferably corresponds at least substantially to the thickness of the sheet metal part directly radially outside the fastening element, i.e. generally to the thickness of the starting sheet metal part. Here, at least substantially preferably means a difference of a maximum of +/−15% of the thickness, preferably of +/−10% and particularly preferably less than +/−5% of the thickness of the sheet metal part radially outside the fastening element. In this respect, the boundary of the hole in the boss of the sheet metal part, i.e. its marginal region, preferably extends up to directly to the cylindrical rivet portion without here becoming substantially thinner or thicker, with a certain matching to the shape of the transition of the base region of the axial ring groove to its radially inner side wall being permitted.

It is, however, not absolutely necessary that the thickness of the sheet metal part remains constant in the region of the radially outer side wall of the axial ring groove and/or in the base region of this ring groove; it would certainly be conceivable that the one or the other region is made thicker or thinner in the formation of the boss in the sheet metal part. This could represent a further possibility of adapting the volume of the ring recess in the lower side of the sheet metal part to the volume of the region of the rivet portion to be beaded over so that the demand that the lower side of the rivet bead is disposed in the same plane as the lower side of the sheet metal part in the region of the ring-shaped contact surface or is slightly set back with respect to it is satisfied for a wide range of sheet metal thicknesses.

The respective angle of the radially outer side wall of the axial ring groove with respect to the middle longitudinal axis of the fastening element is preferably selected within the named range so that any possibly present downwardly open ring recess in the sheet metal part radially outside the rivet bead is as small as possible, whereby the radial dimension of the fastening element and therefore its weight and the costs of manufacture of the element can also be kept as small as possible. A curved surface at the radially inner side of the rivet bead in the region of its lower side is generally permissible, provided that the rivet bead is not weakened to an inadmissible extent at this point.

Reference Numeral List

| | |
|---|---|
| 10 | rivet nut |
| 12 | body part |
| 14 | rivet portion |
| 14' | beaded over rivet portion |
| 16 | thread cylinder |
| 18 | ring-shaped support surface |
| 20 | plane |
| 22 | longitudinal axis of the thread |
| 24 | axial ring groove |
| 26 | outer surface of the rivet portion |
| 30 | outer side wall |
| 32 | inner side wall |
| 33 | steepest point |
| 34 | radius |
| 35 | radius |
| 36 | base surface |
| 38 | line |
| 40 | radius |
| 42 | ribs providing security against rotation |
| 46 | end face side of the rivet nut remote from the rivet portion |
| 48 | plane |
| D1 | inner diameter of the rivet portion |
| D2 | outer dimension of the thread cylinder |
| 52 | rounded surface |
| 54 | rounded surface |
| 56 | rounded portion at the end of the rivet portion 14 |
| 58 | conical or rounded surface |
| 60 | sheet metal part |
| 62 | boss |
| 62' | elevated portion of the sheet metal part |
| 64 | hole |
| 66 | hole margin |
| 66' | margin of the perforation |
| 70 | die |
| 72 | projection of the die |
| 74 | shoulder of the die |
| 76 | circular surface |
| 78 | free end face surface of the die |
| 80 | ring recess |
| 81 | upper side of the sheet metal part |
| 82 | lower side of the sheet metal part |
| 83 | ring recess of the rivet bead |
| 84 | cylindrical section of the body part |
| 86 | ring shoulder/press-on situation |
| 88 | cylindrical section |
| 90 | rounded corner |
| 92 | rounded corner |
| 94 | radius |
| 95 | straight portion |
| 96 | radius |
| 97 | radially outer side of the ring groove |
| 98 | radially inner side of the ring groove |
| 99 | undercut |
| 100 | inner hole of the star-shaped security against rotation |
| 102 | tips of the star-shaped security against rotation |
| 104 | recesses or pockets |
| 106 | star-shaped recesses |
| 108 | raised portions |
| 110 | wavy extent of the ring groove |
| 112 | peaks |
| 114 | valleys |
| 116 | recesses |
| 118 | projection |
| 120 | undercut |
| 122 | undercut ring shape |
| 124 | arcuate elevated portions |
| 126 | arcuate recesses |
| 130 | punched section |
| 210 | rivet bolt |
| 332 | shaft part |
| 400 | contact surface |

The invention claimed is:

1. A combination of a rivet nut (10) with a sheet metal part (60) having a thickness selected from a range of thicknesses, the rivet nut having a body part (12) and a cylindrical rivet portion (14), with the body part having a centrally arranged thread cylinder (16), a ring-shaped support surface (16) coaxial to the thread cylinder in a plane (20) perpendicular to the longitudinal axis (22) of the thread cylinder and an axially aligned ring groove (24) which is arranged radially inside the ring-shaped support surface (18) and radially outside the cylindrical rivet portion (14) and which merges on the radially inner side into the outer surface of the cylindrical rivet portion, wherein the ring groove (24) has, seen in an axial sectional plane, a U-shaped cross-section, wherein the volume of the ring groove is selected such that when used with the sheet metal part, irrespective of its thickness within the range, the said sheet metal part is formed into the ring groove (24) and a respective ring recess (80) is formed in the sheet metal part having a respective volume, the volume of a rivet bead formed by a respective folded over region of the rivet portion is accommodated within the ring recess (80), the ring recess varying in volume as a fraction of the sheet metal thickness, but for any thickness within said range, the rivet bead formed by beading over a portion of said cylindrical rivet portion into the ring recess, is such that the volume of the rivet bead substantially fills the volume of said ring recess; wherein the volume of the U-shaped groove axially within the ring-shaped recess (80) corresponds at least substantially to the volume of the beaded over rivet portion (14').

2. The combination in accordance with claim 1, wherein a margin (66') of the sheet metal part is made in thickened form in a region of a perforation (64) through which the rivet portion (14) extends; and wherein the rivet bead (14') is provided with a ring recess (90) on the side facing the thread cylinder (16) which receives the thickened margin.

3. The combination in accordance with claim 1, wherein ribs (42) providing security against rotation are provided in said ring groove (24) and engage in shape matched manner into the sheet metal material, but do not cut through it.

4. The combination in accordance with claim 1, wherein with a rivet nut, in which ribs (42") providing security against rotation extend in raised form along the cylindrical rivet portion, they engage in shape matched manner into the side of the sheet metal part facing the rivet bead (14').

* * * * *

UNITED STATES PATENT AND TRADEMARK OFFICE
CERTIFICATE OF CORRECTION

PATENT NO. : 8,371,785 B2
APPLICATION NO. : 12/303001
DATED : February 12, 2013
INVENTOR(S) : Babej et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 418 days.

Signed and Sealed this
First Day of September, 2015

Michelle K. Lee
*Director of the United States Patent and Trademark Office*